(12) United States Patent
Kurokawa et al.

(10) Patent No.: US 10,487,711 B2
(45) Date of Patent: Nov. 26, 2019

(54) WORK VEHICLE

(71) Applicant: YANMAR CO., LTD., Osaka-shi, Osaka (JP)

(72) Inventors: Yoshiaki Kurokawa, Osaka (JP); Satoshi Hasegawa, Osaka (JP); Masahito Adachi, Osaka (JP)

(73) Assignee: YANMAR CO., LTD., Osaka (JP)

( * ) Notice: Subject to any disclaimer, the term of this patent is extended or adjusted under 35 U.S.C. 154(b) by 0 days.

(21) Appl. No.: 15/489,380

(22) Filed: Apr. 17, 2017

(65) Prior Publication Data

US 2017/0218808 A1 Aug. 3, 2017

Related U.S. Application Data

(63) Continuation of application No. PCT/JP2015/078379, filed on Oct. 6, 2015.

(30) Foreign Application Priority Data

Oct. 15, 2014 (JP) .................................. 2014-211132
Apr. 9, 2015 (JP) .................................. 2015-079706

(51) Int. Cl.
*B60K 13/04* (2006.01)
*F01N 3/08* (2006.01)
(Continued)

(52) U.S. Cl.
CPC ................ *F01N 3/08* (2013.01); *B60K 11/02* (2013.01); *B60K 11/06* (2013.01); *B60K 13/04* (2013.01); *B60K 13/06* (2013.01); *B62D 49/06* (2013.01); *F01N 13/008* (2013.01); *F01N 13/08* (2013.01); *F01N 13/102* (2013.01); *F01N 13/14* (2013.01); *F01P 5/02* (2013.01); *F01P 5/06* (2013.01);
(Continued)

(58) Field of Classification Search
CPC ........ F01N 3/005; B60K 13/04; E02F 9/0866; E02F 2590/08; E02F 13/1805; Y02T 10/47; F02M 26/05; F02M 35/10222
See application file for complete search history.

(56) References Cited

U.S. PATENT DOCUMENTS 2,921,432 A * 1/1960 Marcotte ................. F01N 3/005
55/307
3,358,787 A * 12/1967 Bangasser .............. B60K 11/08
180/69.2
(Continued)

FOREIGN PATENT DOCUMENTS

JP 8-99539 A 4/1996
JP 2008-031955 A 2/2008
(Continued)

*Primary Examiner* — Emma K Frick
(74) *Attorney, Agent, or Firm* — Norton Rose Fulbright US LLP

(57) ABSTRACT

A work vehicle includes an engine, a post-processing device, and a cooling fan. The engine is mounted on a front portion of a travelling machine body. The post-processing device purifies exhaust gas of the engine. The cooling fan water-cools the engine. The cooling fan is located in front of the engine. The cooling fan, the engine, and the post-processing device are covered with a hood. The hood includes a shield. The shield covers a lower section of the post-processing device and one side of the engine. The shield is a perforated plate including a plurality of holes.

20 Claims, 41 Drawing Sheets

(51) Int. Cl.
*F02M 26/22* (2016.01)
*B60K 11/02* (2006.01)
*B60K 11/06* (2006.01)
*F01N 13/00* (2010.01)
*F01N 13/10* (2010.01)
*F01P 5/02* (2006.01)
*F01P 5/06* (2006.01)
*F01P 11/02* (2006.01)
*F01N 13/14* (2010.01)
*F02B 77/11* (2006.01)
*B60K 13/06* (2006.01)
*B62D 49/06* (2006.01)
*F01N 13/08* (2010.01)
*B62D 25/10* (2006.01)
*B62D 21/18* (2006.01)
*F01P 1/00* (2006.01)

(52) U.S. Cl.
CPC ............ *F01P 11/02* (2013.01); *F02B 77/11* (2013.01); *F02M 26/22* (2016.02); *B62D 21/186* (2013.01); *B62D 25/10* (2013.01); *F01N 2260/20* (2013.01); *F01N 2340/04* (2013.01); *F01N 2590/08* (2013.01); *F01P 2001/005* (2013.01)

(56) References Cited

U.S. PATENT DOCUMENTS

| | | | | |
|---|---|---|---|---|
| 3,795,287 | A * | 3/1974 | Rose | B60K 13/04 181/283 |
| 4,133,547 | A * | 1/1979 | Fox | B60K 13/04 123/41.64 |
| 5,464,952 | A * | 11/1995 | Shah | B29C 70/088 181/211 |
| 5,689,953 | A * | 11/1997 | Yamashita | B60K 11/02 123/41.49 |
| 7,314,111 | B2 * | 1/2008 | Matsumoto | F02B 75/22 180/292 |
| 7,717,205 | B2 * | 5/2010 | Kertz | B60K 13/04 180/68.1 |
| 7,810,466 | B2 * | 10/2010 | Preimesberger | F02B 67/10 123/184.31 |
| 8,141,535 | B2 * | 3/2012 | Olsen | F01N 13/1805 123/195 A |
| 8,550,198 | B2 * | 10/2013 | Isaka | B60K 11/04 180/291 |
| 8,857,557 | B2 * | 10/2014 | Sakamoto | B60K 11/04 180/296 |
| 8,904,766 | B2 * | 12/2014 | Saito | F01N 3/0335 60/299 |
| 8,905,182 | B2 * | 12/2014 | Masumoto | B60K 11/06 180/309 |
| 8,967,319 | B2 * | 3/2015 | Novacek | B60K 13/04 180/309 |
| 9,056,547 | B2 * | 6/2015 | Kimijima | E02F 3/3411 |
| 9,222,383 | B2 * | 12/2015 | Togo | F01N 13/1811 |
| 9,453,326 | B2 * | 9/2016 | Shimohira | E02F 9/0841 |
| 9,670,646 | B2 * | 6/2017 | Ohmura | E02F 9/0866 |
| 9,869,229 | B2 * | 1/2018 | Novacek | B60K 13/04 |
| 10,071,626 | B2 * | 9/2018 | Kuhn | B60K 13/04 |
| 10,266,128 | B2 * | 4/2019 | Hoshino | B60K 11/04 |
| 10,293,682 | B2 * | 5/2019 | Nagano | B60K 13/04 |
| 2013/0186077 | A1 | 7/2013 | Morimoto et al. | |
| 2014/0020972 | A1 | 1/2014 | Masumoto et al. | |
| 2014/0083791 | A1 * | 3/2014 | Togo | F01N 13/1811 180/309 |
| 2014/0251713 | A1 | 9/2014 | Aoyama et al. | |
| 2015/0176451 | A1 * | 6/2015 | Tsutsumi | B01D 53/86 60/298 |
| 2015/0204221 | A1 | 7/2015 | Fukuyoshi | |
| 2015/0217634 | A1 * | 8/2015 | Sawai | B60K 15/063 280/834 |
| 2015/0337520 | A1 * | 11/2015 | Yabe | E02F 3/3411 180/68.1 |
| 2016/0068058 | A1 * | 3/2016 | Kamimae | B60K 11/08 180/309 |
| 2016/0096426 | A1 * | 4/2016 | Kurokawa | B60K 13/04 180/309 |
| 2016/0222629 | A1 * | 8/2016 | Tsuda | B60K 15/063 |
| 2016/0265194 | A1 * | 9/2016 | Ohmura | B60K 13/04 |
| 2016/0273441 | A1 * | 9/2016 | Kikuchi | F01N 13/1822 |
| 2016/0288639 | A1 * | 10/2016 | Kikuchi | B60K 13/04 |
| 2017/0028839 | A1 * | 2/2017 | Sawai | B60K 15/063 |
| 2017/0284059 | A1 * | 10/2017 | Takeyama | B60K 13/02 |
| 2018/0022391 | A1 * | 1/2018 | Lutz | B60N 2/6009 280/783 |
| 2018/0222313 | A1 * | 8/2018 | Takii | B60K 13/04 |

FOREIGN PATENT DOCUMENTS

| | | |
|---|---|---|
| JP | 2014-25401 A | 2/2014 |
| JP | 2014-31053 A | 2/2014 |
| JP | 2014-172465 A | 9/2014 |

* cited by examiner

WORK VEHICLE

CROSS-REFERENCE TO RELATED APPLICATIONS

The present application is a continuation application of International Application No. PCT/JP2015/078379, filed Oct. 6, 2015, which claims priority to Japanese Patent Application No. 2014-211132, filed Oct. 15, 2014 and Japanese Patent Application No. 2015-079706, filed Apr. 9, 2015. The contents of these applications are incorporated herein by reference in their entirety.

BACKGROUND OF THE INVENTION

The invention of the present application relates to work vehicles.

As higher-level emission regulations have been applied to diesel engines (hereinafter, simply referred to as engines), agricultural vehicles and construction and civil engineering machines that include an engine are required to include an exhaust-gas purification device that removes air pollutants in exhaust gas. Diesel particulate filters (hereinafter, referred to as the DPF) that collect, for example, particulate matter in exhaust gas (for example, refer to Japanese Unexamined Patent Application Publication No. 2008-31955) are known exhaust gas purification devices.

SUMMARY OF THE INVENTION

Japanese Unexamined Patent Application Publication No. 2008-31955 discloses a configuration of a tractor. The tractor includes an engine on the front section of a travelling machine body. A DPF is located on either left or right side of an exhaust manifold above the engine. The DPF extends in the fore-and-aft direction of the engine. The DPF and the engine are covered with a hood. According to the tractor disclosed in Japanese Unexamined Patent Application Publication No. 2008-31955, the hood has a cross-section that is like an inverted U-shape. Thus, the left and right corners of the hood bulge outward. The DPF is located inside the left and right corners, that is, in the left and right inner corners of the hood. As described above, with the configuration disclosed in Japanese Unexamined Patent Application Publication No. 2008-31955, since the left and right corners of the hood bulge outward in view of a mounting space of the DPF, the forward view of an operator seated in an operator's seat of the travelling machine body, in particular, view ahead of the left and right corners of the hood is sacrificed.

If the DPF is mounted apart from the engine, the temperature of exhaust gas supplied from the engine to the DPF is decreased, and regeneration of a soot filter, or a like member, of the DPF is likely to be incomplete. Unfortunately, a special method is required to increase the temperature of the exhaust gas in the DPF to regenerate the soot filter, or the like member.

If the DPF is mounted close to the engine, decrease in the temperature of the exhaust gas supplied from the engine to the DPF is reduced, and the temperature of the exhaust gas in the DPF is easily maintained at a high temperature. Since the support structure of the DPF, however, is not easily simplified, the workability in mounting the DPF or shock proof cannot be improved. Increase in the size of the engine due to mounting of the DPF increases influence caused by vibration of the engine having different vibration systems, and breakage or failure may possibly occur in a component that needs to be coupled to both the travelling machine body and the engine (for example, an exhaust pipe).

Increase in the size of the engine not only requires a design change in the work vehicle due to an insufficient engine mounting space in the work vehicle, but also deteriorates ease of maintenance depending on the mounting state of the engine. Furthermore, increase in the size of the engine deteriorates the flow of cooling air in the engine compartment so that cooling effect is reduced. The heat retention in the engine compartment may possibly cause a failure not only in the electronic components, but also in the engine due to heating.

Since high-temperature exhaust gas flows through the inside of the exhaust-gas purification device, the exhaust-gas purification device is a high-temperature heat source. Thus, if electric components such as a pressure sensor and temperature sensors provided on the exhaust-gas purification device are located adjacent to an exhaust-gas purification case, the electric components are affected by radiant heat from the exhaust-gas purification device. Thus, the electric components attached to the exhaust-gas purification device may possibly cause a failure due to heat from the exhaust-gas purification device or the engine. In particular, if a failure occurs in the temperature sensors and the pressure sensor, the condition of the exhaust-gas purification device cannot be checked. Thus, clogging in the device is not eliminated. As a result, a malfunction such as an engine stall occurs.

Accordingly, the invention of the present application provides a work vehicle that has been improved taking into consideration the above-described current status.

According to one aspect of the invention of the present application, a work vehicle includes an engine, a post-processing device, a cooling fan, a hood, and a shield. The engine is mounted on a front portion of a travelling machine body. The post-processing device is disposed above the engine and is configured to purify exhaust gas of the engine. The cooling fan is disposed in front of the engine and is configured to cool the engine. The hood is configured to cover the cooling fan, the engine, and the post-processing device. The shield is covering a lower section of the post-processing device and one side of the engine. The shield includes a perforated plate including a plurality of holes.

In the one aspect of the present invention, the post-processing device may be coupled to an exhaust manifold on one side of the engine. The exhaust manifold may be covered with the shield. The work vehicle may further include a heat insulating member and a starter. The heat insulating member may be disposed below the exhaust manifold and coupled to one side of the engine. The starter may be disposed below the heat insulating member.

In the one aspect of the present invention, the shield may include a perforated plate including a plurality of holes arranged in a matrix. The shield may include a perforated plate including elongated holes arranged side by side. Furthermore, the shield may include a perforated plate in which an open area of a section close to the post-processing device is greater than an open area of a section close to a lower section of the exhaust manifold.

In the one aspect of the present invention, the work vehicle may further include an EGR cooler and a metal plate. The EGR cooler may be disposed below the exhaust manifold and may be configured to cool some of exhaust gas from the exhaust manifold. The metal plate may be disposed below the shield and may cover the outer side of the EGR cooler.

In the one aspect of the present invention, the work vehicle may include an engine, a post-processing device, a radiator, a cooling fan, a fan shroud, and a sensor. The engine may be mounted on a front portion of a travelling machine body. The post-processing device may be configured to purify exhaust gas of the engine. The radiator may be configured to water-cool the engine. The cooling fan may be configured to cool the engine and the radiator. The fan shroud may surround the cooling fan. The sensor may be secured to an upper section of the fan shroud and configured to measure an internal environment of the post-processing device, which is mounted above the engine. With this configuration, the sensor is located at an upstream section along the flow direction of the cooling air. This reduces influence of exhaust heat from the engine and the post-processing device and prevents failure of the sensor that might otherwise be caused by the heat. Thus, the internal environment of the post-processing device is properly grasped to optimally control the engine.

An exhaust gas inlet and an exhaust gas outlet of the post-processing device may be distributed at the front and the rear of the post-processing device such that exhaust gas from the engine flows along an output shaft of the engine in the post-processing device. In addition, the exhaust gas outlet of the post-processing device may be provided close to the cooling fan. The pressure sensor, which measures the pressure difference between the front and the rear of the purification filter in the post-processing device, may be secured to the upper section of the fan shroud. Thus, the post-processing device is located in a direction along the output shaft of the engine, and the pressure sensor, which measures the pressure at the front and the rear of the purification filter close to the exhaust outlet, is located at the upper section of the fan shroud adjacent to the exhaust outlet. This configuration reduces the length of pressure measurement pipes, which are located between the pressure sensor and the post-processing device, and reduces measurement errors caused by the pressure sensor.

In the one aspect of the present invention, the engine may be mounted on the front portion of the travelling machine body and the post-processing device may be configured to purify exhaust gas of the engine. The post-processing device may be mounted above the engine via a support bracket. The hood may be configured to cover the engine and the post-processing device. The work vehicle may further include a pipe securing bracket standing upright above the engine to cover an outer surface of the post-processing device and configured to secure, to the engine, an external supply pipe that supplies coolant that circulates in the engine to a device outside the engine. With this configuration, the external supply pipe, which supplies coolant to an external device such as an air conditioner provided on a travelling vehicle, is provided close to the post-processing device. This prevents decrease in the coolant temperature supplied to the external device. Providing the pipe securing bracket to stand by the outer side of the post-processing device insulates the heat of exhaust heat from the post-processing device.

In the one aspect of the present invention, the work vehicle may include a sensor configured to measure an internal environment of the post-processing device. The sensor may be configured to be secured to the pipe securing bracket. While the external supply pipe is disposed between the pipe securing bracket and the post-processing device, the pipe securing bracket may be disposed between the sensor and the post-processing device. With this configuration, the sensor is arranged on the further side of the pipe securing bracket from the post-processing device. This reduces influence caused by the exhaust heat from the engine and the post-processing device and prevents failure caused by heat.

In the one aspect of the present invention, a work vehicle may include an engine, a post-processing device, and an exhaust pipe. The engine may be mounted on a front portion of a travelling machine body. The post-processing device may be disposed above the engine and may be configured to purify exhaust gas of the engine. The exhaust pipe may be configured to discharge exhaust gas from the post-processing device to the outside. The exhaust pipe may include a first exhaust pipe and a second exhaust pipe. The first exhaust pipe may be coupled to an exhaust outlet of the post-processing device and may be secured to the engine. The second exhaust pipe may be disposed downstream of the first exhaust pipe and secured to the travelling machine body. The inner diameter of the second exhaust pipe may be greater than the outer diameter of the first exhaust pipe so that an exhaust outlet of the first exhaust pipe is inserted in and communicates with an exhaust inlet of the second exhaust pipe. With this configuration, the first and second exhaust pipes are respectively coupled and secured to the engine and the travelling machine body that have different vibration systems. This prevents damage in the exhaust pipe. Since the first exhaust pipe is inserted in the exhaust inlet of the second exhaust pipe, outside air is introduced into the second exhaust pipe together with the exhaust gas from the first exhaust pipe. This configuration cools the exhaust gas to be discharged to the outside.

The exhaust gas outlet and the exhaust gas inlet of the post-processing device may be distributed at the front and the rear of the post-processing device such that exhaust gas from the engine flows along the output shaft of the engine in the post-processing device. The exhaust inlet of the first exhaust pipe may be coupled to the exhaust gas outlet, which is located at the front section of the post-processing device. The first exhaust pipe may extend rearward along the post-processing device above the engine, and the post-processing device and the first exhaust pipe may be covered with the heat insulator. Since the post-processing device and the first exhaust pipe are covered with the heat insulator, the hood, which covers the engine compartment, is prevented from being heated by exhaust heat from the engine compartment.

In the one aspect of the present invention, the work vehicle may further include an operator's seat and a U-shaped exhaust pipe. The operator's seat may be disposed above the travelling machine body and at the rear of the engine. The U-shaped exhaust pipe may be secured in front of the operator's seat. The U-shaped exhaust pipe may include a drain hole configured to drain water at a lower section of the U-shaped exhaust pipe and a wind direction plate may be coupled to the U-shaped exhaust pipe to cover the drain hole from below on one side of the drain hole. With this configuration, water is drained in a direction that is not covered with the wind direction plate. Thus, when high-temperature water in the exhaust pipe is drained to the outside, components having low heat resistance or low water resistance such as a harness or a battery provided adjacent to the exhaust pipe are prevented from being damaged by heat or causing failure due to water leakage.

In the one aspect of the present invention, the work vehicle may further include a hood, an engine, a cooling fan, a plurality of heat exchangers, and a bottom plate. The hood may be configured to cover an engine compartment disposed at a front section of a travelling machine body. The engine may be a drive source. The cooling fan may be configured to cool the engine. The plurality of heat exchangers may be configured to allow cooling air guided by the cooling fan to pass through the heat exchangers to exchange heat with a cooling medium. The bottom plate may cover an upper surface of a front section of the travelling machine body. The hood and the bottom plate may include opening portions at positions forward of the cooling fan. The hood and the bottom plate may be configured to introduce cooling air into the hood through the opening portions when the cooling fan is driven. With this configuration, in the limited configuration at the front of the cooling fan, the open area is made greater than the flow rate of air to be passed through the cooling fan. This configuration reduces the flow velocity of the cooling air to be passed through the cooling fan, and the cooling air in the engine compartment is optimally controlled. Since the meshed opening portion is also provided on the bottom plate, dust is prevented from entering the engine compartment and allowed to fall down by its own weight after the engine is stopped.

The left and right front frames and the left and right rear frames may be coupled in the fore-and-aft direction, and the front ends of the left and right front frames may be held by a coupling member made of a rectangular metal casting to configure the travelling machine body. The opening portion of the bottom plate may be located at a position above the coupling member. Since the coupling member of the travelling machine body is located below the opening portion of the bottom plate, when the outside air flows into the engine compartment through the opening portion, the coupling member prevents dust and mud from entering the engine compartment. Since the front frames, which support the engine, are secured by the coupling member, which is made of a metal casting, the support structure of the engine is reinforced.

According to the embodiment of the invention of the present application, covering the side of the engine with the shield made of the perforated plate improves heat insulation of the engine and simultaneously prevents heat retention on the side of the engine. This configuration optimizes the thermal efficiency in the engine compartment inside the hood, prevents abnormal operation of the engine, and simultaneously improves the driving efficiency.

According to the embodiment of the invention of the present application, providing the heat insulating member above the starter, which is an electric device, reduces influence on the starter by heat dissipation from the heated exhaust manifold, and prevents failure of the starter, which is an electric device.

According to the embodiment of the invention of the present application, since the holes of the perforated plate, which forms the shield, are arranged in a matrix, not only the open area of the shield is easily adjusted, but the open region can be set with flexibility. The holes of the perforated plate, which forms the shield, may also be elongated. In this case, the resistance to the fluid at the opening portions is easily made uniform. This inhibits turbulence on the inner side of the shield and reduces retention of exhaust heat from, for example, the engine.

According to the embodiment of the invention of the present application, the open area of the section of the shield close to the post-processing device is made greater than the open area of the section of the shield close to the lower section of the exhaust manifold. Thus, the exhaust heat that has moved upward is more efficiently guided to the post-processing device. At the same time, some of the engine cooling air is easily exhausted at the open region of the section close to the post-processing device. This also inhibits heat retention between the shield and the engine. In addition, the outer side of the EGR cooler, which is located below the exhaust manifold, is covered with a metal plate located below the shield. This configuration allows cooling air from the front of the engine to be guided to the EGR cooler and allows the cooling air heated on the side of the EGR cooler to be moved upward toward the post-processing device, which is located above the EGR cooler. Thus, in the engine compartment, the exhaust heat of the engine is effectively used for the post-processing device, and heat retention around the engine is inhibited.

DESCRIPTION OF THE EMBODIMENTS

Figure 1:
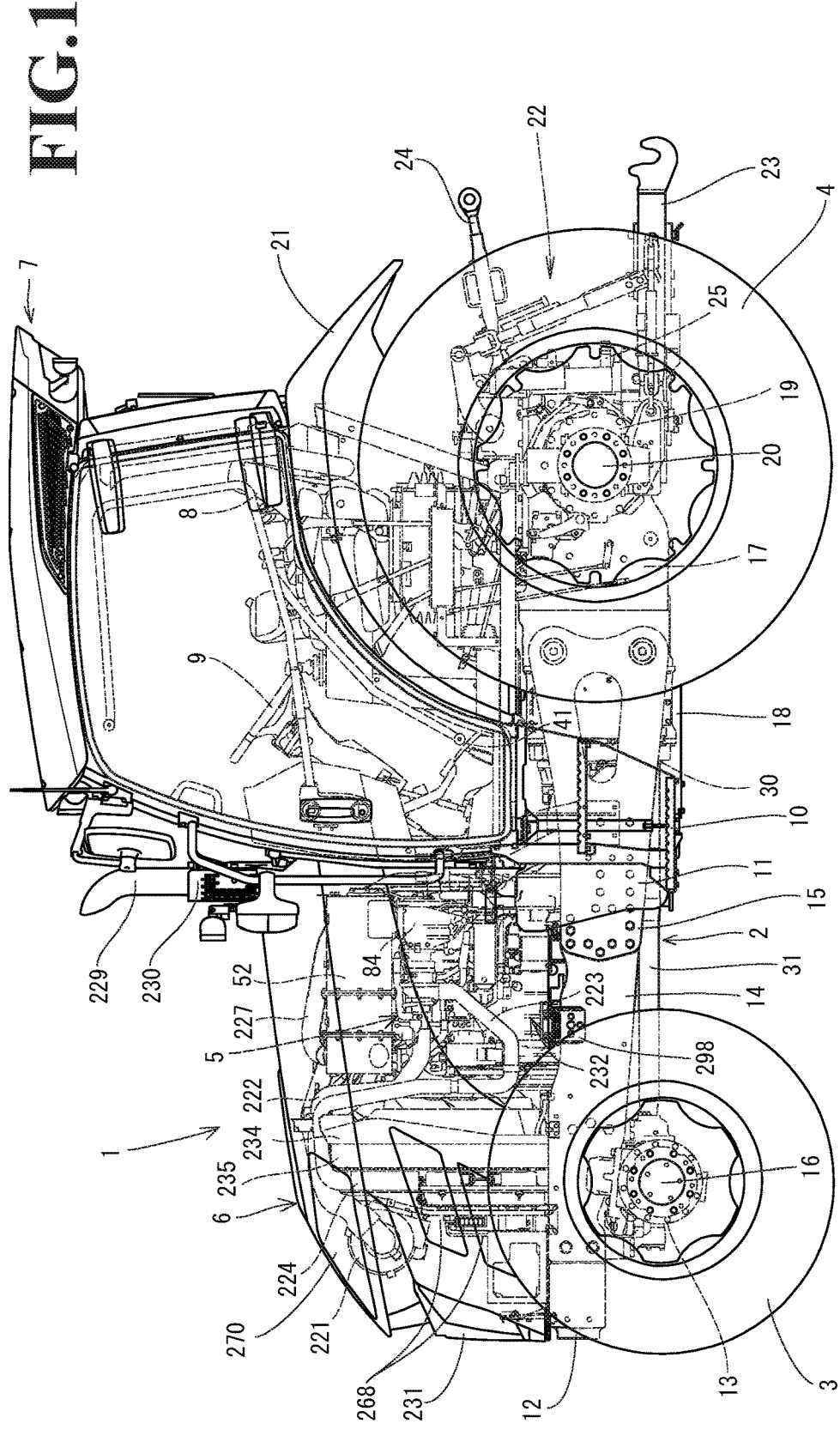
FIG. 1 is a left side view of a work vehicle according to the invention of the present application.

Hereinafter, an embodiment of the present invention will be described with reference to the drawings. First, a configuration of a tractor 1 according to the embodiment will be described with reference to FIGS. 1 to 22. The tractor 1 is a work vehicle. The tractor 1 of this embodiment includes a travelling machine body 2. The travelling machine body 2 is supported by travelling sections. The travelling sections are a pair of left and right front wheels 3 and a pair of left and right rear wheels 4 in this embodiment. The rear wheels 4 and the front wheels 3 are driven by a power source mounted on the front section of the travelling machine body 2. The power source is a common rail diesel engine 5 (hereinafter, simply referred to as the engine) in this embodiment. The tractor 1 travels forward and backward by driving the rear wheels 4 and the front wheels 3. The engine 5 is covered with a hood 6. A cabin 7 is provided on the upper surface of the travelling machine body 2. An operator's seat 8 and a steering wheel (round steering wheel) 9 are located inside the cabin 7. The steering wheel 9 is steered to move the steering direction of the front wheels 3 to left and right. A step 10 is provided on the lower section outside the cabin 7. The step 10 is used by an operator to get on and off. A fuel tank 11 is provided below the bottom portion of the cabin 7. The fuel tank 11 supplies fuel to the engine 5.

The travelling body 2 includes engine frames (front frames) 14 and left and right body frames (rear frames) 15. The engine frames 14 include a front bumper (frame coupling member) 12 and front axle cases 13. The left and right body frames 15 are detachably secured to the rear portions of the engine frames 14. A front axle 16 rotationally projects outward from the left side of the left front axle case 13 and from the right side of the right front axle case 13. The front wheels 3 are secured to the left side of the left front axle case 13 and the right side of the right front axle case 13 via the front axle 16. A transmission case 17 is coupled to the rear portion of the body frame 15. The transmission case 17 changes speed of rotational power from the engine 5 as required and transmits the rotational power to the four front and rear wheels 3, 3, 4, 4. A tank frame 18 is bolted to the left and right body frames 15 and the bottom surface of the transmission case 17. The tank frame 18 is a rectangular frame plate as viewed from the bottom and bulges outward in the left and right direction. The fuel tank 11 of this embodiment is separated into two left and right parts. The left and right parts of the fuel tank 11 are distributed on the upper surface of the left and right bulging sections of the tank frame 18. Left and right rear axle cases 19 are mounted on the left and right external side surfaces of the transmission case 17 to project outward. Left and right rear axles 20 are rotationally inserted in the left and right rear axle cases 19. The rear wheels 4 are secured to the transmission case 17 via the rear axles 20. The upper sections of the left and right rear wheels 4 are covered with left and right rear fenders 21.

A hydraulic lifting and lowering mechanism 22 is detachably secured to the rear upper surface of the transmission case 17. The hydraulic lifting and lowering mechanism 22 lifts and lowers a farm implement such as a rotary tiller. The farm implement, such as a rotary tiller, is coupled to the rear portion of the transmission case 17 via a three point link mechanism including a pair of left and right lower links 23 and a top link 24. A power take-off (PTO) shaft 25 projects rearward from the rear side of the transmission case 17. The PTO shaft 25 transmits PTO drive power to the farm implement, such as a rotary tiller.

A flywheel 61 is directly coupled to an engine output shaft 53. The engine output shaft 53 projects rearward from the rear side of the engine 5. A main drive axle 27 and a main transmission-shift input shaft 28 are coupled with each other via a power transmission shaft 29. The main drive axle 27 projects rearward from the flywheel 61. The main transmission-shift input shaft 28 projects forward from the front side of the transmission case 17. The power transmission shaft 29 includes universal couplings on both ends. A hydraulic continuously variable transmission device, a forward/backward travelling direction switching mechanism, a travelling sub transmission-shift gear mechanism, and a rear wheel differential gear mechanism are located in the transmission case 17. Rotational power of the engine 5 is transmitted through the main drive axle 27 and the power transmission shaft 29 to the main transmission-shift input shaft 28 in the transmission case 17. The rotational speed of the rotational power is changed by the hydraulic continuously variable transmission and the travelling sub transmission-shift gear mechanism. The speed-changed power is transmitted to the left and right rear wheels 4 via the rear wheel differential gear mechanism.

Front wheel output shafts 30 project forward from the lower part of the front surface of the transmission case 17. A front wheel transmission shaft (not shown) projects rearward from each front axle case 13, which embeds a front wheel differential gear mechanism (not shown). The front wheel transmission shafts are coupled to the front wheel output shafts 30 via front wheel drive shafts 31. The speed-changed power changed by the hydraulic continuously variable transmission and the travelling sub transmission-shift gear mechanism in the transmission case 17 is transmitted from the front wheel output shafts 30, the front wheel drive shafts 31, and the front wheel transmission shafts via the front wheel differential gear mechanisms in the front axle cases 13 to the left and right front wheels 3.

The engine 5 includes a turbocharger 81. The turbocharger 81 includes a compressor case 83. The compressor case 83 embeds a blower wheel. The intake-air introduction side of the compressor case 83 is coupled to the intake-air discharge side of an air cleaner 221 via a supply pipe 222, and the intake-air discharge side of the compressor case 83 is coupled to an upstream relay pipe 223. The turbocharger 81 includes a turbine case 82. The turbine case 82 embeds a turbine wheel. The exhaust introduction side of the turbine case 82 is coupled to the exhaust gas outlet of an exhaust manifold 57, and the intake-air discharge side of the turbine case 82 is coupled to the exhaust gas inlet of a post-processing device. The post-processing device is an exhaust-gas purification device 52 in this embodiment.

An EGR cooler 80 and an EGR device 75 are distributed on both sides of the engine 5 and are coupled to each other by a recirculation exhaust gas tube 78. The recirculation exhaust gas tube 78 is a circulation passage that detours around the rear surface of the engine 5 (close to the flywheel 61). The EGR device 75 is coupled to a downstream relay pipe 225. The downstream relay pipe 225 extends forward (toward a cooling fan 59) on the right side of the engine 5. The upstream relay pipe 223 and the downstream relay pipe 225 are distributed on both sides of the engine 5 and extend toward the front upper section of the engine 5 to be coupled to an intercooler 224. The intercooler 224 is located on a frame 226 at the front of the engine 5. The air cleaner 221 is located on the upper section of the front surface of the frame 226. The supply pipe 222, which is coupled to the air cleaner 221, extends over the frame 226 toward the rear section on the left side of the engine 5.

With the above-described configuration, dust is removed from the fresh air (external air) taken into the air cleaner 221 to purify the fresh air, and the fresh air is then drawn into the compressor case 83 of the turbocharger 81 via the supply pipe 222. The pressurized fresh air that has been compressed in the compressor case 83 of the turbocharger 81 is supplied to an EGR body case of the EGR device 75 via the relay pipes 223, 225 and the intercooler 224. Some of the exhaust gas (EGR gas) from the exhaust manifold 57 is cooled by the EGR cooler 80, and the cooled EGR gas is then supplied to the EGR body case of the EGR device 75 via the recirculation exhaust gas tube 78.

The exhaust-gas purification device 52 includes an exhaust gas inlet pipe 161 on the case outer circumferential surface at one end (rear end) of the exhaust-gas purification device 52 in the longitudinal direction. The exhaust gas inlet pipe 161 communicates with the exhaust gas discharge side of the turbine case 82 in the turbocharger 81 via an exhaust connecting pipe 84. The exhaust-gas purification device 52 includes an exhaust gas outlet pipe 162 on the case outer circumferential surface at the other end (front end) of the exhaust-gas purification device 52 in the longitudinal direction. The exhaust gas outlet pipe 162 is coupled to an exhaust pipe 227. In the exhaust-gas purification device 52, the exhaust gas inlet pipe 161 is open downward to the left, and the exhaust gas outlet pipe 162 is open upward to the right. The exhaust pipe 227 is located to extend over the engine 5 from the front left side toward the rear right side of the diesel engine 5. The exhaust pipe 227 is located between the exhaust-gas purification device 52 and the downstream relay pipe 225 to be approximately parallel to the exhaust-gas purification device 52 and the downstream relay pipe 225.

The exhaust-gas purification device 52 and the exhaust pipe 227 are arranged above the engine 5 next to each other in the left and right direction to be parallel to the output shaft of the engine 5. That is, the exhaust-gas purification device 52 and the exhaust pipe 227 are arranged next to each other such that the exhaust-gas purification device 52 covers the left section of the upper surface of the engine 5, and the exhaust pipe 227 covers the right section of the upper surface of the diesel engine 5. The downstream relay pipe 225, which connects the intercooler 224 and an intake connecting pipe 76, is located further rightward of the exhaust pipe 227. This configuration prevents the exhaust-gas purification device 52 that is heated to a high temperature from thermally affecting the downstream relay pipe 225.

The exhaust pipe (first exhaust pipe) 227, which is coupled to the exhaust side of the exhaust-gas purification device 52, is inserted in the exhaust gas inlet port of a tailpipe (second exhaust pipe) 229 on the rear right side of the diesel engine 5. The tailpipe 229 is located on the front right side of the cabin 7 and extends toward the exhaust gas discharge side from below upward. The tail pipe 229 is bent toward the diesel engine 5 below the cabin 7 so that the tail pipe 229 has a J-shape. The exhaust pipe 227 also includes an umbrella-like upper surface cover 228 on the outer circumferential surface above the section at which the exhaust pipe 227 is inserted in the tailpipe 229. The upper surface cover 228 is secured to the outer circumferential surface of the exhaust pipe 227 to extend in a radial pattern. The upper surface cover 228 covers the exhaust gas inlet port of the tailpipe 229 and prevents dust and rain water from entering the tailpipe 229.

The tailpipe 229 is formed such that the lower bent portion extends over the body frame 15 from the inner side to the outer side. The tailpipe 229 includes an exhaust gas inlet port provided on the inner side of the body frame 15 at an upper section, and the exhaust gas discharge port of the exhaust pipe 227 is inserted in the exhaust gas inlet port. That is, the coupling portion between the tailpipe 229 and the exhaust pipe 227 has a two-layer pipe structure. When exhaust gas flows from the exhaust pipe 227 to the tailpipe 229, outside air is simultaneously allowed to flow into the tailpipe 229 through the space between the exhaust pipe 227 and the tailpipe 229. This configuration cools the exhaust gas that flows in the tailpipe 229. Furthermore, the tailpipe 229 is configured to be covered with heat insulators 230. Engine covers 232 are located below the hood 6 on the left and right sides to cover the left and right sides of the engine compartment. The engine covers 232 are made of perforated plates.

The transmission case 17 includes a front transmission case 112, a rear transmission case 113, and an intermediate case 114. The front transmission case 112 includes, for example, the main transmission-shift input shaft 28. The rear transmission case 113 includes, for example, the rear axle cases 19. The intermediate case 114 couples the front end of the rear transmission case 113 to the rear end of the front transmission case 112. The rear end portions of the left and right body frames 15 are coupled to the left and right side surfaces of the intermediate case 114 via left and right upper and lower machine body coupling shafts 115, 116. That is, rear end portions of the left and right machine body frames 15 are coupled to the left and right side surfaces of the intermediate case 114 with the two upper machine body coupling shafts 115 and the two lower machine body coupling shafts 116 so that the machine body frames 15 and the transmission case 17 are integrally connected and form the rear portion of the travelling machine body 2. The travelling machine body 2 is configured such that, for example, the front transmission case 112 or the power transmission shaft 29 is located between the left and right machine body frames 15 to protect, for example, the front transmission case 112.

Furthermore, left and right front supports 96 support the front side of the cabin 7, and left and right rear supports 97 support the rear portion of the cabin 7. The front supports 96 are bolted to the front end portions on the machine outer surfaces of the left and right machine body frames 15. The front bottom portion of the cabin 7 is supported on the upper surfaces of the front supports 96 via rubber vibration isolators 98 while preventing vibration. The left and right rear axle cases 19 extend horizontally in the left and right direction. Each of the rear support 97 is bolted to a middle portion of the upper surface of the associated one of the left and right rear axle cases 19 in the left and right width direction. The rear bottom portion of the cabin 7 is supported on the upper surfaces of the rear supports 97 via rubber vibration isolators 99 while preventing vibration. Thus, the travelling machine body 2 supports the cabin 7 via the plurality of rubber vibration isolators 98, 99 while preventing vibration.

The rear axle cases 19 have a cross-sectional end surface that is approximately a rectangular tube. The rear supports 97 are located on the upper surfaces of the rear axle cases 19 to sandwich the rear axle cases 19. Anti-vibration brackets 101 are located on the lower surface of the rear axle cases 19. The rear supports 97 and the anti-vibration brackets 101 are fastened with bolts 102. The ends of an anti-vibration rod 103 with an extendable turnbuckle are coupled to the intermediate portion of each lower link 23, which extends in the fore-and-aft direction, and the associated anti-vibration bracket 101 to prevent the lower link 23 from swinging in the left and right direction.

Next, a configuration of the engine compartment frame including the hood 6 will be described. The hood 6 includes a front grille 231 at the front lower section to cover the front of the engine compartment. The engine covers 232 are formed of perforated plates and are located below the hood 6 on the left and right sides to cover the left and right sides of the engine compartment. That is, the hood 6 and the engine covers 232 cover the front, the upper section, and the left and right sides of the diesel engine 5.

The hood 6 includes the front grille 231 at the center position on the front surface. The ceiling at the upper section of the hood 6 is shaped to tilt diagonally upward from the front to the rear. The front grille 231 includes a pair of left and right anti-dust screens 231b. The anti-dust screens 231b are secured with a central frame 231a. The hood 6 provides a wide space at the rear section below the ceiling. The hood 6 forms a large space for accommodating the exhaust-gas purification device 52 in the engine compartment inside the hood 6. The hood 6 includes opening holes 268 at the front section on the left and right side surfaces. Cooling air is drawn in from both left and right sides of the hood 6 through the pair of left and right opening holes 268. The hood 6 further includes left and right pair of meshed opening holes 270 at the front section of the ceiling. Cooling air is drawn in from the front upper section of the hood 6 through the pair of left and right opening holes 270. The opening holes 268, 270 are covered with meshed anti-dust screens.

The front end inner surfaces of the pair of left and right engine frames (front frames) 14 are coupled to the left and right outer surfaces of the front bumper 12. The front bumper 12 is formed of a rectangular metal casting. The diesel engine 5 is supported on the engine frames 14, which are held by the front bumper 12. A frame bottom plate 233 is held by the upper edges of the left and right engine frames 14 and the upper surface of the front bumper 12 to cover the front end upper sections of the engine frames 14. A radiator 235 stands upright on the frame bottom plate 233 to be located in front of the engine 5. A fan shroud 234 is secured to the rear surface of the radiator 235. The fan shroud 234 surrounds the outer circumference of the cooling fan 59 and connects the radiator 235 to the cooling fan 59.

The lower surface of the frame bottom plate 233 is coupled to the side surfaces of the left and right engine frames 14 via coupling brackets 233a, 233b. The coupling brackets 233a, 233b are located at the front and the rear. The frame bottom plate 233 is divided into two parts at the front and the rear and includes a front bottom plate 233x and a rear bottom plate 233y. A first end of each coupling bracket 233a is coupled to the side surface of the associated one of the pair of left and right engine frames 14. A front section of a second end of each coupling bracket 233a is coupled to the associated one of the left and right edges of the lower surface of the front bottom plate 233x. The front section of the front bottom plate 233x is fastened to the front bumper 12. A rear section of the second end of each of the pair of left and right coupling brackets 233a is coupled to the associated one of the left and right edges of the front lower surface of the rear bottom plate 233y. A second end of each of the pair of left and right coupling brackets 233b is coupled to the associated one of the left and right edges of the front lower surface of the rear bottom plate 233y.

The frame bottom plate 233 includes an opening hole 233z at a central region in the left and right direction. The opening hole 233z is located in the front bottom plate 233x of the frame bottom plate 233 and is covered with a meshed anti-dust screen. That is, the hood 6 and the frame bottom plate 233 include, at a position forward of the cooling fan 59 of the engine 5, the opening portions 231b, 233z, 268, 270. When the cooling fan 59 is driven, cooling air is drawn into the engine compartment in the hood 6 through the opening portions 231b, 233z, 268, 270 of the hood 6 and the frame bottom plate 233. In the limited configuration at the front of the cooling fan 59, the open area is made greater than the flow rate of air to be passed through the cooling fan 59. This configuration reduces the flow velocity of the cooling air to be passed through the cooling fan 59, and the cooling air in the engine compartment is optimally controlled. Since the meshed opening portion is also provided on the frame bottom plate 233, dust is prevented from entering the engine compartment and allowed to fall down by its own weight after the engine 5 is stopped.

The opening portion 233z of the frame bottom plate 233 is located at a position above the front bumper 12. Since the front bumper 12 of the travelling machine body 2 is located below the opening portion 233z of the frame bottom plate 233, when the outside air flows into the engine compartment through the opening portion 233z, the front bumper 12 prevents dust and mud from entering the engine compartment. The engine frames 14, which support the engine 5, are secured by the front bumper 12. The front bumper 12 is made of a metal casting. This configuration reinforces the support structure of the engine 5.

The rectangular frame 226 stands upright on the rear bottom plate 233y of the frame bottom plate 233 in front of the radiator 235. The frame 226, the radiator 235, and the fan shroud 234 are located above the front bumper 12, which holds the left and right engine frames 14, from the front in this order. The frame 226 is formed such that the rear surface of the frame 226 is covered with the radiator 235, and the front surface and the left and right side surfaces of the frame 226 are covered with meshed plates. Besides the above-described intercooler 224, for example, an oil cooler and a fuel cooler are located in the frame 226. The air cleaner 221 is located at the upper position on the front surface of the frame 226. With this configuration, cooling air that is drawn in from the front grille 231 flows toward the frame 226 behind the front grille 231. Thus, the cooling air cools the air cleaner 221 and also cools the intercooler, the oil cooler, or a fuel cooler in the frame 226. The cooling air from the front reaches the radiator 235, which is located on the rear surface of the frame 226. This increases the cooling effect on a coolant to be supplied to the diesel engine 5.

The radiator 235 includes a coolant discharge port at the upper section and a coolant introduction port at the lower section. The coolant discharge port of the radiator 235 communicates with a coolant introduction port of a thermostat case 70 via a coolant supply pipe 201. The coolant introduction port of the radiator 235 communicates with a coolant discharge port of a coolant pump 71 via a coolant return pipe 202. The coolant in the radiator 235 is supplied to the coolant pump 71 via the coolant supply pipe 201 and the thermostat case 70. When the coolant pump 71 is driven, the coolant is supplied to a water-cooling jacket (not shown) formed in a cylinder block 54 and a cylinder head 55 to cool the engine 5. The coolant that has contributed to cooling the engine 5 is returned to the radiator 235 via the coolant return pipe 202.

The thermostat 70 is also coupled to a warm water pipe 203, and the coolant pump 71 is also coupled to a warm water pipe 204. The coolant (warm water) that has contributed to cooling the engine 5 is circulated to an air conditioner 364 of the cabin 7. Thus, warm water circulates in the air conditioner 364 of the cabin 7, and the air conditioner 364 supplies warm air into the cabin 7. This configuration allows an operator to adjust the temperature in the cabin 7 to a desired temperature.

The front end of each of the left and right body frames 15 is coupled to the rear end of the corresponding one of the left and right engine frames 14 via a spacer 297. The left and right body frames 15 are located to sandwich the left and right engine frames 14. The sections of the pair of left and right body frames 15 located below the front section of a floor plate 40 are coupled to each other by a support beam frame 236. The coupling surface (outer side) between each body frame 15 and the support beam frame 236 is flush with the coupling surface (outer side) between each spacer 297 and the associated body frame 15. The support beam frame 236 is bolted to the left and right body frames 15 to hold the left and right body frames 15. An engine support frame 237 is mounted on the upper surface of the support beam frame 236. The lower end surface of the engine support frame 237 is bolted to the upper surface of the support beam frame 236 so that the engine support frame 237 surrounds the flywheel 61 of the diesel engine 5 together with the support beam frame 236.

Engine leg securing portions 74 are provided on left and right lower sides of the diesel engine 5. The engine leg securing portions 74 are coupled to engine support brackets 298 via engine legs 238. The engine support brackets 298 are located at the middle of the pair of left and right engine frames 14. The engine legs 238 each include a rubber vibration isolator 239. Engine leg securing portions 60*a* are provided on the upper section of a flywheel housing 60. The flywheel housing 60 is located on the rear surface of the diesel engine 5. The engine leg securing portions 60*a* are coupled to the upper surface of the engine support frame 237 via an engine leg (engine mount) 240. The engine leg 240 includes rubber vibration isolators 241.

The engine legs 238 are bolted to the upper sections of the engine support brackets 298, which are coupled to the outer side at the middle of the pair of left and right engine frames 14, with the rubber vibration isolators 239 located on the lower side. The diesel engine 5 is sandwiched between the engine frames 14 with the pair of left and right engine legs 238 so that the front section of the diesel engine 5 is supported. The rear surface of the diesel engine 5 is coupled to the front ends of the pair of left and right body frames 15 via the support beam frame 236, the engine support frame 237, and the engine leg 240 so that the rear section of the diesel engine 5 is supported by the front ends of the body frames 15. The left and right front rubber vibration isolators 239 and the left and right rear rubber vibration isolators 241 support the diesel engine 5 on the travelling machine body 2.

A pair of left and right pillar frames 242, 243 extend upright from the upper surface of the engine support frame 237 to sandwich the engine leg 240 from left and right sides. A hood shield 244 covers the rear of the hood 6. The hood shield 244 is coupled to the pair of left and right pillar frames 242, 243 such that the lower edge of the hood shield 244 is separate from the upper surface of the engine leg 240. Beam frames 248 are held between the upper sections of the fan shroud 234 and the hood shield 244. Since the fan shroud 234 and the hood shield 244, which are stably supported by the travelling machine body 2, are coupled to each other by the pair of beam frames 248, which are held between the fan shroud 234 and the hood shield 244, these members integrally configure a sturdy engine compartment frame as a whole.

The exhaust-gas purification device 52, which is mounted on the upper section of the engine 5, is located inside the rear section of the hood 6. A heat insulator 250 is located between the hood 6 and the exhaust-gas purification device 52. Since the heat insulator 250 is located above the exhaust-gas purification device 52, the temperature of the hood 6 is prevented from being increased by exhaust heat generated by the exhaust-gas purification device 52 and the diesel engine 5. A space is formed between the hood 6 and the heat insulator 250 to insulate the inside of the engine compartment below the heat insulator 250 from the outside air. This configuration allows the exhaust-gas purification device 52 to be operated under a high-temperature environment.

Furthermore, the hood shield 244, which is located on the rear side of the hood 6 and covers at least the exhaust-gas purification device 52 from the rear surface, is provided in addition to the above-described heat insulator 250. Since heat in the engine compartment below the hood 6 is insulated by the hood shield 244 together with the heat insulator 250, the temperature inside the cabin 7 is prevented from being increased by the exhaust heat from the engine compartment. Also, a gap between the hood shield 244 and the heat insulator 250 makes it unlikely that heat is kept in the engine compartment below the hood 6. This inhibits heat damage on, for example, the exhaust-gas purification device 52 itself and the hood 6.

Extendable gas springs (hood dampers) 256, 256 are located on the left and right sides of the heat insulator 250 below the hood 6. One end (rear end) of each of the pair of left and right gas springs 256, 256 is pivotally attached to the engine compartment frame, and the other end (front end) of each of the gas springs 256, 256 is pivotally attached to the inner surface of the upper section of the hood 6. The hood 6 is held in an open position by the tension of the gas springs 256. Thus, when the front portion of the hood 6 is lifted to open the hood 6 with the upper end position of the hood shield 244 serving as a shaft fulcrum, the gas springs 256 keep the hood 6 in the open state. In this state, maintenance of the diesel engine 5 can be performed.

Figure 10:
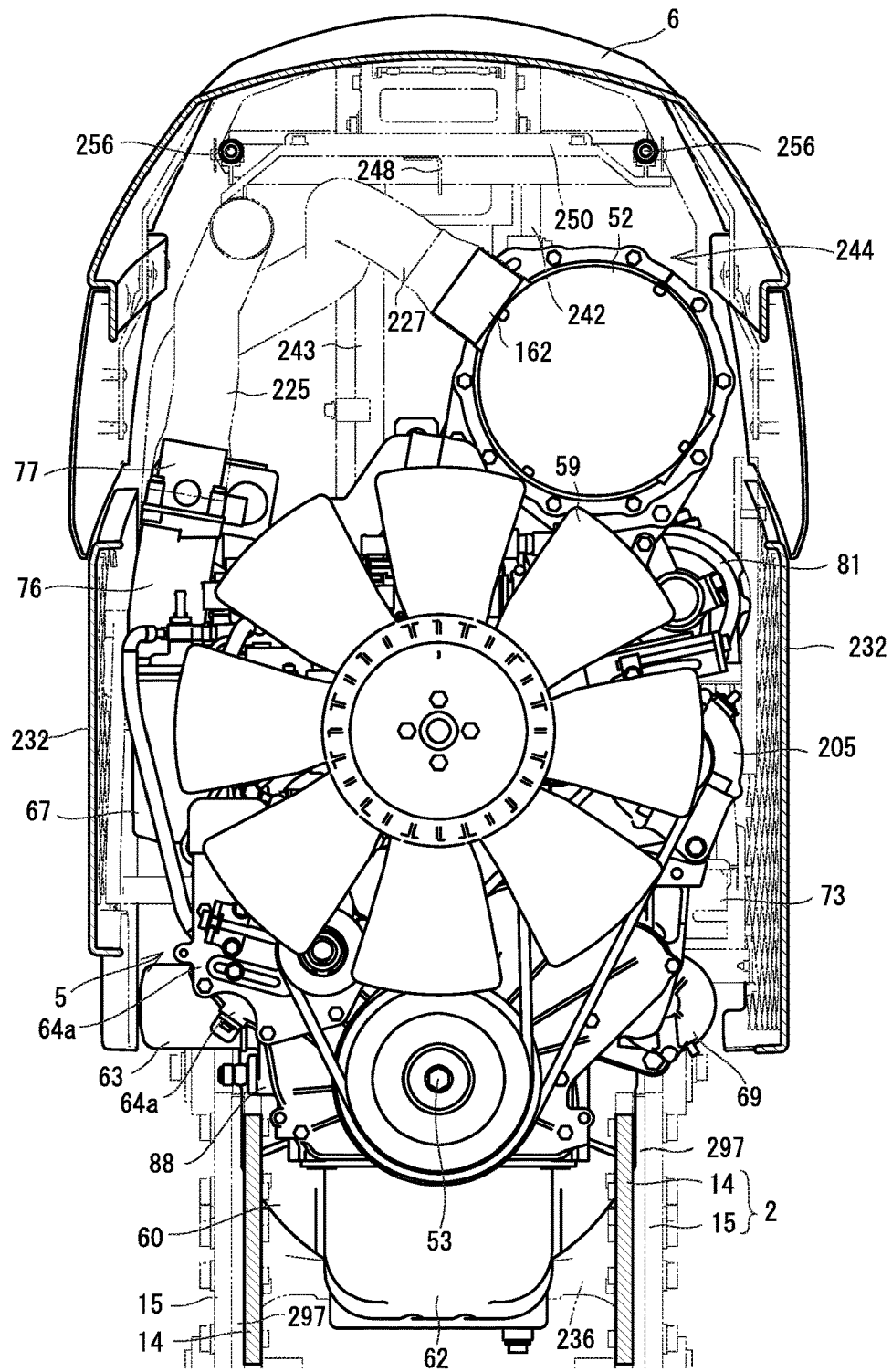
FIG. 10 is a cross-sectional view of the work vehicle illustrating the configuration inside the engine compartment as viewed from the front.
Figure 11:
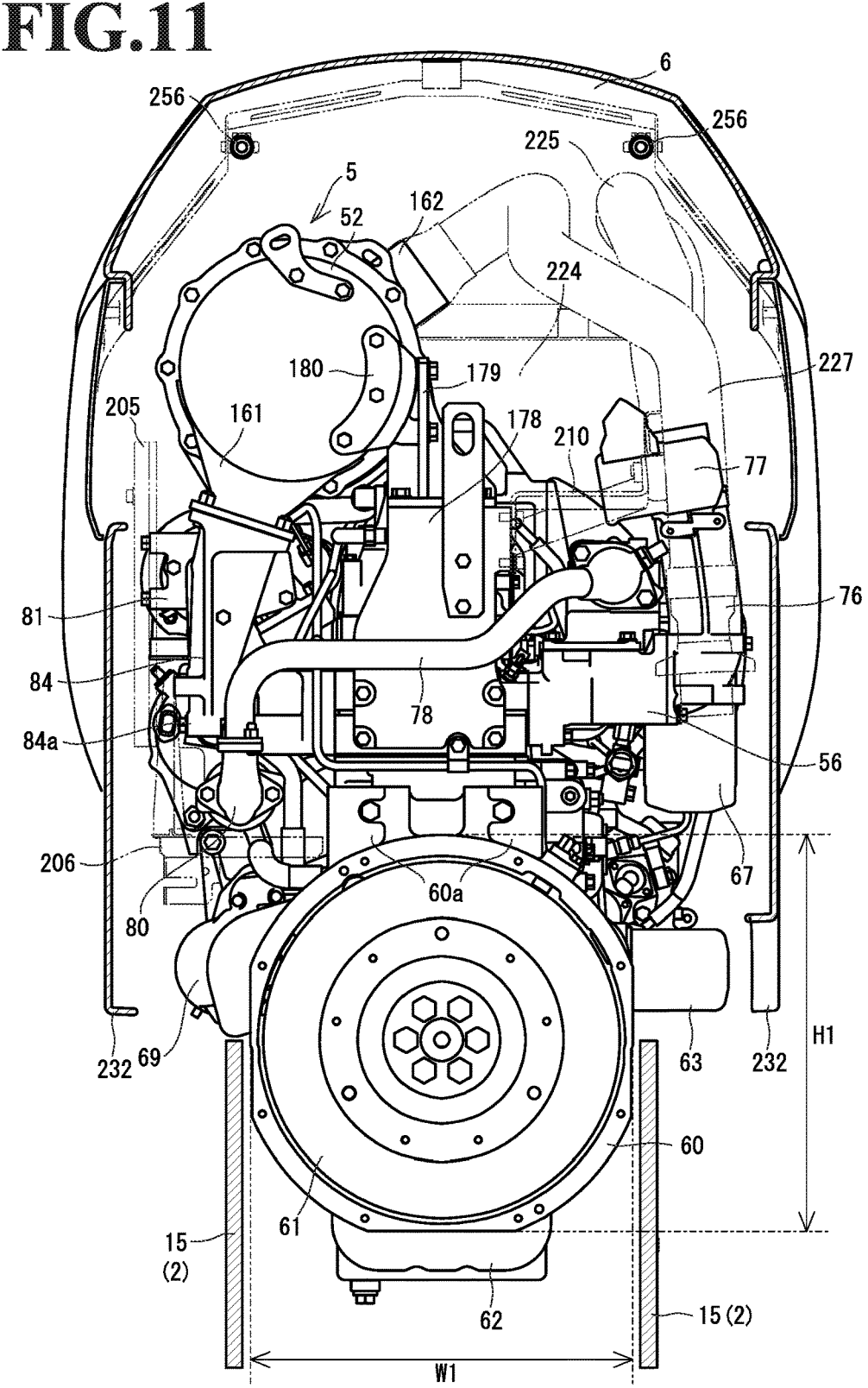
FIG. 11 is a cross-sectional view of the work vehicle illustrating the configuration inside the engine compartment as viewed from the rear.
Figure 12:
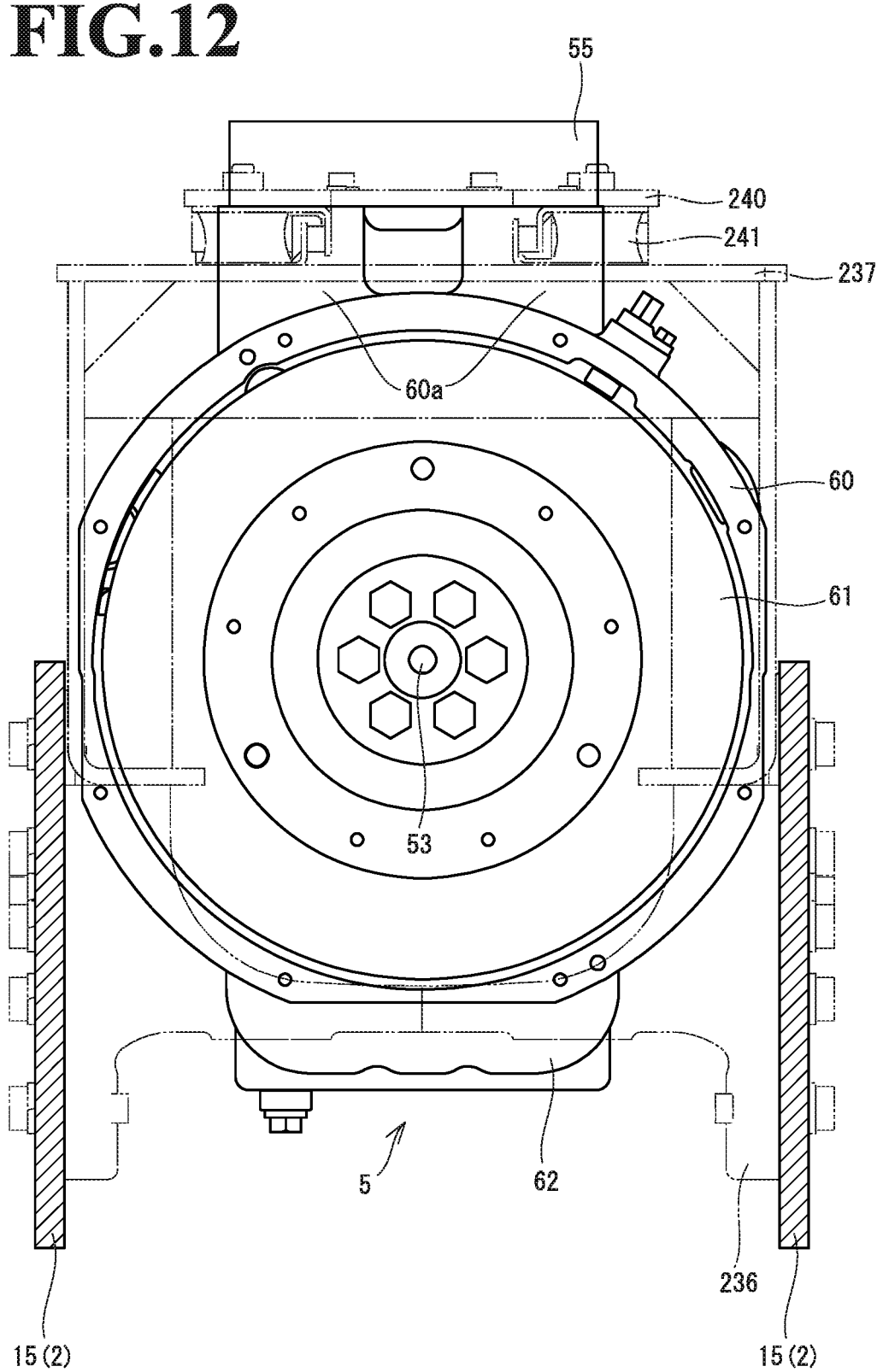
FIG. 12 is a partially enlarged view of the work vehicle illustrating the relationship between the travelling machine body and the flywheel housing.

As illustrated in FIGS. 10 to 12, the hood 6 of the tractor 1 has an inverted U-shaped cross-section. Since the left and right corners of the hood 6 are chamfered to incline diagonally and outwardly downward to the left and right as viewed from the front, the forward view of the operator seated in the operator's seat 8, in particular, the view ahead of the left and right of the hood 6 is improved. While the exhaust-gas purification device (DPF) 52 and the exhaust connecting pipe 84 oppose the left side inner wall of the hood 6, the intake connecting pipe 76 opposes the right side inner wall of the hood 6. While the exhaust connecting pipe 84 is located at a position facing the left side engine cover 232, the intake connecting pipe 76 is located at a position facing the right side engine cover 232.

As illustrated in FIGS. 10 and 11, the intake connecting pipe 76, which includes a hollow portion and supplies fresh air to an intake manifold 56, is configured to be tilted toward the cylinder head 55 as the intake connecting pipe 76 extends upward. The intake connecting pipe 76 extends upward from the intake manifold 56. That is, a fresh air introduction port located at the upper end of the intake connecting pipe 76 is offset with respect to a fresh air discharge port located at the lower end of the intake connecting pipe 76 toward the output shaft 53 of the engine 5 (center position of the engine 5). The intake connecting pipe 76 is arranged to be in conformance with the shape of the hood 6 that narrows upward, and an intake throttle member 77 is located closer to the center position of the hood 6 than the intake connecting pipe 76 between the upper section of the engine 5 and the inner surface of the hood 6. This configuration not only reduces the designed length of the downstream relay pipe 225, which connects a fresh air discharge side of the intercooler 224 to the intake throttle member 77, but also allows the downstream relay pipe 225 to be compactly accommodated in the hood 6, which has an upwardly decreasing lateral width.

As illustrated in FIGS. 10 and 11, the exhaust connecting pipe 84, which includes a hollow portion that supplies exhaust gas from the exhaust manifold 57 to the exhaust-gas purification device 52, is configured to be tilted toward the cylinder head 55 as the exhaust connecting pipe 84 extends upward. The exhaust connecting pipe 84 is coupled to the exhaust gas inlet pipe 161 of the exhaust-gas purification device 52 to support the exhaust-gas purification device 52. That is, the exhaust gas discharge port at the upper end of the exhaust connecting pipe 84 is offset toward the output shaft 53 of the engine 5 (center position of the engine 5) with respect to a coupling support portion 84a at the lower end of the exhaust connecting pipe 84. The coupling support portion 84a is coupled to the exhaust manifold 57 at the lower end. The exhaust gas inlet pipe 161 of the exhaust-gas purification device 52 is tilted toward the outer side of the engine 5 (toward the inner wall of the hood 6) as the exhaust gas inlet pipe 161 extends downward (toward an inlet flange 161a).

The exhaust-gas purification device 52 and the exhaust connecting pipe 84 are arranged to be in conformance with the shape of the hood 6 that narrows upward, and the exhaust-gas purification device 52 is supported at a position closer to the center of the engine 5 between the upper section of the engine 5 and the inner surface of the hood 6. Thus, the exhaust-gas purification device 52 is compactly accommodated in the hood 6, which has an upwardly decreasing lateral width. Supporting the exhaust-gas purification device 52, which is a heavy object, at a position closer to the center of gravity of the engine 5 inhibits increase in, for example, vibration and noise of the engine 5 caused by mounting the exhaust-gas purification device 52. This configuration also reduces influence on the shape of the hood 6 caused by mounting the exhaust-gas purification device 52 on the engine 5 and prevents the shape of the hood 6 from becoming complicated.

As illustrated in FIGS. 11 and 12, the width W1 of the flywheel housing 60, which covers the flywheel 61, is narrower than the height H1. The flywheel 61 is located on the end surface that intersects the core of the engine output shaft 53. Since the width of the flywheel housing 60 is narrow, the engine 5 can be mounted on the travelling machine body 2, which has a narrow lateral width, without interference by the flywheel housing 60. In the travelling machine body 2, each body frame 15 is provided on the outer side of the associated engine frame 14 via the associated spacer 293. Thus, the width between the left and right body frames 15 is wider than the width between the left and right engine frames 14. The flywheel housing 60 is located at the rear of the engine 5. The main transmission-shift input shaft 28 of the transmission case 17, which is coupled to the body frames 15, is coupled to the flywheel 61. Thus, the flywheel housing 60, which has the greatest lateral width in the engine 5, is sufficiently located between the body frames 15. This prevents the flywheel housing 60 from colliding with the travelling machine body 2, which has a different vibration system, and thus prevents failure or breakage of the engine 5.

The flywheel housing 60 has an outline in which the left and right parts of a circle are cut off and in which the seat-like engine leg securing portions 60a project from the upper section. The engine leg securing portions 60a at the upper section are coupled to the travelling machine body 2 via the engine leg 240 at the rear portion. The flywheel housing 60 is not only mountable on the travelling machine body 2 having a narrow width, but also includes the seat-like engine leg securing portions 60a that are capable of being coupled to the travelling machine body 2. Thus, coupling the flywheel housing 60 having a high rigidity to the travelling machine body 2 reinforces for the rigidity achieved by the support structure of the engine 5.

More particularly, the inverted U-shaped engine support frame 237 is provided above the support beam frame 236, which is held between the pair of left and right body frames 15. The flywheel housing 60 and the engine support beam frame 237 are arranged next to each other in the fore-and-aft direction. While the rear section of the engine leg 240 is coupled to the upper surface of the engine support frame 237 via the rubber vibration isolators 241, the front section of the engine leg 240 is coupled to the upper surface of the engine leg securing portions 60a on the flywheel housing 60.

Figure 13:
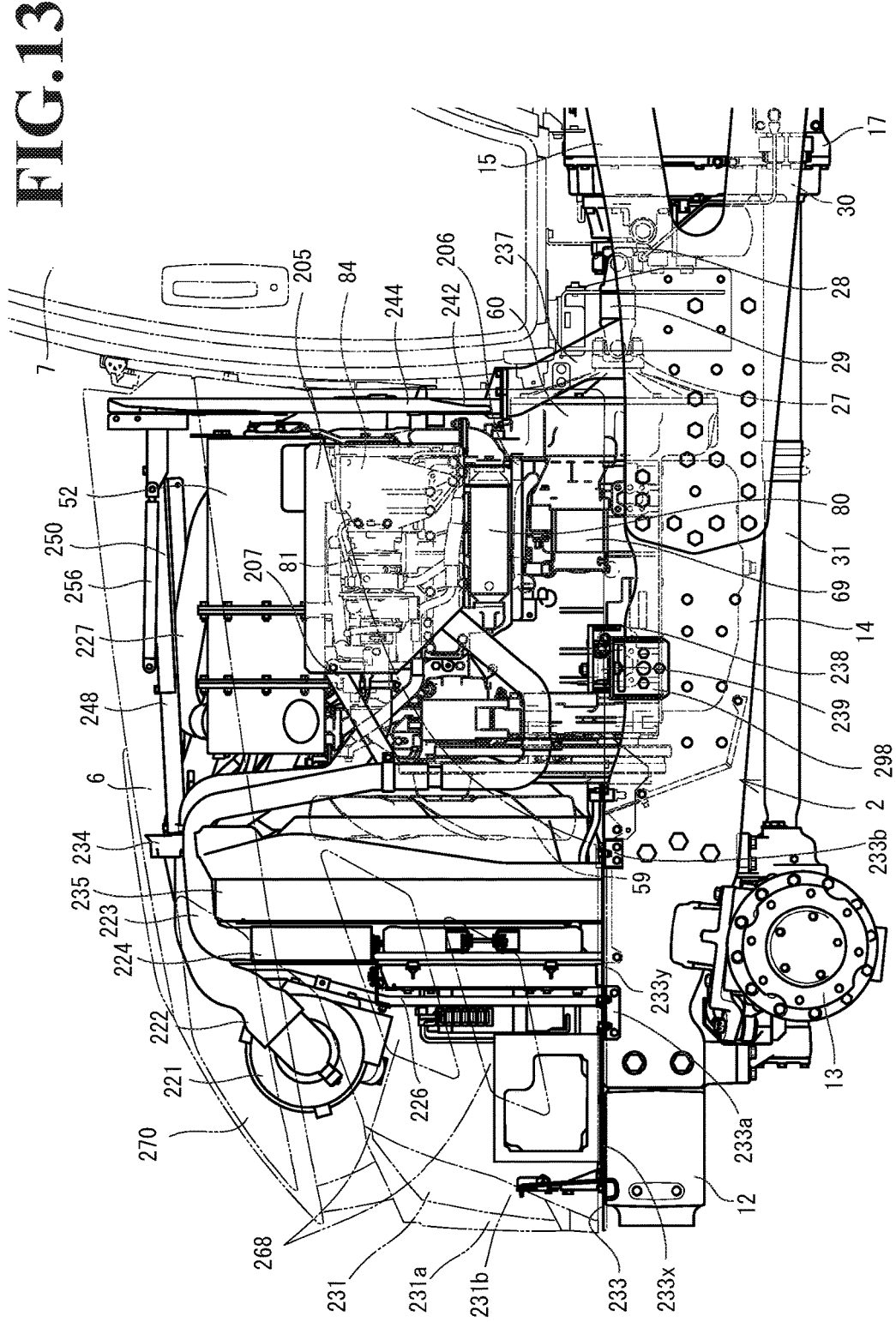
FIG. 13 is a left side enlarged view of the work vehicle illustrating the configuration inside the engine compartment.
Figure 14:
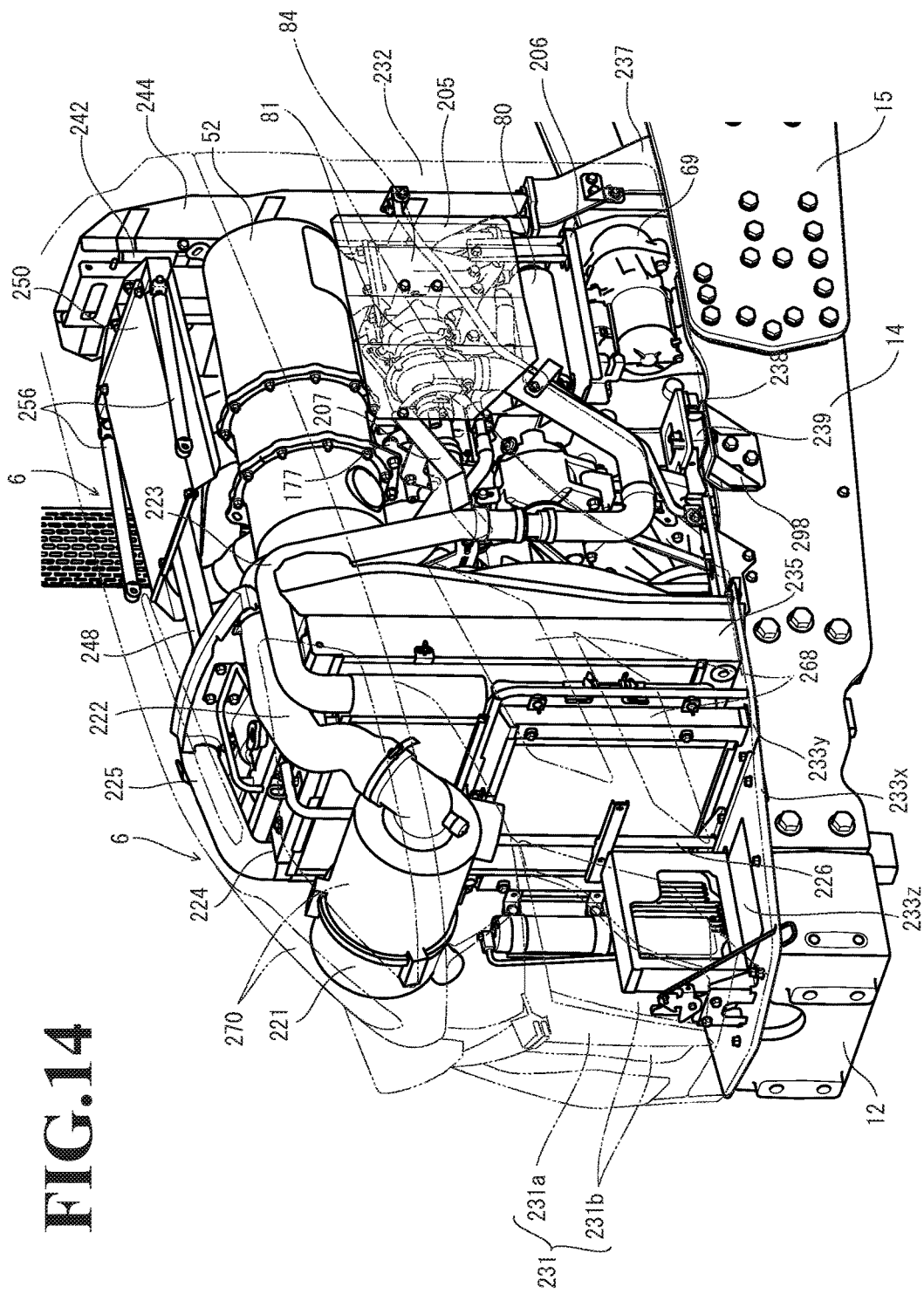
FIG. 14 is a left side enlarged perspective view of the work vehicle illustrating the configuration inside the engine compartment.

As illustrated in FIGS. 11 and 13, a perforated shield 205 is located below the exhaust-gas purification device (DPF) 52. The perforated shield 205 covers the left side of the engine 5. Since the shield 205 is configured to cover the exhaust manifold 57, the turbocharger 81, and the exhaust connecting pipe 84, high-heat sources in the engine 5 are covered with the shield 205. Thus, the temperature of the exhaust gas supplied to the DPF 52 is maintained high, and decrease in the regeneration ability of the DPF 52 is prevented. Since the shield 205 is perforated and located to face the similarly perforated left side engine cover 232, some of air heated by the engine 5 is discharged to the outside through the shield 205 and the engine cover 232. This configuration prevents heat retention on the left side of the engine 5 where the temperature becomes relatively high.

The shield 205 is bolted to the exhaust gas introduction port side of the exhaust connecting pipe 84 (coupling portion coupled to the turbine case 82 of the turbocharger 81) and coupled to a rear component coupling portion 182d of an outlet side second bracket 182 via a shield securing bracket 207 to be supported by the engine 5. The shield securing bracket 207 is also coupled to the upstream relay pipe 223, which connects the fresh air introduction port of the intercooler 224 to the compressor case 83 of the turbocharger 81, and the upstream relay pipe 223 is also supported by the outlet side second bracket 182 of the engine 5.

As illustrated in FIGS. 11 and 13, a heat insulating member 206 is coupled to one side of the engine 5. The heat insulating member 206 is provided below the exhaust manifold 57, and an engine starter 69 is located below the heat insulating member 206. The heat insulating member 206, which is coupled to the left side of the cylinder block 54, extends upright toward the engine cover 232 at a position between the engine starter 69 and the EGR cooler 80. Thus, the heat insulating member 206 covers over the electric device, which is the starter 69 in this embodiment. This reduces thermal influence on the starter 69 caused by heat dissipation from the exhaust manifold 57 that is heated and prevents failure of the electric device, which is the starter 69 in this embodiment.

Figure 15:
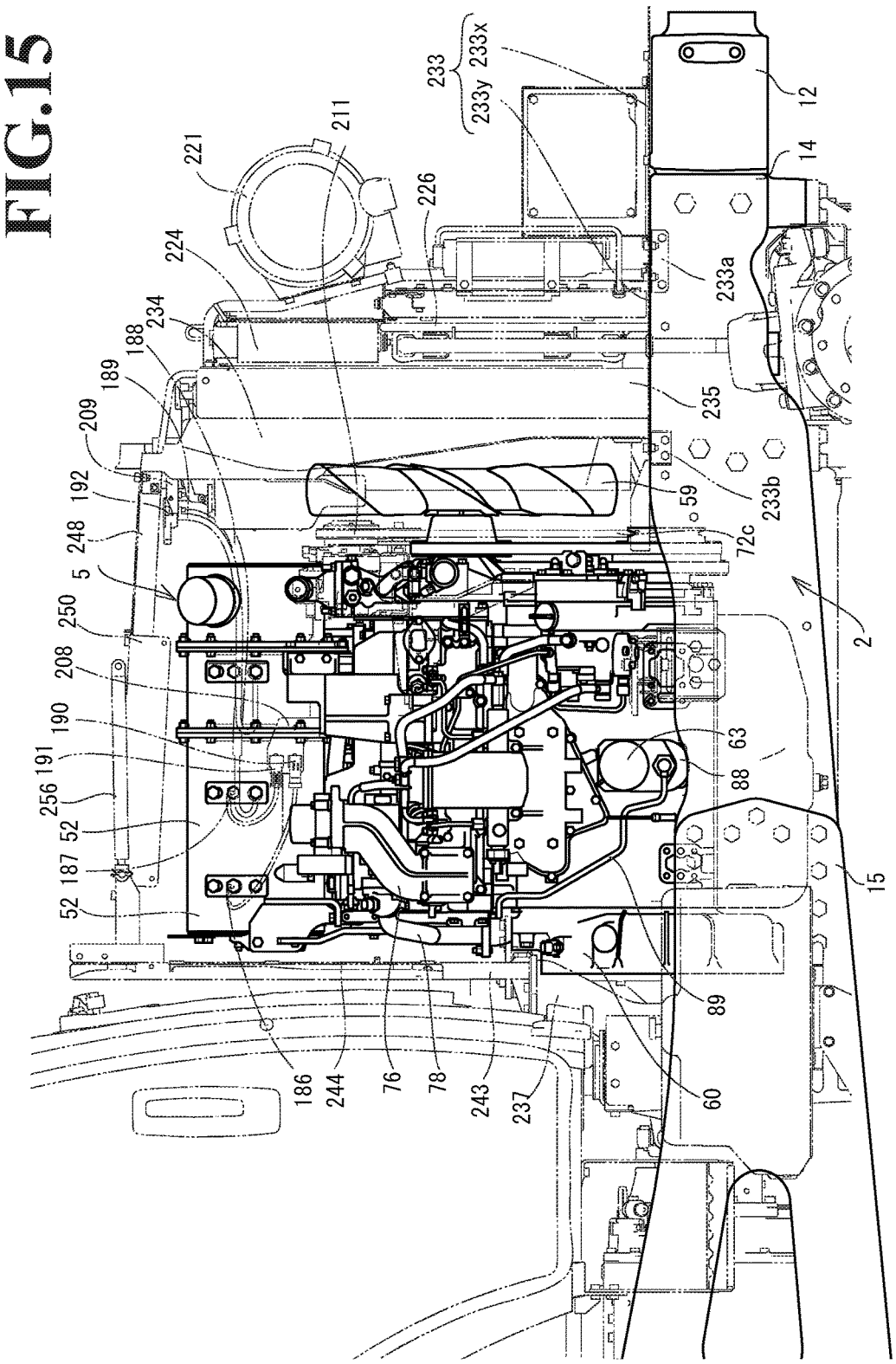
FIG. 15 is a right side enlarged view of the work vehicle illustrating the configuration inside the engine compartment.
Figure 16:
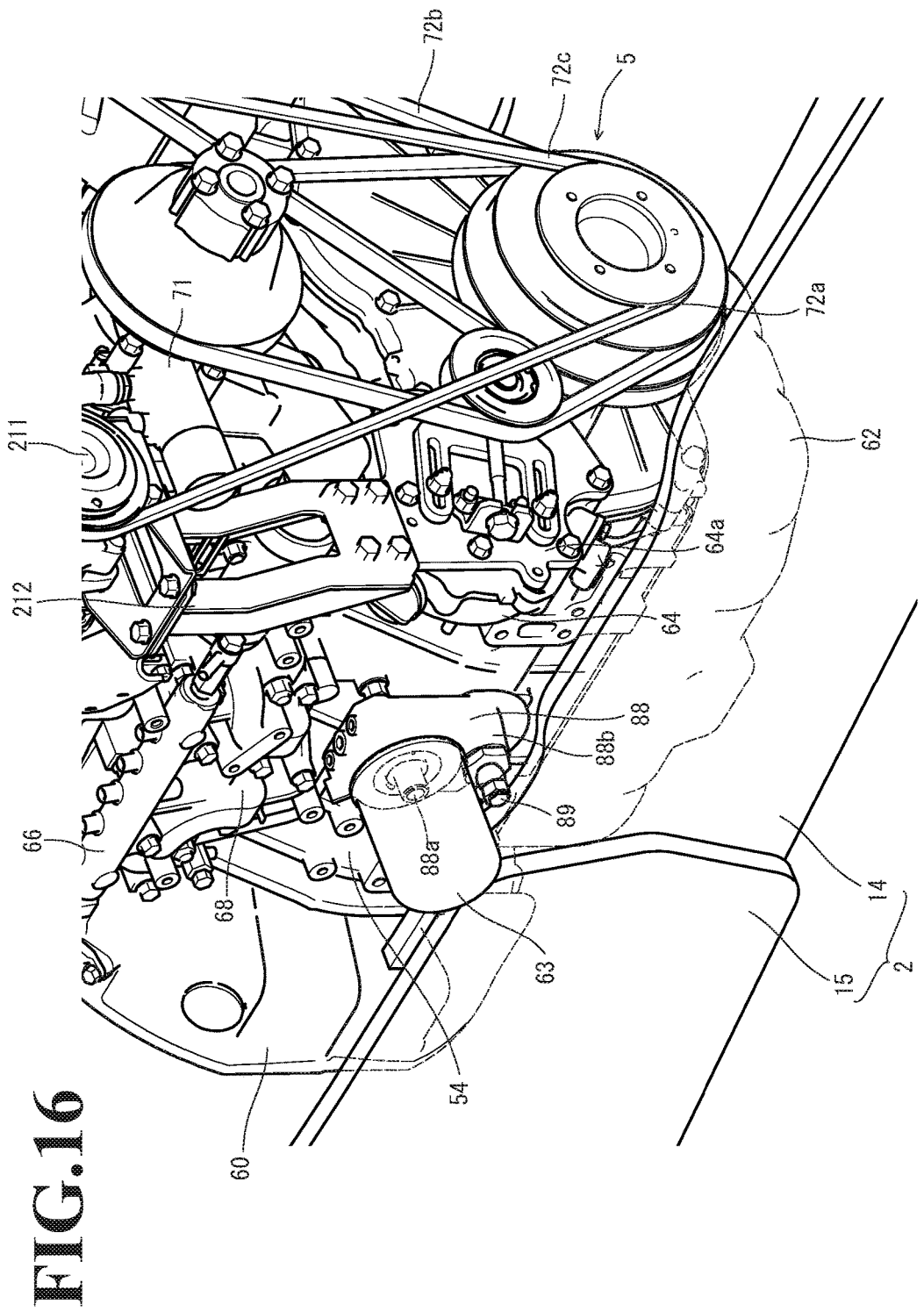
FIG. 16 is a partially enlarged view of the work vehicle illustrating the relationship between the travelling machine body and the oil filter.
Figure 17:
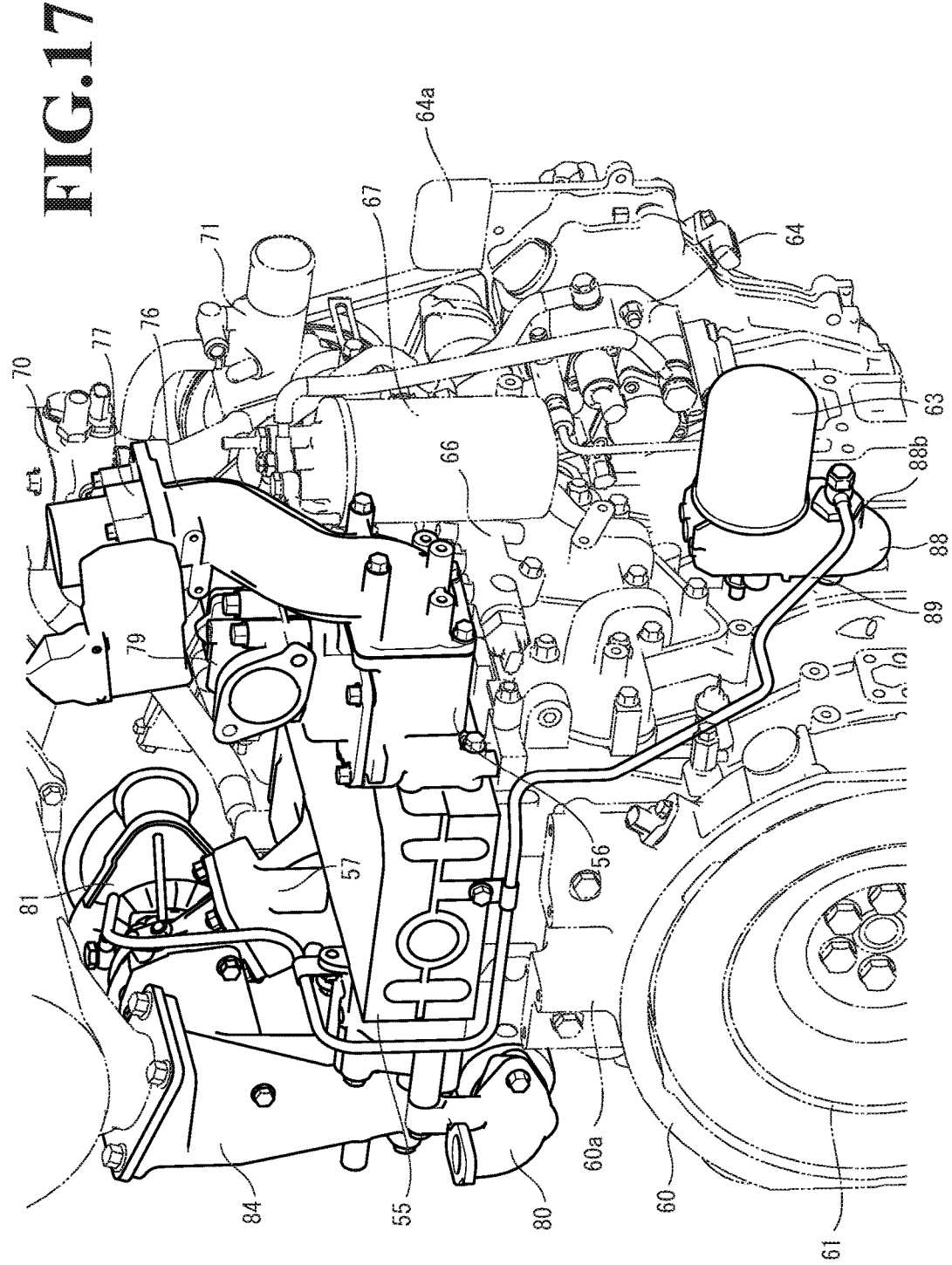
FIG. 17 is a partially enlarged view of the diesel engine of the work vehicle illustrating the relationship between the forced induction device and the oil filter.

As illustrated in FIGS. 15 to 17, an oil filter 63 is located on the lower right side of the cylinder block 54 via an oil filter support member (support bracket) 88. The oil filter 63 filters lubrication oil from an oil pan 62. The oil support member 88 includes a hollow portion for allowing the lubrication oil to pass through the oil filter support member 88. An oil pump (not shown) is located on the front side (close to the cooling fan 59) at a section closer to the right side in the cylinder block 54, and an oil passage (not shown) extends rearward from the oil pump (not shown). One side (left side) of the oil filter support member 88 is coupled to the coupling port (oil filter securing position) that communicates with the above-described oil passage provided in the cylinder block 54. The oil filter 63 is secured to the upper section of the other side (right side) of the oil filter support member 88.

When the oil filter 63 is secured to the cylinder block 54, the oil filter support member 88 is provided in between. Thus, the oil filter 63 is arranged at a position higher than the original securing position in the cylinder block 54. This prevents the oil filter 63 from interfering with the travelling machine body 2 even if the engine 5 is mounted on the travelling machine body 2 having a narrow lateral width. That is, as illustrated in FIGS. 15 and 16, the oil filter 63 is located above the engine frame 14 due to the existence of the oil filter support member 88. Thus, the oil filter 63 is accessible and can be replaced easily.

The engine side coupling portion is provided on one side (left side) of the oil filter support member 88 to be coupled to the coupling port (oil filter securing position) provided in the cylinder block 54. Also, a filter coupling portion 88*a* and a lubrication oil outlet 88*b* are vertically arranged on the other side (left side) of the oil filter support member 88. The filter coupling portion 88*a* is coupled to the oil filter 63. The lubrication oil outlet 88*b* discharges lubrication oil to an external component.

The oil filter support member 88 includes an oil passage (not shown) formed in the oil filter support member 88. Lubrication oil that is drawn in from the oil pan 62 by the oil pump (not shown) is received through the oil passage (not shown) in the cylinder block 54 and supplied to the oil filter 63. The lubrication oil that has been filtered by the oil filter 63 is circulated to the cylinder block 54 and supplied to the lubrication parts of the engine 5. At this time, some of the lubrication oil filtered by the oil filter 63 is supplied to the external component through the lubrication oil outlet 88*b* via a lubrication oil supply pipe 89. Since part of a lubrication oil passage from the oil filter 63 to the external component is formed by the oil passage in the oil filter support member 88, the oil filter support member 88 serves multiple functions. This configuration reduces the number of components of the engine apparatus.

In this embodiment, as illustrated in FIG. 16, the lubrication oil introduction port of the turbocharger 81 is coupled to the lubrication oil outlet 88*b* of the oil filter support member 88 via the lubrication oil supply pipe 89. The turbocharger 81 includes an oil passage for supplying lubrication oil to a floating metal bearing. The lubrication oil supply pipe 89, which communicates with the lubrication oil outlet 88*b* of the oil filter support member 88, is located along the right side of the cylinder block 54 and the rear and left surfaces of the cylinder head 55 and is coupled to the oil passage (oil passage for supplying lubrication oil to the floating metal bearing) provided in the turbocharger 81.

Figure 18:
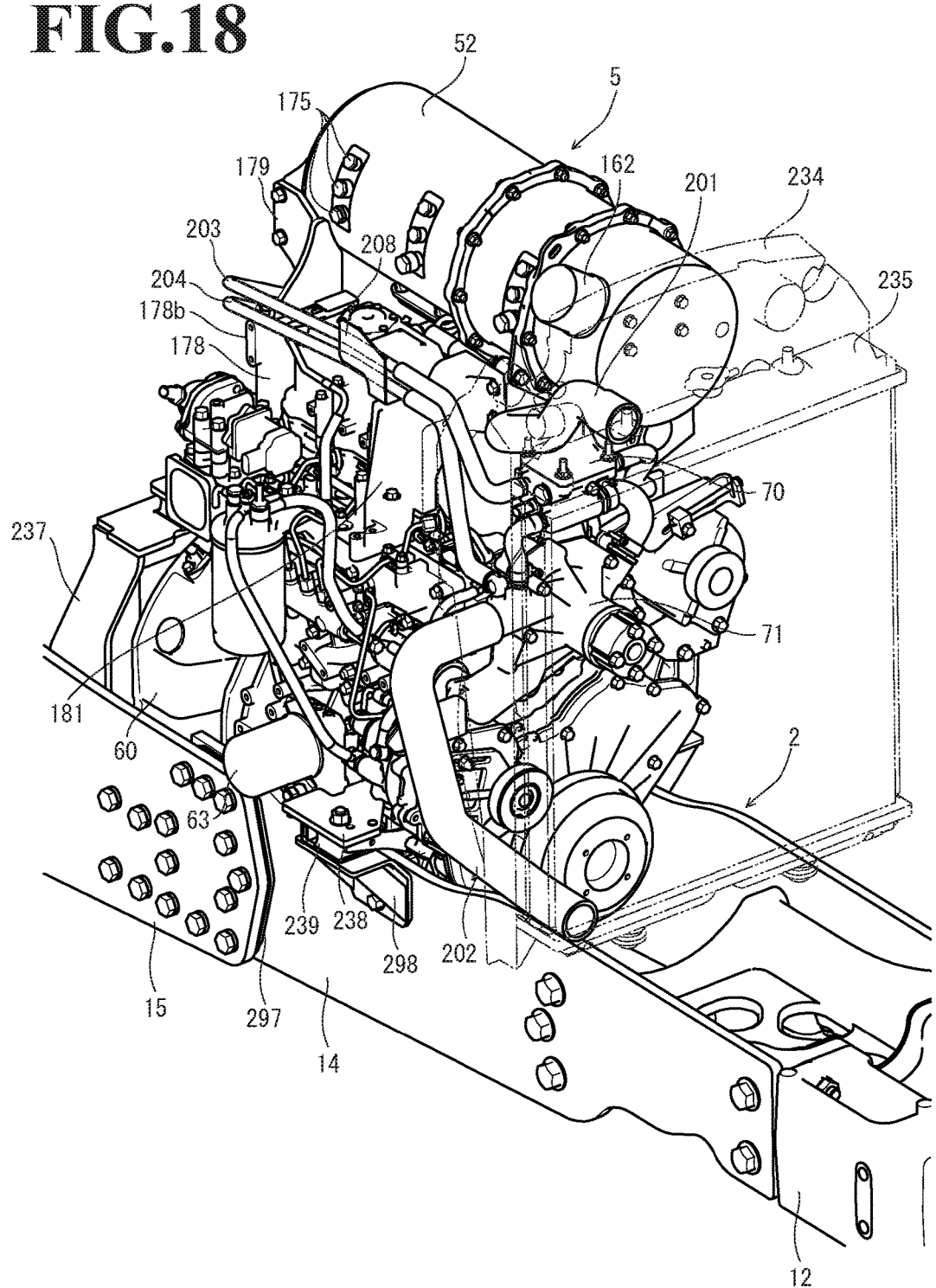
FIG. 18 is a front perspective view of the diesel engine and the radiator illustrating the relationship between the diesel engine and the radiator.
Figure 19:
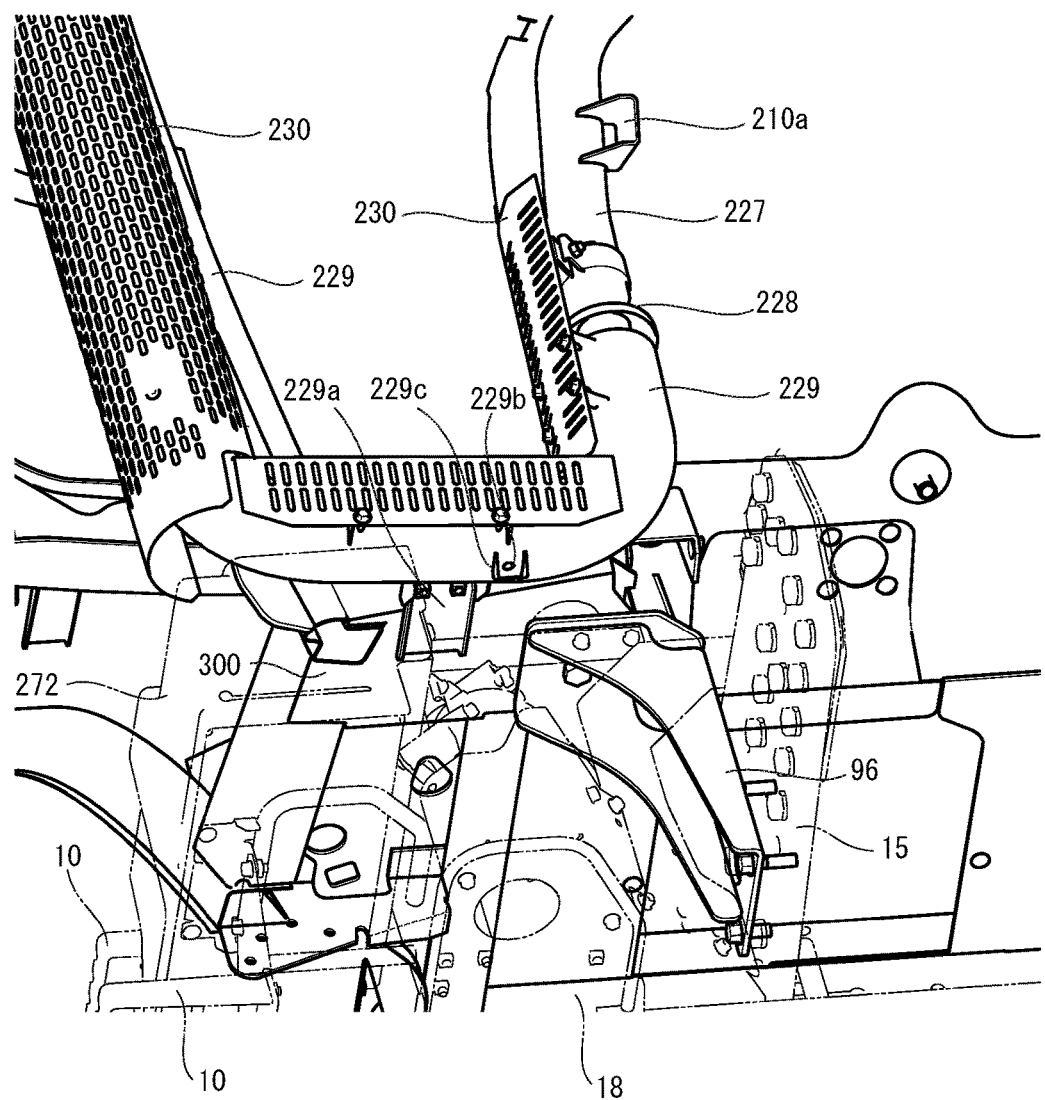
FIG. 19 is a bottom perspective view of the tailpipe illustrating the configuration of the lower section of the tail pipe.
Figure 20:
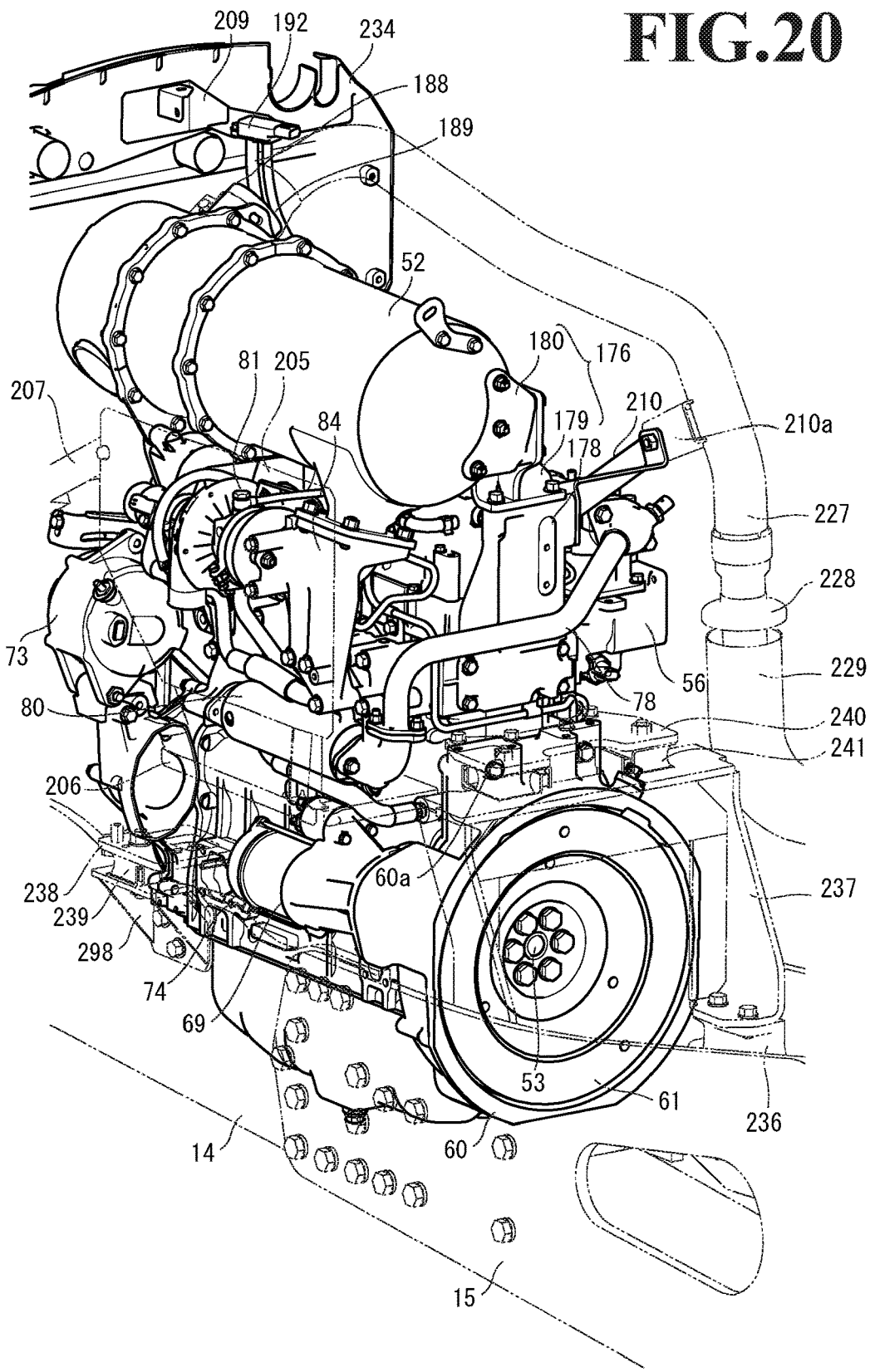
FIG. 20 is a rear perspective view of the engine compartment illustrating the positional relationship between components in the engine compartment.

As illustrated in FIG. 18, the engine 5 includes the thermostat case 70, which is located below the exhaust gas outlet side of the exhaust-gas purification device 52, and the coolant pump 71, which is located below the thermostat case 70 and between the cooling fan 59 and the cylinder head 55. The coolant inlet (coolant introduction port) of the thermostat case 70, which is above the coolant pump 71, is oriented rightward of the cylinder head 55. The cooling fan 59 is located above the travelling machine body 2, and the cooling fan 59 and the coolant pump 71 are arranged to be coaxial. Thus, the engine components are compactly arranged, and the size of the engine 5 is reduced. The engine 5 is thus capable of being mounted on a travelling vehicle that has a limited engine compartment shape like the tractor 1 of this embodiment.

The coolant inlet that is bent rightward above the thermostat case 70 communicates with the coolant outlet (coolant discharge port) at the upper section of the radiator 235 via the coolant supply pipe 201. The radiator 235 is located forward of the engine 5 with the fan shroud 234 located in between. Also, the coolant discharge port of the coolant pump 71 projects rightward from the main body of the coolant pump 71 and communicates with the coolant introduction port at the lower section of the radiator 235 via the coolant return pipe 202. The coolant supply pipe 201 and the coolant return pipe 202, which are coupled to the radiator 235, are both arranged on the right side of the engine 5. This configuration not only reduces thermal influence on the coolant caused by exhaust heat from the engine 5, but also improves workability in assembly and disassembly.

As illustrated in FIGS. 18 to 22, the warm water pipes 203, 204, which circulate warm water (coolant) to the air conditioner 364, are respectively coupled to the thermostat 70 and the coolant pump 71. The warm water pipes 203, 204 extend rearward on the right side position of the exhaust-gas purification device 52 and are coupled to the air conditioner 364 in the cabin 7. That is, the warm water pipes 203, 204, which are coupled to the thermostat 70 and the coolant pump 71 on the right side, extend rearward in a bundle located one above the other. The warm water pipes 203, 204 are also arranged to pass above a bent portion (middle portion) 181*c* of an outlet side first bracket 181. The warm water pipes 203, 204 are coupled to a middle component coupling portion 181*d* on the bent portion 181*c* of the outlet side first bracket 181 via a warm water pipe securing bracket 208 to be supported by the engine 5.

The DPF 52 includes temperature sensors 186, 187, which detect exhaust gas temperature that flows through a gas purification housing 168. The temperature sensors 186, 187 are, for example, thermistor temperature sensors. The temperature sensors 186, 187 are inserted in the gas purification housing 168 and include wiring connectors 190, 191 for outputting measurement signals. The wiring connectors 190, 191 of the temperature sensors 186, 187 are secured to the warm water pipe securing bracket 208. The warm water pipe bracket 208 is configured by a plate that is bent into an L-shape and extends upright from the bent portion 181c of the outlet side first bracket 181 to be parallel to the DPF 52.

While the warm water pipes 203, 204 are secured to the left side (side facing the DPF 52) of the warm water pipe securing bracket 208, the wiring connectors 190, 191 are secured to the right side (side further from the DPF 52) of the warm water pipe securing bracket 208. The warm water pipes 203, 204, which supply coolant (warm water) that has contributed to cooling the engine 5 to an external device such as the air conditioner 364, are provided close to the DPF 52. This prevents decrease in the coolant temperature supplied to the external device. Providing a component to stand on the outer side of the warm water pipe securing bracket 208 insulates the heat of exhaust heat from the DPF 52. The electric components, which are the wiring connectors 190, 191 in this embodiment, are arranged on the further side of the warm water pipe securing bracket 208 from the DPF 52. This reduces influence caused by the exhaust heat from the engine 5 and the DPF 52, prevents failure caused by heat, and simultaneously inhibits noise from being superimposed on the output signal.

Figure 21:
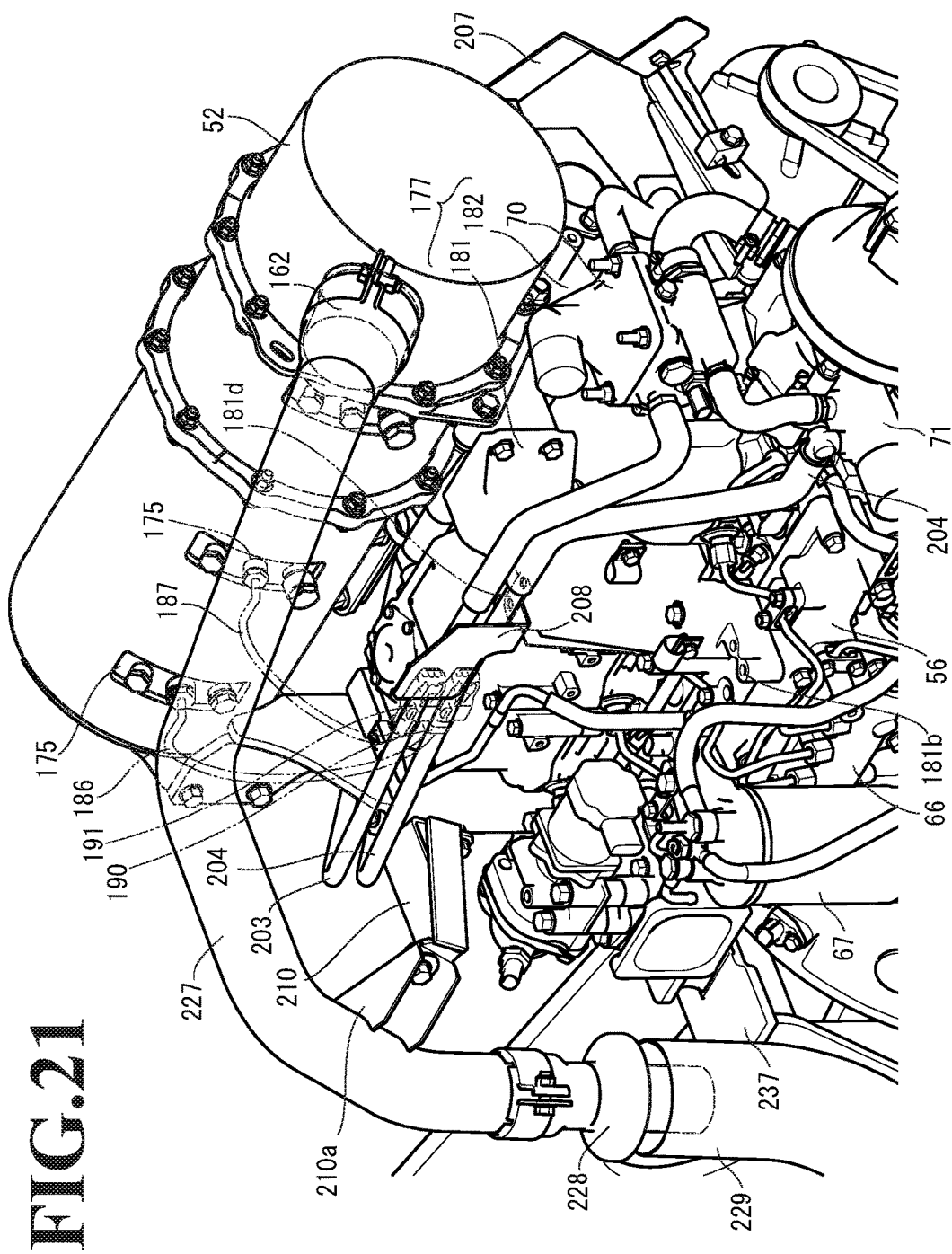
FIG. 21 is an enlarged perspective view of the diesel engine and the tailpipe illustrating the coupling relationship between the diesel engine and the tailpipe.
Figure 22:
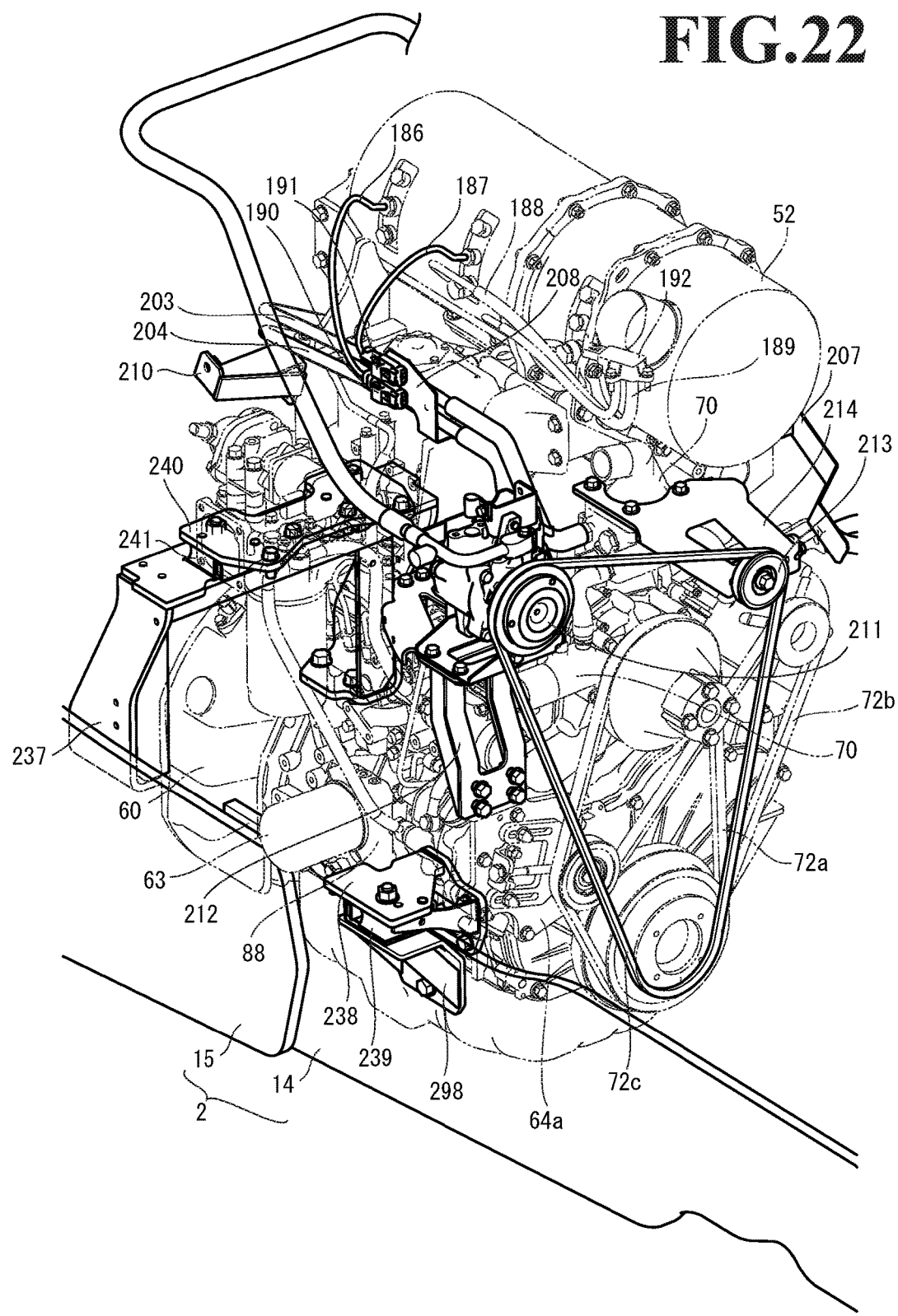
FIG. 22 is a front perspective view of the diesel engine illustrating the arrangement position of the components attached to the diesel engine.
Figure 23:
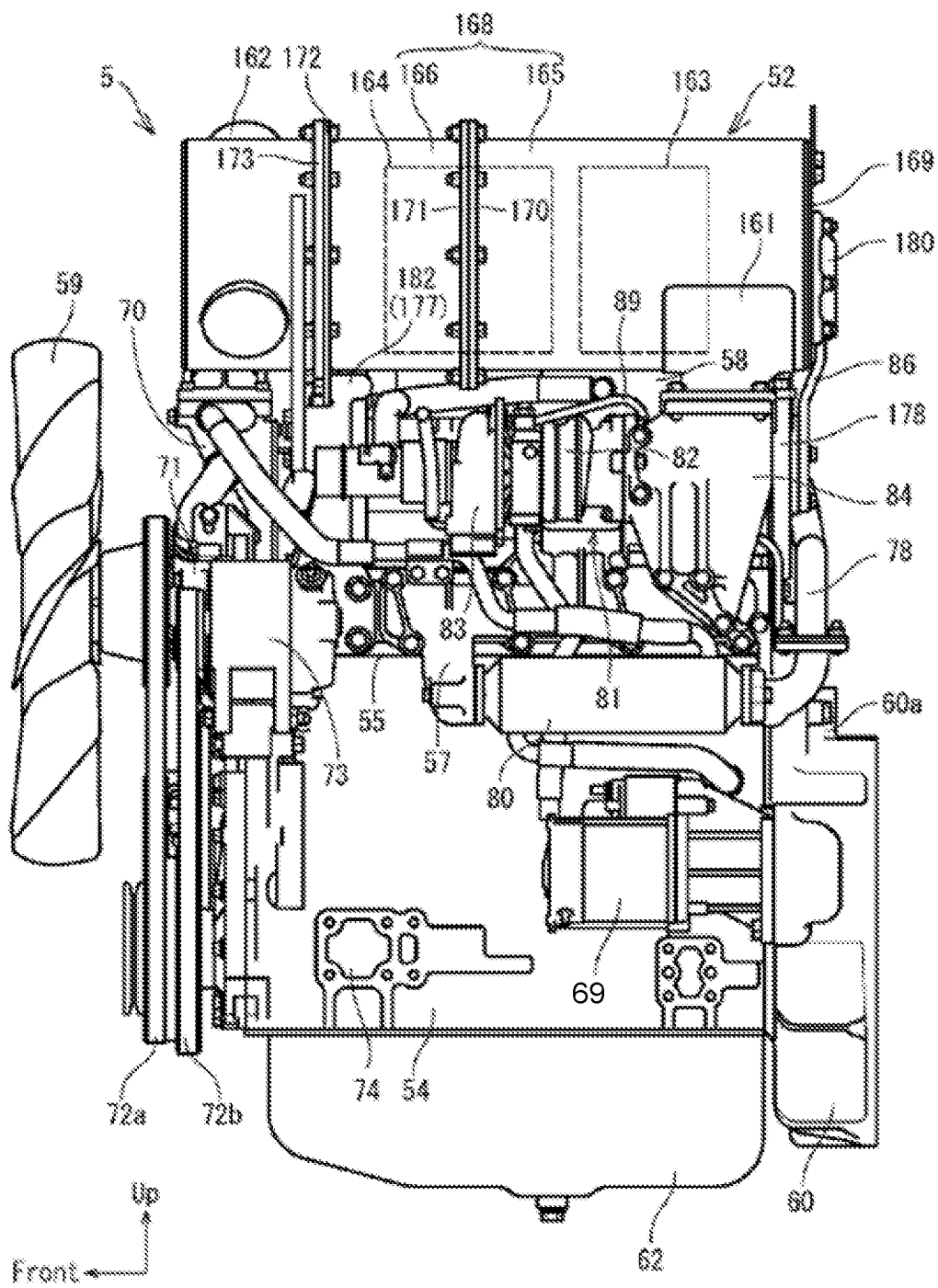
FIG. 23 is a left side view of the diesel engine mounted on the work vehicle according to the invention of the present application.
Figure 24:
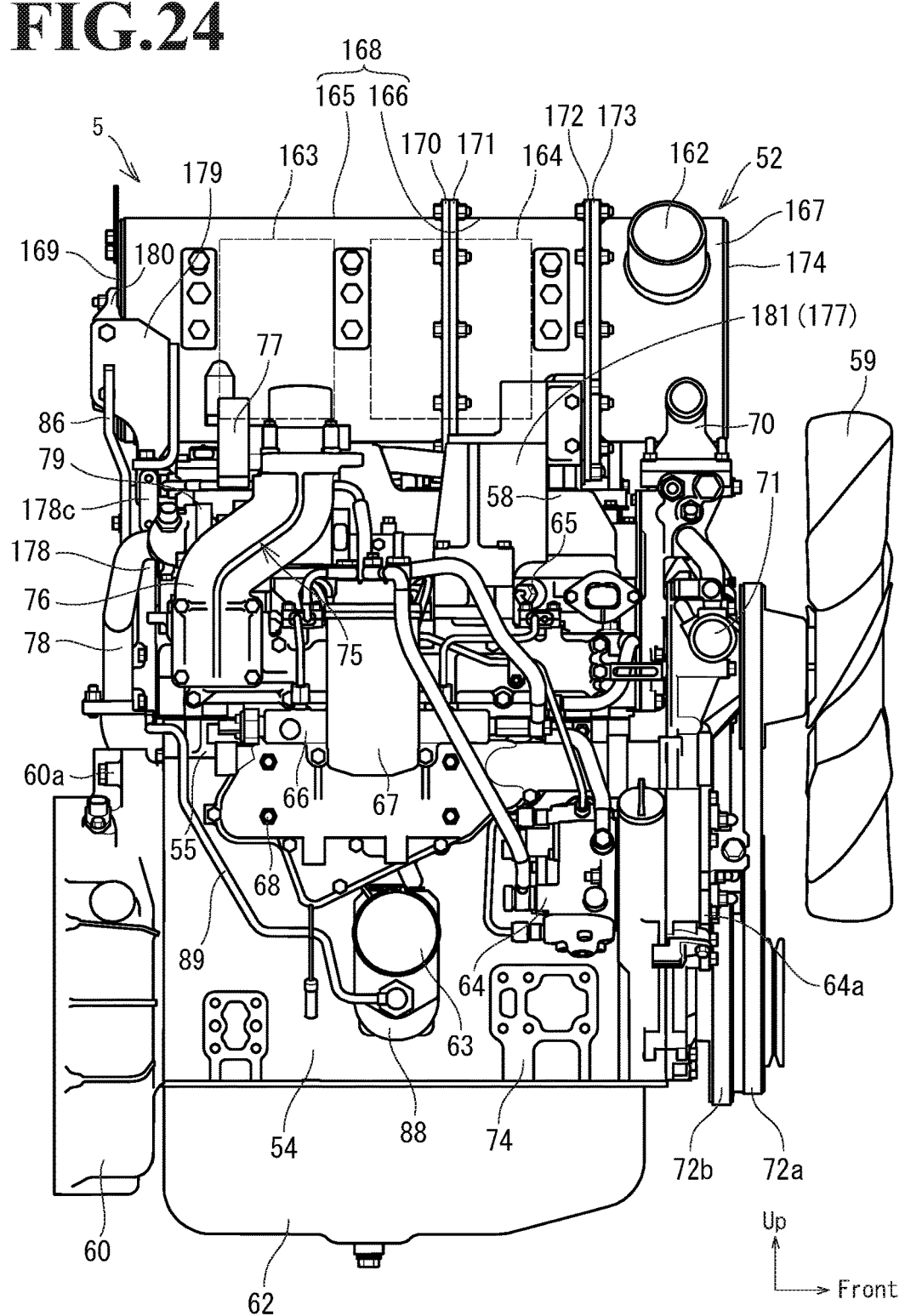
FIG. 24 is a right side view of the diesel engine.
Figure 25:
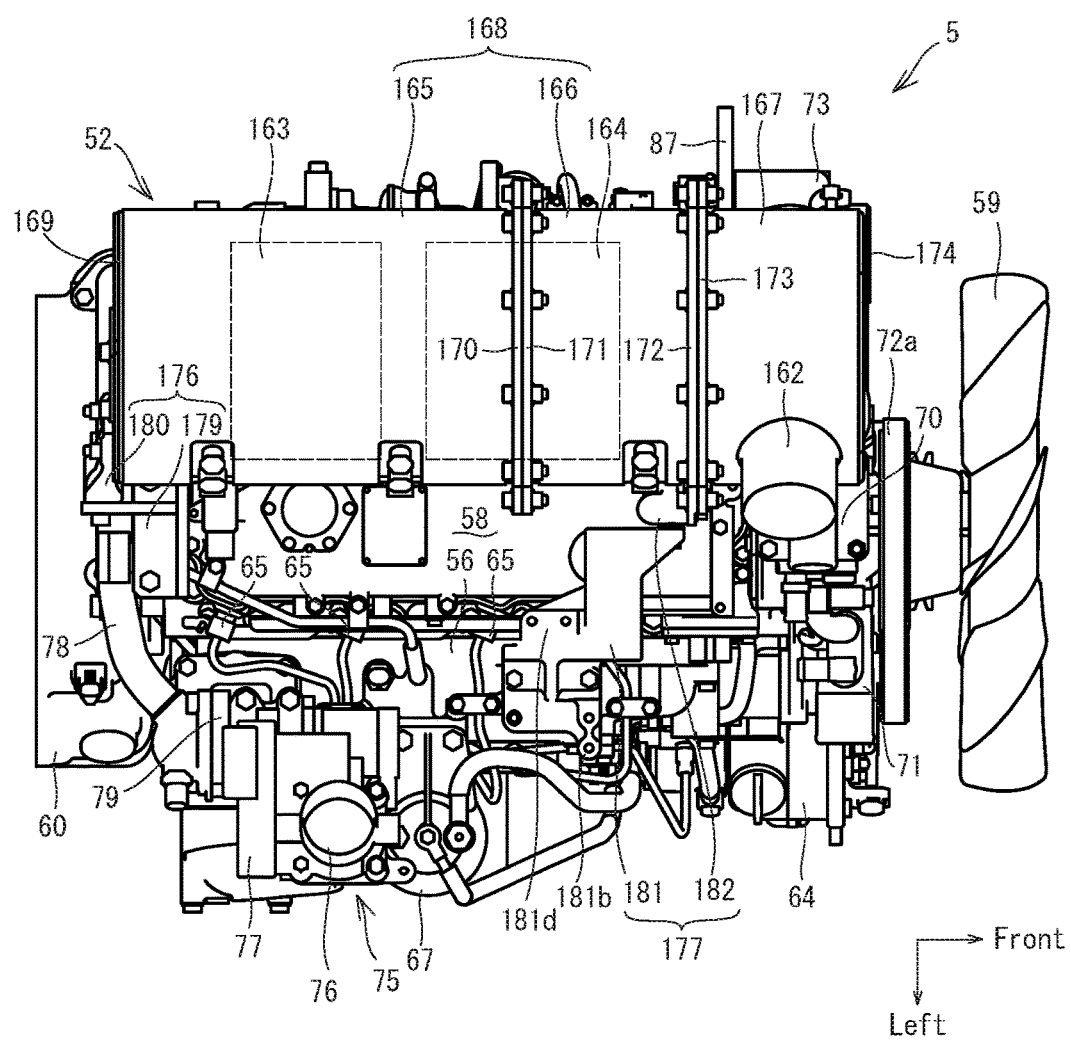
FIG. 25 is a plan view of the diesel engine.
Figure 26:
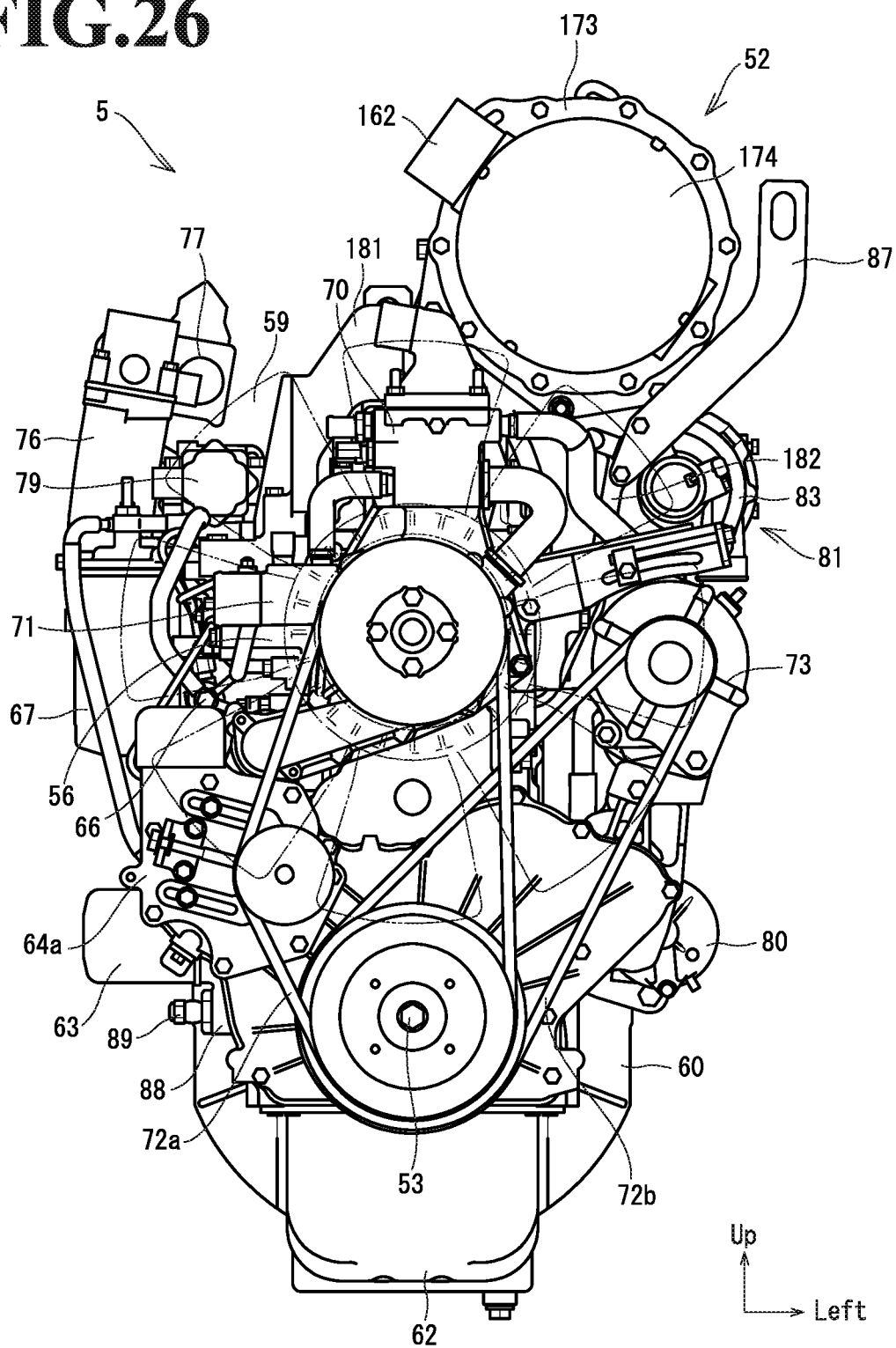
FIG. 26 is a front view of the diesel engine.
Figure 27:
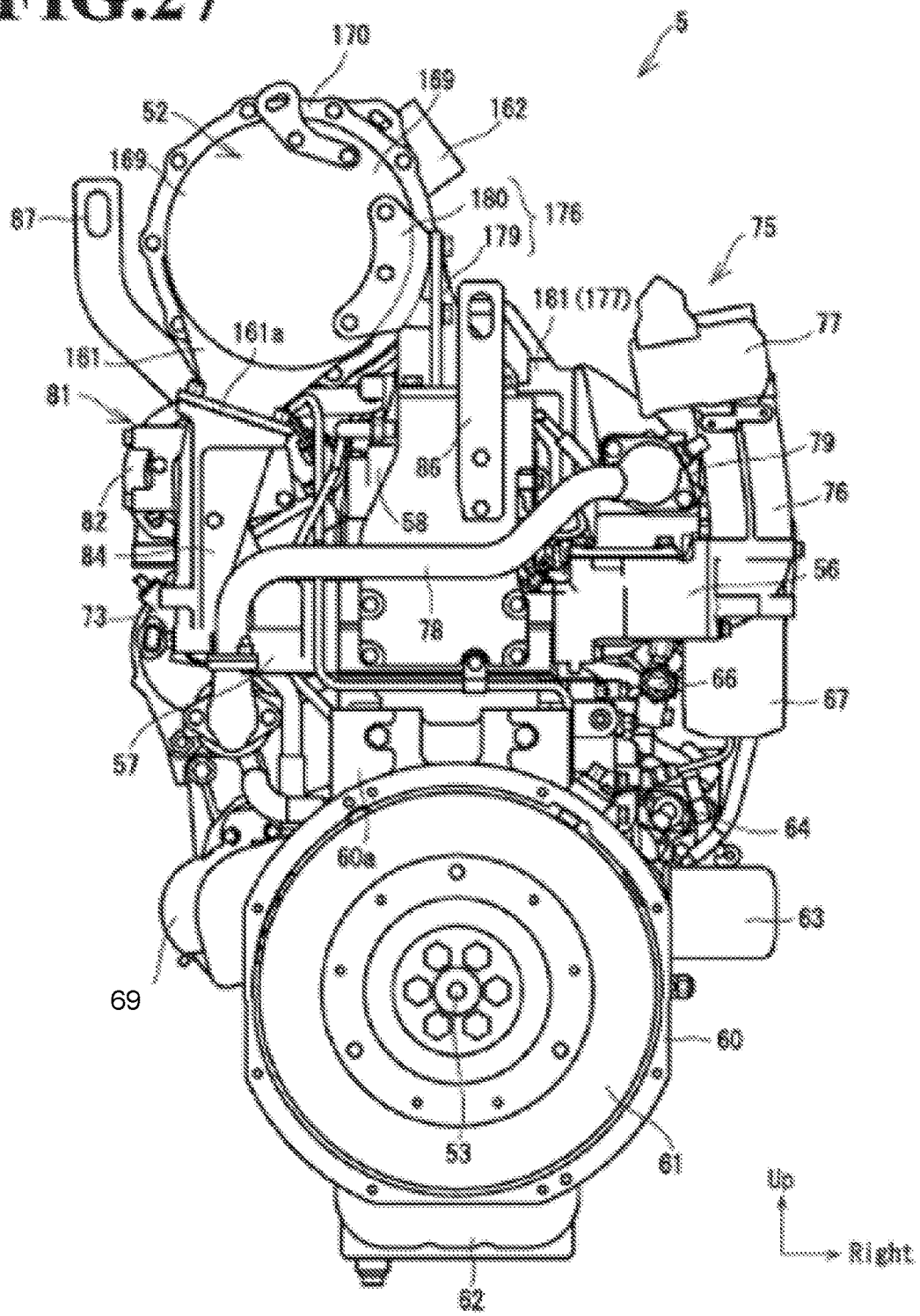
FIG. 27 is a rear view of the diesel engine.
Figure 28:
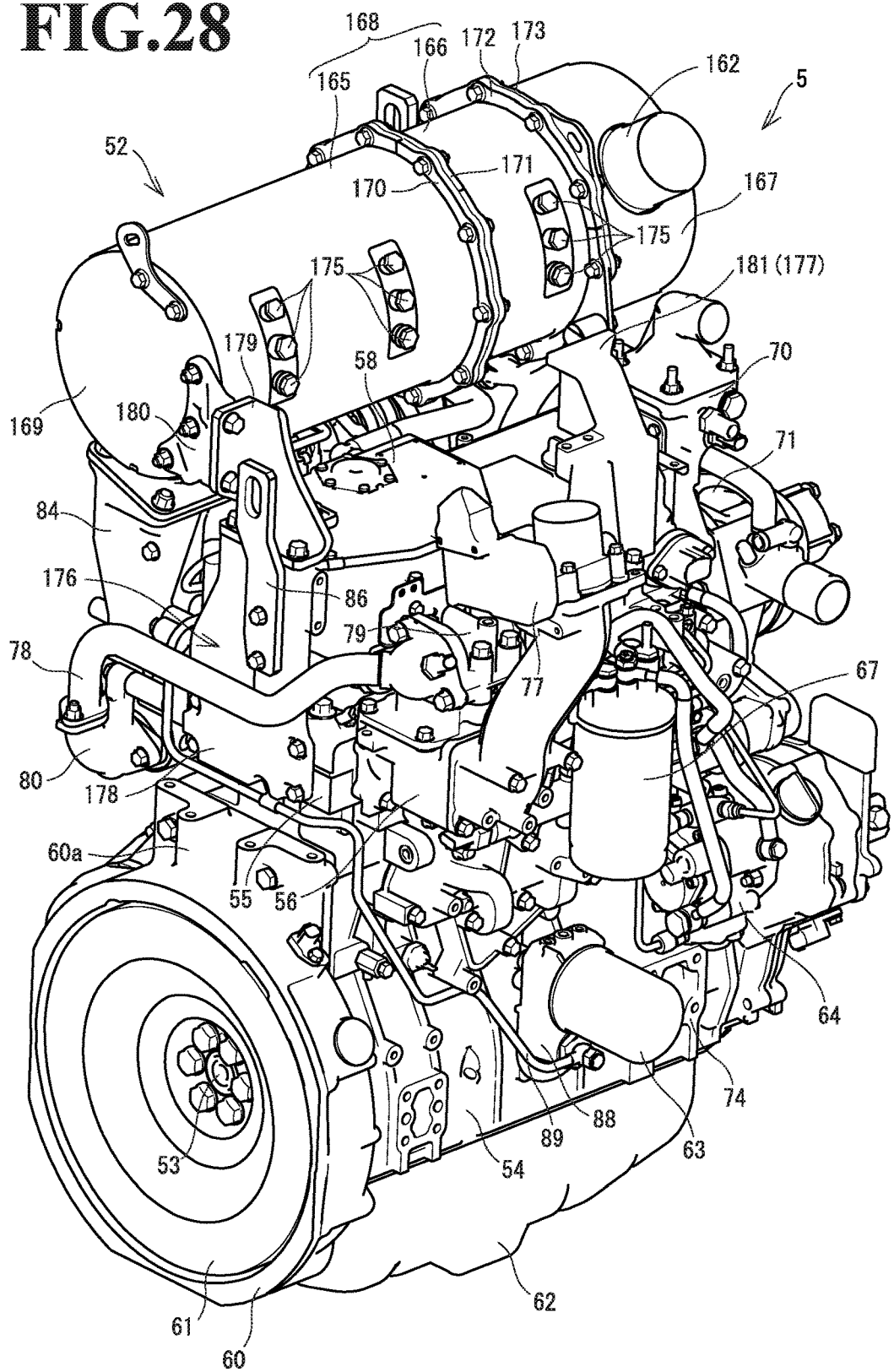
FIG. 28 is a rear perspective view of the diesel engine.
Figure 29:
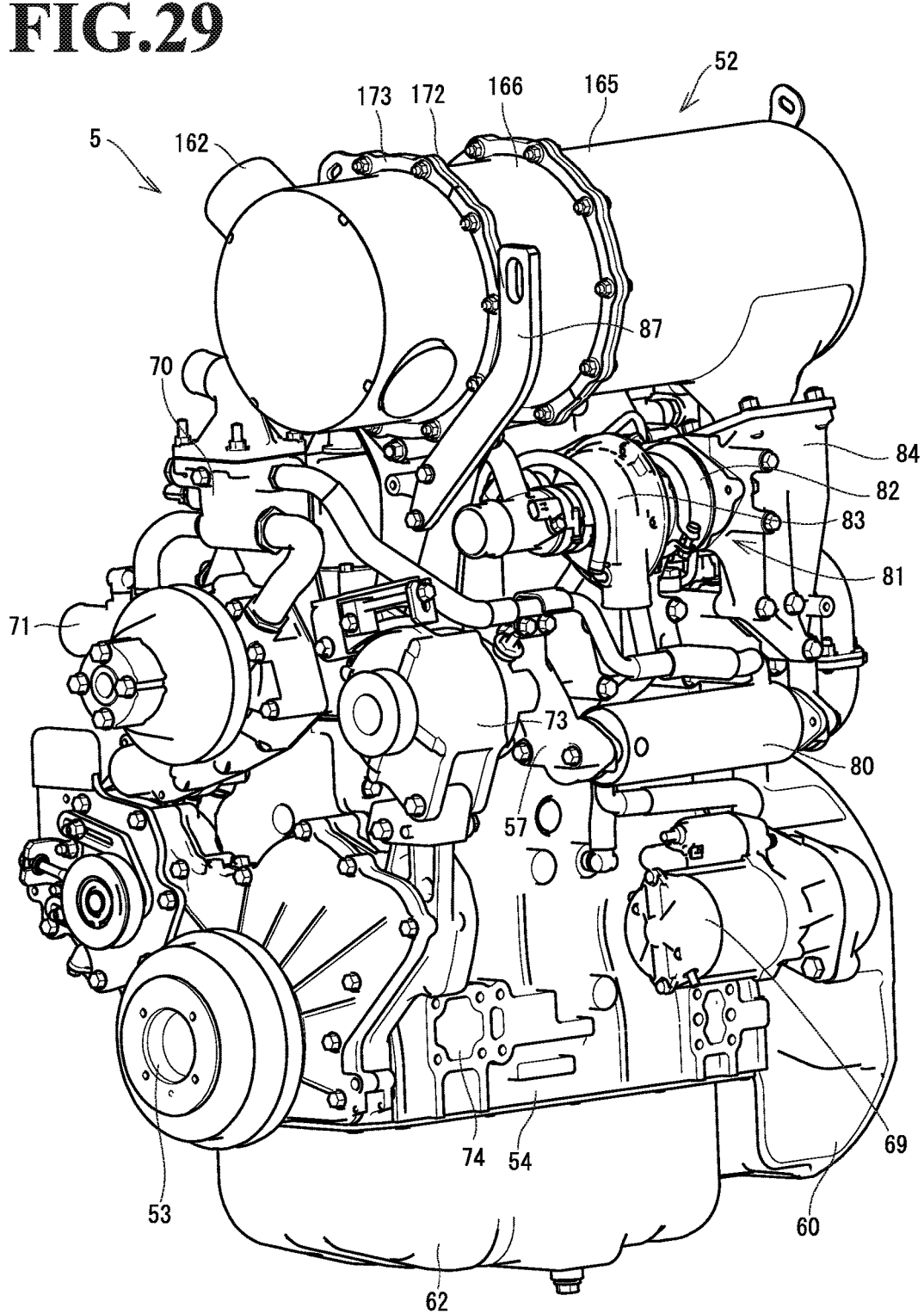
FIG. 29 front perspective view of the diesel engine.
Figure 30:
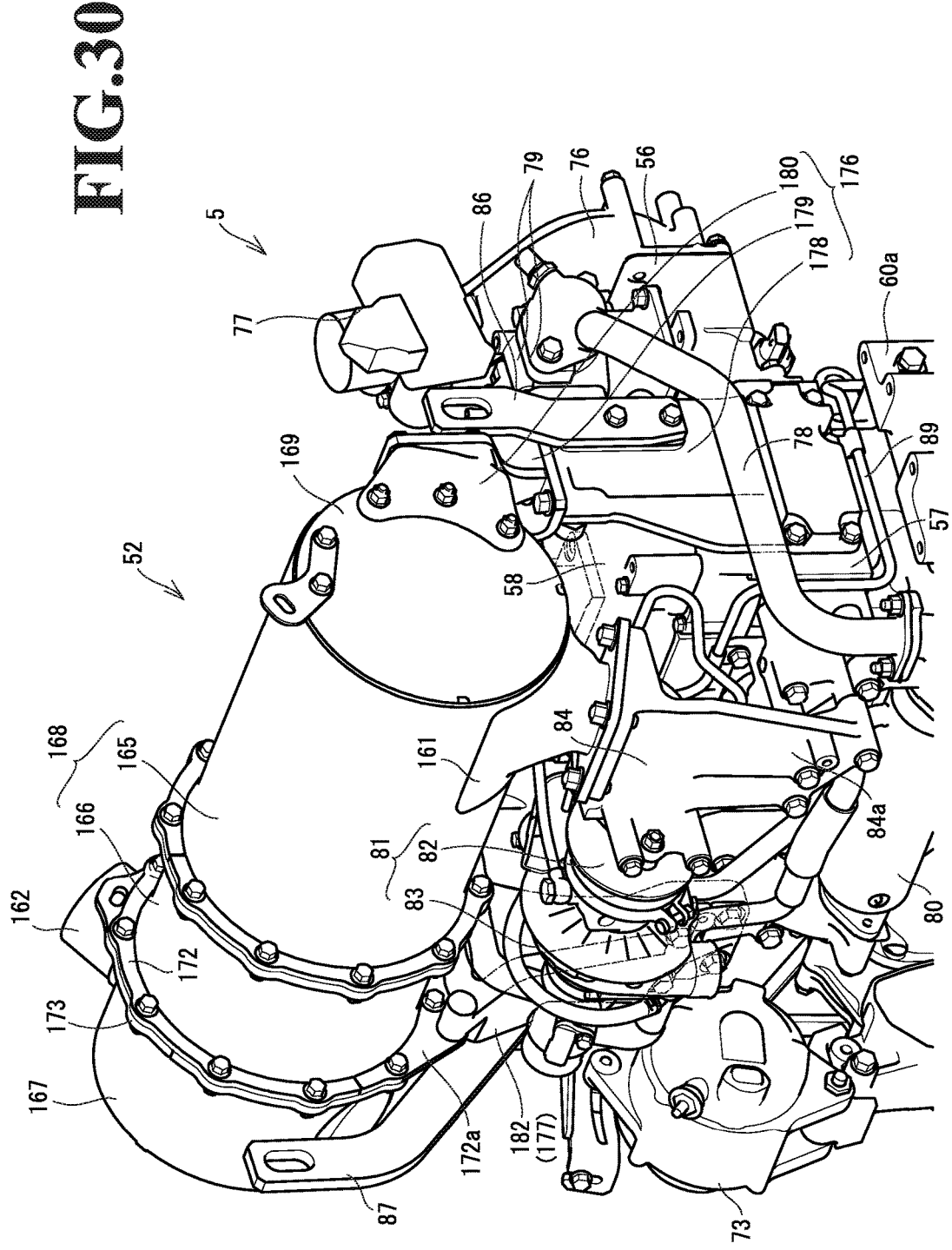
FIG. 30 is a partial perspective view of the diesel engine.
Figure 31:
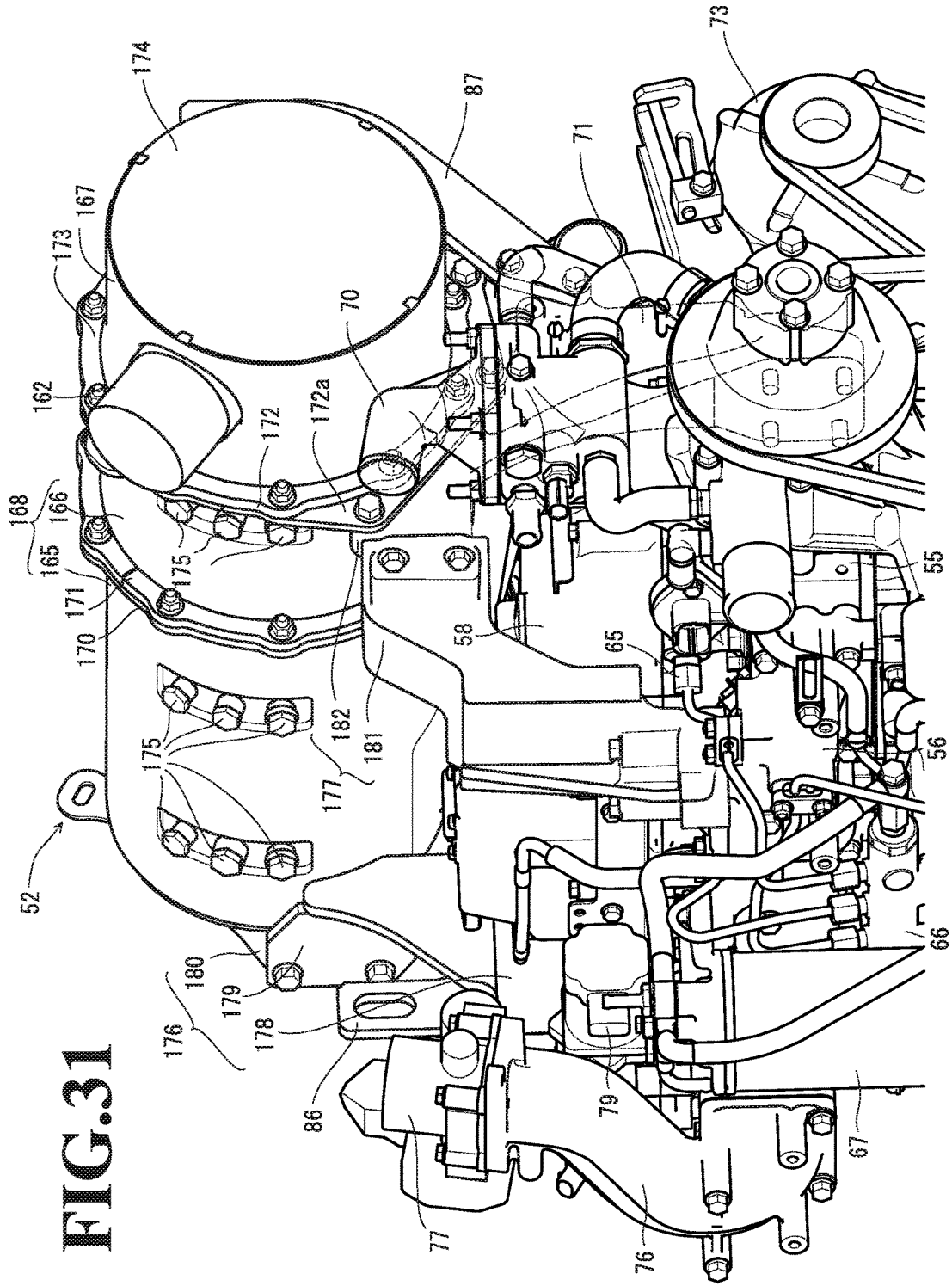
FIG. 31 is a partial perspective view of the diesel engine.

As illustrated in FIGS. 15, 21, and 22, the DPF 52 includes sensor pipes 188, 189. The sensor pipes 188, 189 are coupled to positions at the front and the rear of a soot filter 164 in the gas purification housing 168 to detect the difference between the pressure of the exhaust gas in the section upstream of the soot filter 164 and the pressure of the exhaust gas in the section downstream of the soot filter 164 with a pressure difference sensor 192. The deposition amount of the particulate matter in the soot filter 164 is converted based on the pressure difference detected by the pressure difference sensor 192 to grasp the state of clogging in the DPF. A sensor bracket 209 is located on the fan shroud 234, which is located in front of the engine 5 and surrounds the cooling fan 59. The pressure difference sensor 192 is secured to the sensor bracket 209.

The sensor bracket 209 projects rearward from the rear surface of the fan shroud 234 and is located at a position higher than sensor bosses 175 and rightward of the DPF 52. The sensor bosses 175 are coupled to the sensor pipes 188, 189. The pressure difference sensor 192 is secured to the upper surface of the sensor bracket 209, and the sensor pipes 188, 189 are coupled to the sensor bracket 209 from the lower side. In this embodiment, the pressure difference sensor 192, which is secured to the sensor bracket 209, is located at a position higher than the DPF 52.

Since the sensor 192, which measures the internal environment of the DPF 52, is secured at the upper section of the fan shroud 234, the sensor 192 is located at an upstream section in the engine compartment along the flow direction of the cooling air. This configuration reduces influence of exhaust heat from the engine 5 and the DPF 52 and prevents failure of the sensor 192 that might otherwise be caused by the heat. Thus, the internal environment of the DPF 52 is properly grasped to optimally control the engine 5.

The exhaust gas outlet pipe 162 of the DPF 52 is provided close to the cooling fan 59. The pressure difference sensor 192, which measures the pressure difference between the front and the rear of the soot filter 164 in the DPF 52, is secured to the upper section of the fan shroud 234. The DPF 52 is located in a direction along the output shaft 53 of the engine 5. The pressure difference sensor 192, which measures the pressure at the front and the rear of the soot filter 164 close to the exhaust outlet, is located at the upper section of the fan shroud 234 adjacent to the exhaust outlet. This configuration reduces the length of the sensor pipes 188, 189, which are located between the pressure difference sensor 192 and the DPF 52, and reduces measurement errors caused by the pressure difference sensor 192.

As illustrated in FIGS. 19 to 22, the exhaust pipe 227 is coupled to the exhaust gas outlet pipe 162, which is provided on the front right side of the outer circumferential surface of the DPF 52 facing upward. The exhaust pipe 227 is bent rearward along the exhaust gas flow direction and is arranged to be parallel to the DPF 52. The exhaust pipe 227 is bent downward at the downstream section along the exhaust gas flow such that the exhaust gas discharge port faces downward. The exhaust gas discharge port of the exhaust pipe 227 is inserted in the exhaust gas introduction port of the tailpipe 229, which is secured to the cabin 7. A securing coupling member 210a is provided at the middle of the outer circumference of the exhaust pipe 227. The exhaust pipe 227 is supported by the engine 5 by coupling the securing coupling member 210a to a bracket coupling portion 178b of a securing bracket 178 via an exhaust pipe securing bracket 210.

The tractor 1 includes the exhaust pipe (first exhaust pipe) 227, which is coupled to the exhaust gas outlet pipe 162 of the DPF 52 and secured to the engine 5, and the tailpipe (second exhaust pipe) 229, which is provided downstream of the exhaust pipe 227 and secured to the travelling machine body 2. The inner diameter of the tailpipe 229 is greater than the outer diameter of the exhaust pipe 227, and the exhaust outlet end of the exhaust pipe 227 is inserted in and communicates with the exhaust inlet of the tailpipe 229. The exhaust pipe 227 and the tailpipe 229 are securely coupled to the engine 5, the travelling machine body 2, and the cabin 7, which have different vibration systems. This configuration prevents damage on the exhaust pipe 227 and the tailpipe 229. Since the exhaust pipe 227 is configured to be inserted in the exhaust inlet of the tailpipe 229, the outside air is introduced into the tailpipe 229 together with the exhaust gas from the exhaust pipe 227. This cools the exhaust gas that is to be discharged outside.

The U-shaped tailpipe 229 is secured at a position forward of the operator's seat 8. That is, the tailpipe 229 is securely coupled to a front lower section of a cabin frame 300 of the cabin 7 via a securing bracket 229a. Four corners at the lower section of the cabin frame 300 of the cabin 7 are securely supported by the front supports 96 and the rear supports 97, which are located on the travelling machine body. A battery 272 for supplying power is provided at the lower right section of the cabin 7.

A drain hole 229b for drainage is provided at the lower section of the tailpipe 229, and a wind direction plate 229c is coupled to the lower section of the tailpipe 229. The wind direction plate 229c covers the drain hole 229b from below and the rear. Since the drain hole 229b is covered with the wind direction plate 229c, water is drained toward the front that is not covered with the wind direction plate 229b (in a direction to separate from the cabin 7). The drain hole 229b is provided inward (on the left side) of the battery 272. The wind direction plate 229 covers the left, the right, and the rear (three directions other than the front) of the drain hole 229b. Thus, when high-temperature water in the tailpipe 229 is drained to the outside, components having low heat resistance or low water resistance such as a harness or the battery 272, which are provided adjacent to the tailpipe 229, are prevented from being damaged by heat or causing failure due to water leakage.

The exhaust gas outlet pipe 162 and the exhaust gas inlet pipe 161 of the DPF 52 are distributed at the front and the rear of the DPF 52 such that exhaust gas from the engine 5 flows along the output shaft of the engine 5 in the exhaust-gas purification device (DPF) 52. The exhaust inlet of the exhaust pipe (first exhaust pipe) 227 is coupled to the exhaust gas outlet pipe 162, which is located at the front section of the DPF 52. The exhaust pipe (first exhaust pipe) 227 extends rearward along the DPF 52 above the engine 5, and the DPF 52 and the exhaust pipe (first exhaust pipe) 227 are covered with the heat insulator 250. Since the DPF 52 and the exhaust pipe (first exhaust pipe) 227 are covered with the heat insulator 250, the hood 6, which covers the engine compartment, is prevented from being heated by exhaust heat from the engine compartment.

As illustrated in FIG. 22, the tractor 1 of this embodiment includes an air conditioner compressor 211. The air conditioner compressor 211 compresses refrigerant to be supplied to the air conditioner 364 of the cabin 7. The air conditioner compressor 211 receives power transmitted from the front end of the output shaft 53 of the engine 5 via a compressor V-belt 72c to be driven by the engine 5. The air conditioner compressor 211 is located at a position higher than the coolant pump 71 on the front right side of the engine 5. The air conditioner compressor 211 is mounted on a compressor securing bracket 212. One end of the compressor securing bracket 212 is coupled to an extended bracket 64a. The extended bracket 64a is coupled to the front section of a fuel supply pump 64.

The compressor securing bracket 212 is bent into an L-shape, and the air conditioner compressor 211 is secured to and located on the upper surface of the compressor securing bracket 212. The compressor securing bracket 212 is supported by the engine 5 by coupling one end of the compressor securing bracket 212 at the lower end to the extended bracket 64a and coupling the other end of the compressor securing bracket 212 at the upper end to a proximal end component coupling portion 181b at a proximal end 181a of the outlet side first bracket 181. A pulley 213 is located on the front left side of the engine 5. The pulley 213 keeps the compressor V-belt 72c in tension. The pulley 213, around which the compressor V-belt 72c is wound, is secured to the front edge of a position adjustment bracket 214 to be able to adjust the position. The position adjustment bracket 214 is coupled to the thermostat case 71 and projects forward of the engine 5.

A schematic configuration of the common rail diesel engine 5 mounted on the above-described work vehicle will be described with reference to FIGS. 23 to 31. In the following description, both sides of the output shaft 53 (both sides with the output shaft 53 located in between) will be referred to as left and right, a section where the cooling fan 59 is located is referred to as a front side, a section where the flywheel 61 is located is referred to as a rear side, a section where the exhaust manifold 57 is located is referred to as a left side, and a section where the intake manifold 56 is located is referred to as a right side. For convenience of description, these are used as a reference for the positional relationship in four directions and the vertical direction in the diesel engine 5.

As illustrated in FIGS. 23 to 29, a prime motor mounted on a work vehicle such as a tractor includes the continuously regenerating exhaust-gas purification device (diesel particulate filter (DPF)) 52. The prime motor is the diesel engine 5 in this embodiment. The exhaust-gas purification device 52 removes particulate matter (PM) in exhaust gas discharged from the diesel engine 5 and reduces carbon monoxide (CO) and hydrocarbon (HC) in the exhaust gas.

The diesel engine 5 includes the cylinder block 54. The cylinder block 54 embeds the output shaft 53 (crankshaft) and pistons (not shown). The cylinder head 55 is mounted on the cylinder block 54. The intake manifold 56 is located on the right side surface of the cylinder head 55. The exhaust manifold 57 is located on the left side surface of the cylinder head 55. That is, the intake manifold 56 and the exhaust manifold 57 are distributed on both side surfaces of the diesel engine 5 along the output shaft 53. A head cover 58 is located on the upper surface of the cylinder head 55. The cooling fan 59 is provided on a side surface of the diesel engine 5 that intersects the output shaft 53, more specifically, on the front surface of the cylinder block 54. Rotational power is transmitted to the cooling fan 59 from the front end of the output shaft 53 via a cooling fan V-belt 72a.

The flywheel housing 60 is provided on the rear surface of the cylinder block 54. The flywheel housing 60 houses the flywheel 61. The flywheel 61 is supported on the rear end of the output shaft 53. Motive power of the diesel engine 5 is transmitted to the operation parts of the work vehicle via the output shaft 53. The oil pan 62 is located on the lower surface of the cylinder block 54. Lubrication oil in the oil pan 62 is supplied to lubrication parts of the diesel engine 5 via the oil filter 63. The oil filter 63 is located on the right side surface of the cylinder block 54. The oil filter 63 is secured to the right side surface of the cylinder block 54 via the oil filter support member 88.

The fuel supply pump 64 for supplying fuel is secured above the oil filter 63 (below the intake manifold 56) on the right side surface of the cylinder block 54. The diesel engine 5 includes injectors 65 with electromagnetically controlled fuel injection valves for four cylinders. The injectors 65 are coupled to the fuel tank 11 via the fuel supply pump 64, a cylindrical common rail 66, and a fuel filter 67. The fuel tank 11 is mounted on the work vehicle (see FIGS. 1 to 3). An oil cooler 68 is located on the right side surface of the cylinder block 54 at a position vertically sandwiched between the common rail 66 and the oil filter 63.

Fuel in the fuel tank 11 is fed under pressure from the fuel supply pump 64 to the common rail 66 via the fuel filter 67, and the pressurized fuel is stored in the common rail 66. The pressurized fuel in the common rail 66 is injected from the injectors 65 into the cylinders of the diesel engine 5 by controlling opening and closing of the fuel injection valves of the injectors 65. The engine starter 69 is provided in the flywheel housing 60. A pinion gear of the engine starter 69 is engaged with a ring gear of the flywheel 61. To start the diesel engine 5, the ring gear of the flywheel 61 is rotated by rotational force of the starter 69 so that the output shaft 53 starts rotating (or cranked).

The coolant pump 71 for coolant lubrication is located in front of the cylinder head 55 (close to the cooling fan 59) to be coaxial with a fan axis of the cooling fan 59. The coolant pump 71 is configured to be driven by rotation of the engine output shaft 53 together with the cooling fan 59. The coolant in the radiator 235 (see FIGS. 4 and 13), which is mounted on the work vehicle, is supplied to the coolant pump 71 via the thermostat case 70. The thermostat case 70 is located above the coolant pump 71. When the coolant pump 71 is driven, the coolant is supplied to a water-cooling jacket (not shown) formed in the cylinder head 55 and the cylinder block 56 to cool the diesel engine 5. The coolant that has contributed to cooling of the diesel engine 5 is returned to the radiator 235. Due to the positional relationship, the coolant pump 71 opposes the cooling fan 59. Thus, the cool air from the cooling fan 59 contacts the coolant pump 71.

A generator that generates electric power by power of the diesel engine 5 is provided on the left side of the diesel engine 5, or more specifically, leftward of the coolant pump 71. The generator is an alternator 73 in this embodiment. Rotational power is transmitted to the cooling fan 59 and the coolant pump 71 from the front end of the output shaft 3 via the cooling fan V-belt 72a. Rotational power is also transmitted from the front end of the output shaft 53 to the alternator 73 via an alternator V-belt 72b. When the coolant pump 71 is driven, the coolant in the radiator 235 (FIGS. 4 and 26), which is mounted on the work vehicle, is supplied to the cylinder block 54 and the cylinder head 55 to cool the diesel engine 5.

Figure 2:
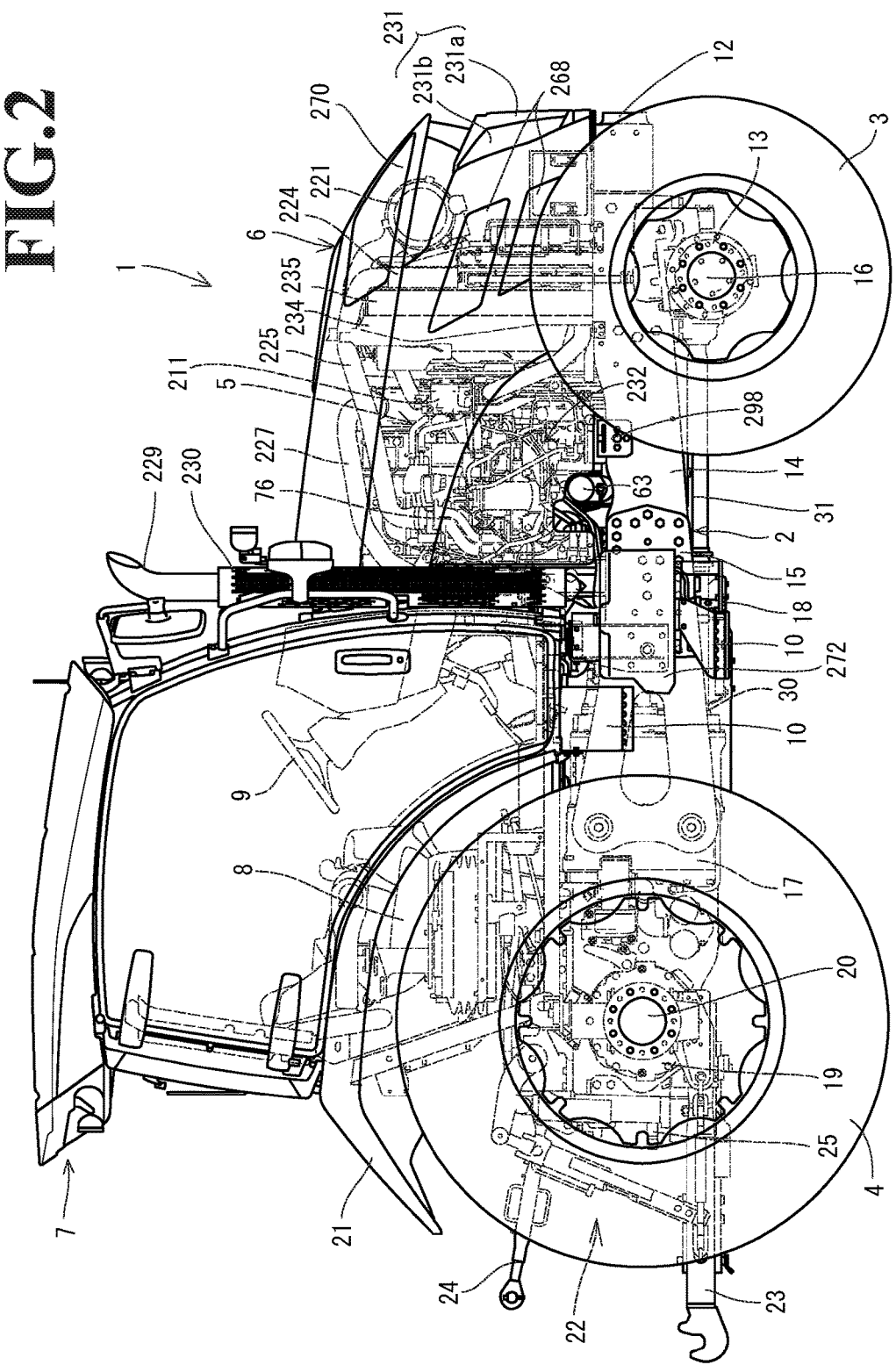
FIG. 2 is a right side view of the work vehicle.
Figure 3:
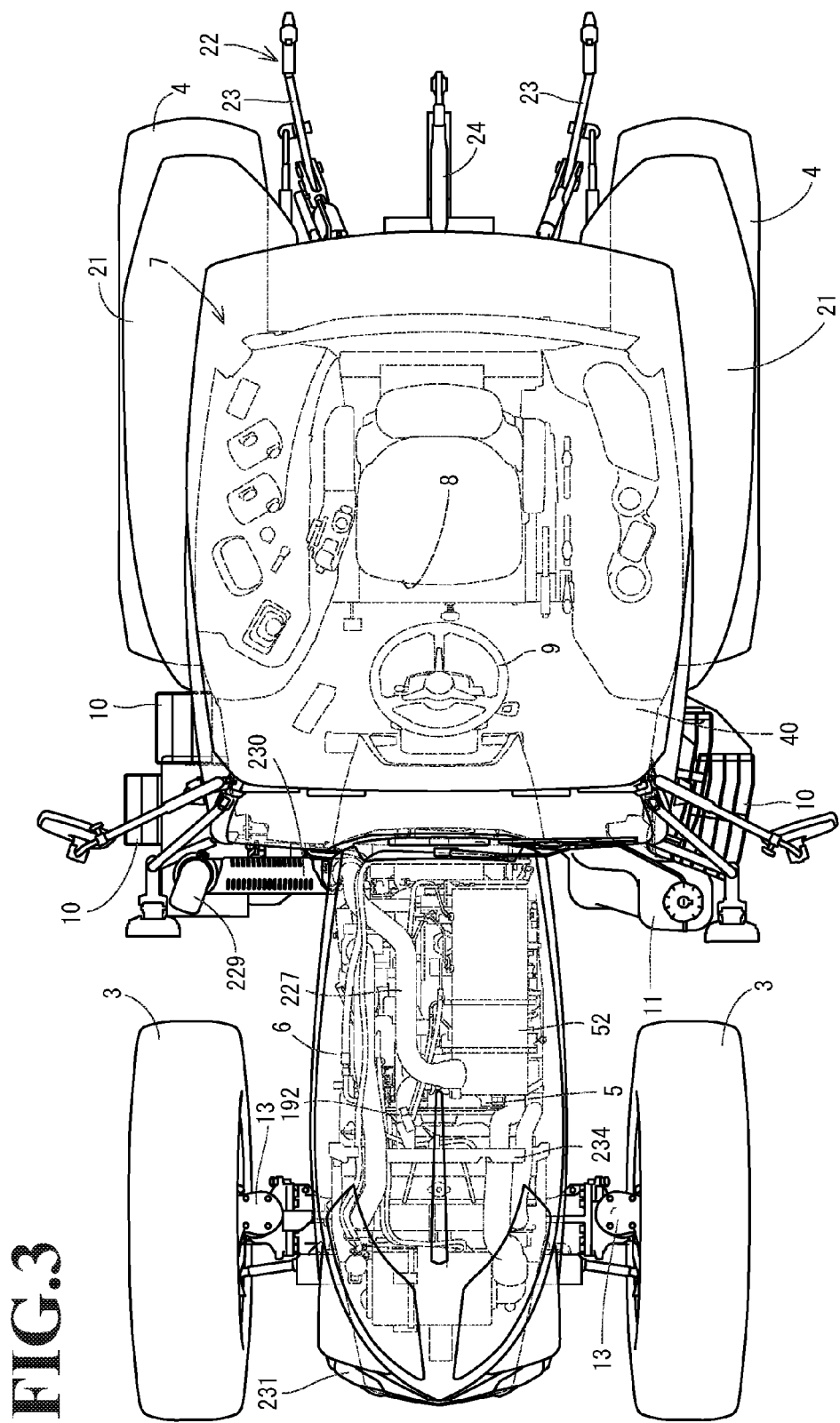
FIG. 3 is a plan view of the work vehicle.

The engine leg securing portion 74 is provided on each of left and right side surfaces of the cylinder block 54. Each front engine leg (engine mount) 238 (see FIGS. 1 and 2) can be bolted to the associated engine leg securing portion 74. Each front engine leg 238 includes the rubber vibration isolator. The work vehicle includes the pair of left and right engine frames 14 (FIGS. 1 to 3). In this embodiment, the engine leg securing portions 74 of the cylinder block 54 are each bolted to the associated engine frame 14 via the associated engine leg 238 such that the cylinder block 54 is sandwiched between the engine frames 14. With this configuration, the engine frames 14 of the work vehicle support the front part of the diesel engine 5.

The intake connecting pipe 76 is coupled to the right side inlet portion of the intake manifold 56. Fresh air (external air) is supplied to the intake connecting pipe 76. The intake throttle member 77 is provided at the intake-air inlet side (upstream side) of the intake connecting pipe 76. The recirculation exhaust gas tube 78 is coupled to the top inlet portion of the intake manifold 56 via an EGR valve member 79. Some of exhaust gas (EGR gas) of the diesel engine 5 is supplied to the recirculation exhaust gas tube 78. In the intake manifold 56, the intake-air outlet side (downstream side) of the intake connecting pipe 76 and the coupling portion (rear portion) between the intake manifold 56 and the EGR valve member 79 configure a body case of the exhaust-gas recirculation (EGR) device 75. That is, the intake-air introduction side of the intake manifold 56 configures the EGR body case.

The EGR device (exhaust-gas recirculation device) 75 is located mainly on the right side of the diesel engine 5, and more specifically, rightward of the cylinder head 55 and mixes some of the exhaust gas (EGR gas) of the diesel engine 5 with fresh air to supply the mixture to the intake manifold 56. The EGR device (exhaust-gas recirculation device) 75 includes the EGR body case configured by part of the intake manifold 56, the intake connecting pipe 76, which communicates with the intake manifold 56, the intake throttle member 77, which is located in the intake connecting pipe 76, the recirculation exhaust gas tube 78, which is coupled to the exhaust manifold 57 via the EGR cooler 80, and the EGR valve member 79, which connects the intake manifold 56 to the recirculation exhaust gas tube 78.

The intake throttle member 77 is coupled to the intake-air introduction side of the intake manifold 56 via the intake connecting pipe 76. The outlet of the recirculation exhaust gas tube 78 is also coupled to the intake-air introduction side of the intake manifold 56 via the EGR valve member 79. The inlet of the recirculation exhaust gas tube 78 is coupled to the exhaust manifold 57 via the EGR cooler 80. The amount of EGR gas supplied to the intake-air introduction side of the intake manifold 56 is adjusted by adjusting the opening degree of the EGR valve in the EGR valve member 79.

With the above-described configuration, while fresh air is supplied to the intake-air introduction side of the intake manifold 56 via the intake connecting pipe 76 and the intake throttle member 77, the EGR gas is supplied to the intake-air introduction side of the intake manifold 56 from the exhaust manifold 57. The fresh air from the outside and the EGR gas from the exhaust manifold 57 are mixed in the intake-air introduction side of the intake manifold 56. Some of the exhaust gas discharged to the exhaust manifold 57 from the diesel engine 5 is circulated from the intake manifold 56 to the diesel engine 5. This reduces the highest combustion temperature during high load operation and the discharge amount of NOx (nitrogen oxides) from the diesel engine 5.

The turbocharger 81 is located leftward of the cylinder head 55 above the exhaust manifold 57. The turbocharger 81 includes the turbine case 82, which embeds the turbine wheel, and the compressor case 83, which embeds the blower wheel. The exhaust introduction side of the turbine case 82 is coupled to the outlet of the exhaust manifold 57. The exhaust discharge side of the turbine case 81 is coupled to the exhaust introduction side of the exhaust-gas purification device 52 via the exhaust connecting pipe 84. That is, the exhaust gas that has been discharged from the cylinders of the diesel engine 5 to the exhaust manifold 57 is released to the outside via, for example, the turbocharger 81 and the exhaust-gas purification device 52.

Figure 4:
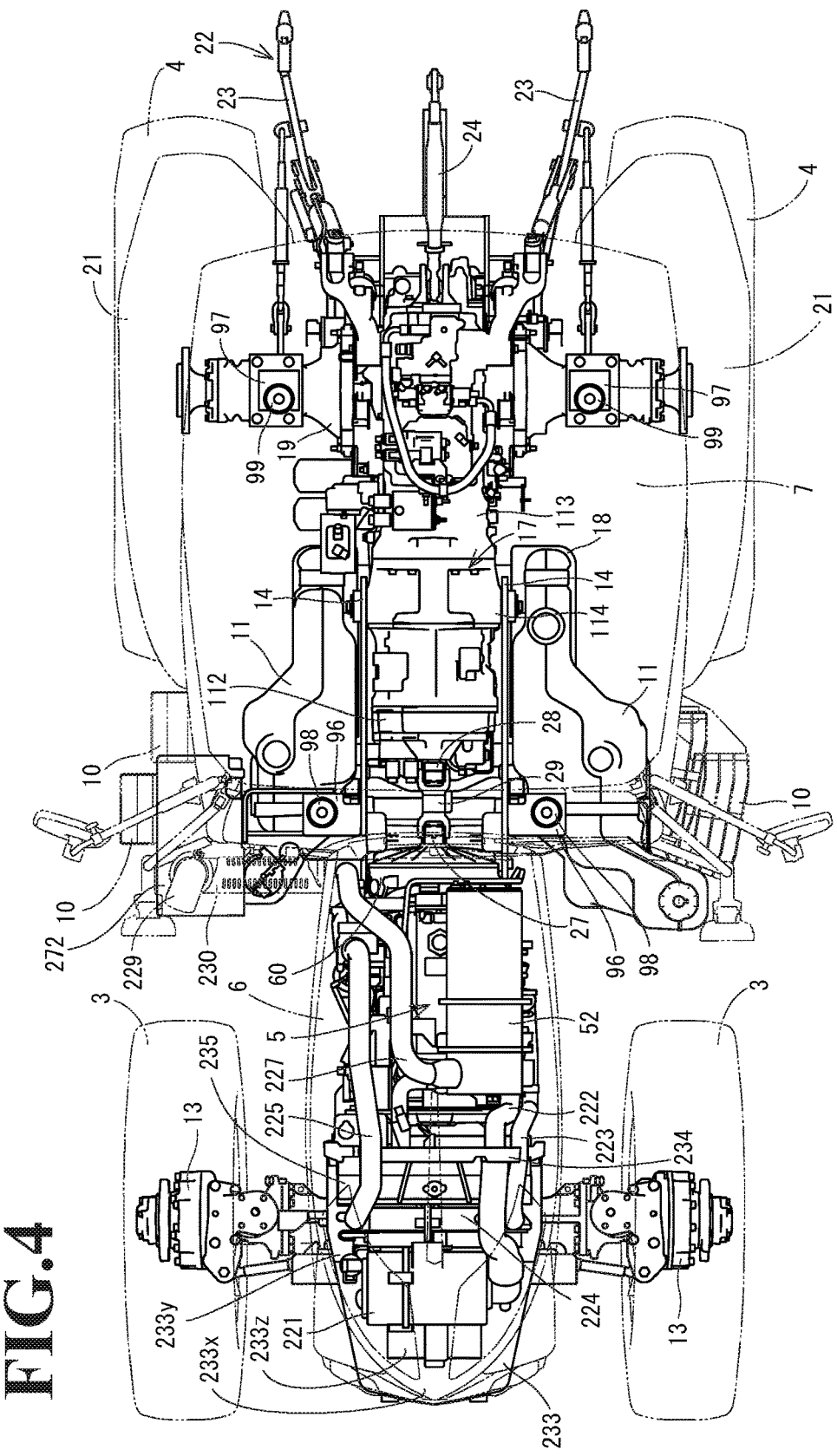
FIG. 4 is a plan view of the travelling machine body of the work vehicle.
Figure 5:
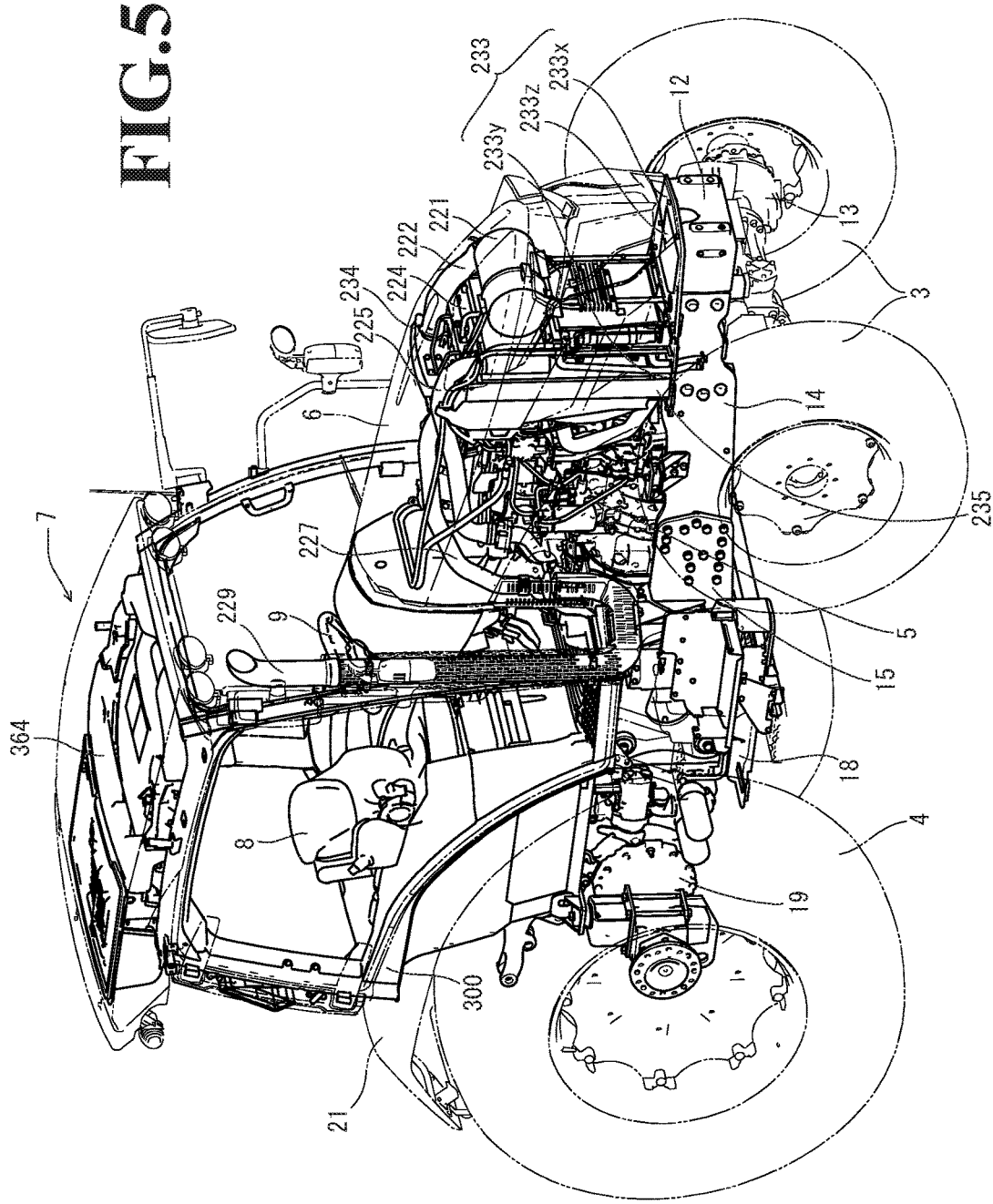
FIG. 5 is a front perspective view of the work vehicle.
Figure 6:
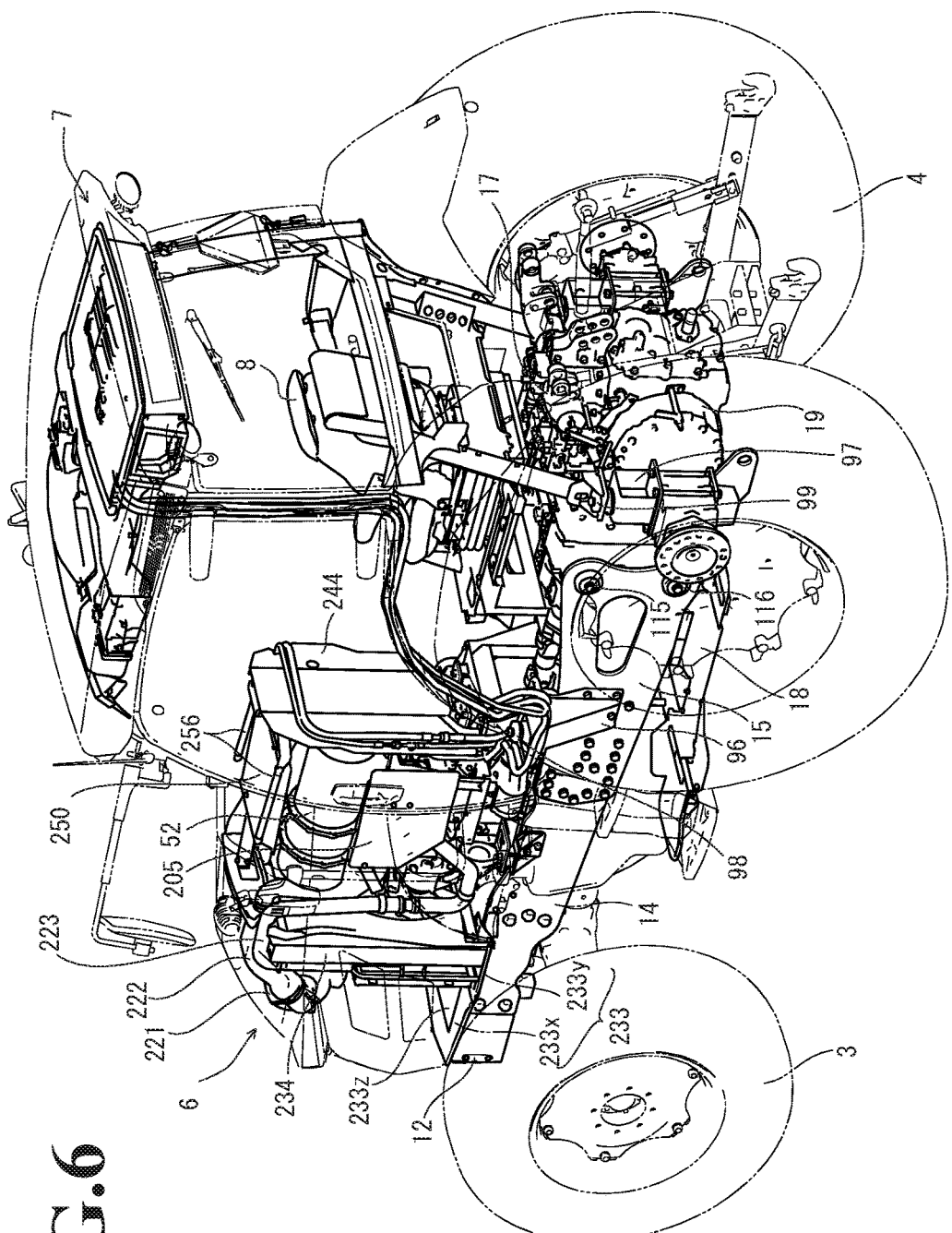
FIG. 6 is a rear perspective view of the work vehicle.
Figure 7:
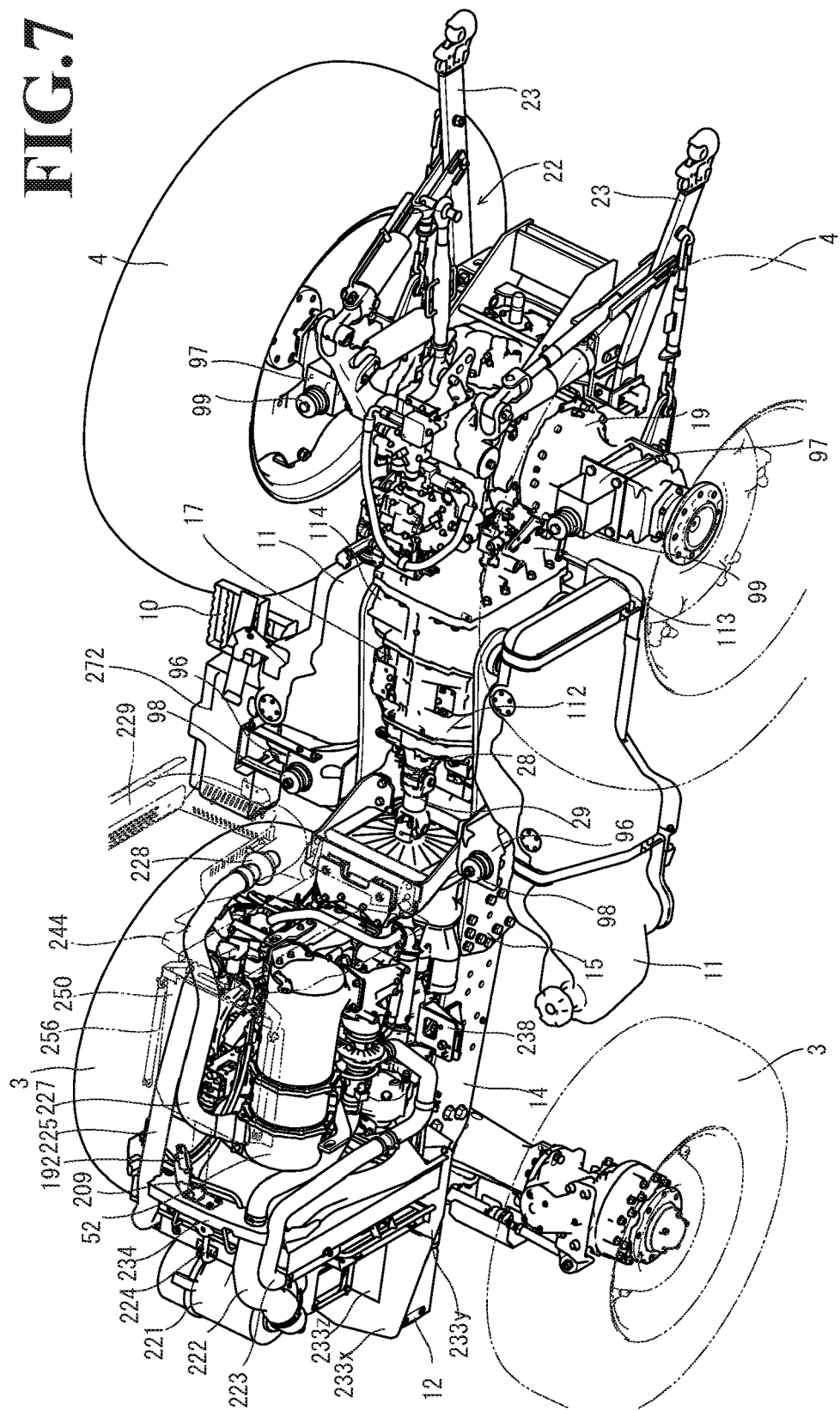
FIG. 7 is a rear perspective view of the travelling machine body as viewed from the left side.
Figure 8:
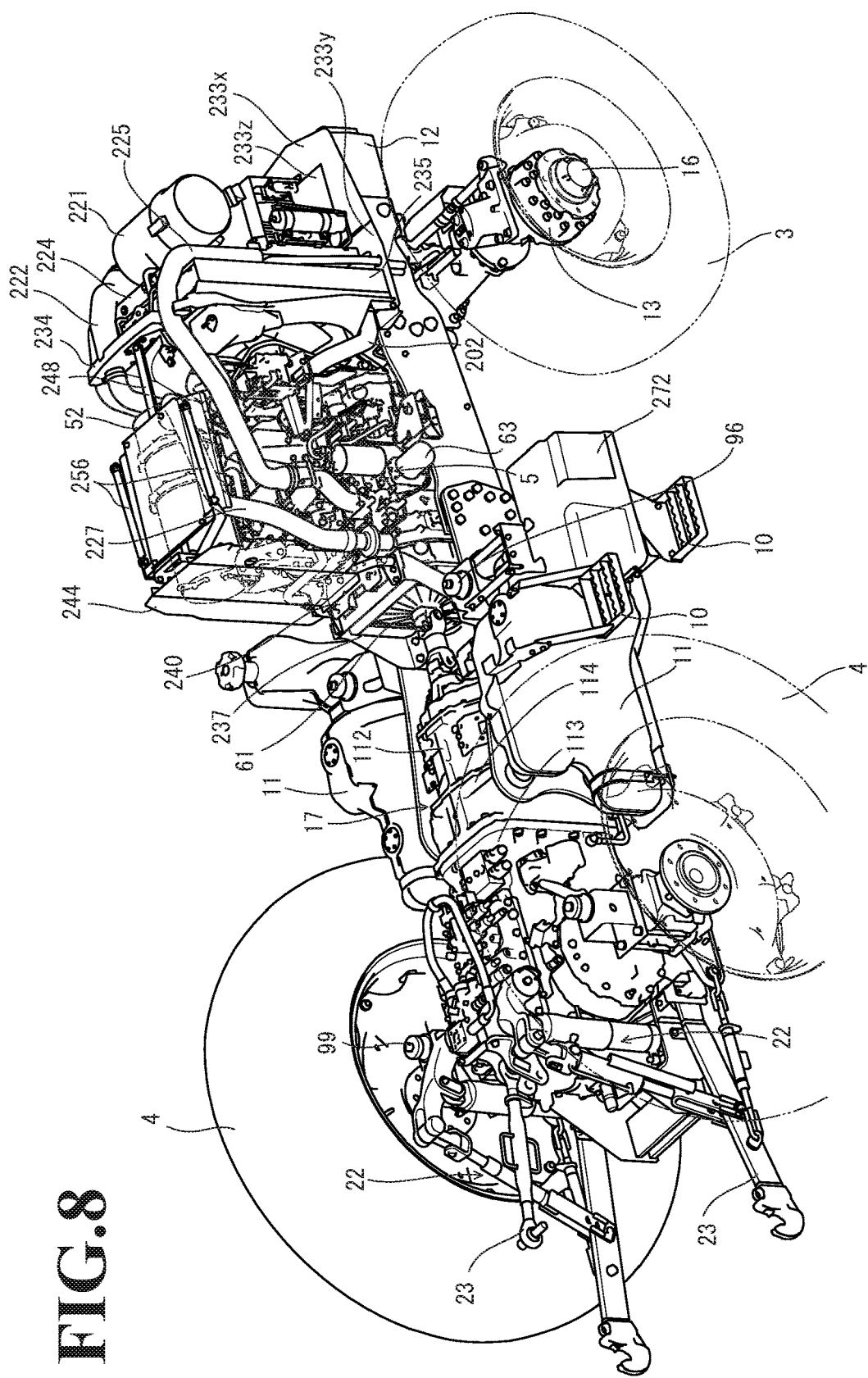
FIG. 8 is a rear perspective view of the travelling machine body as viewed from the right side.
Figure 9:
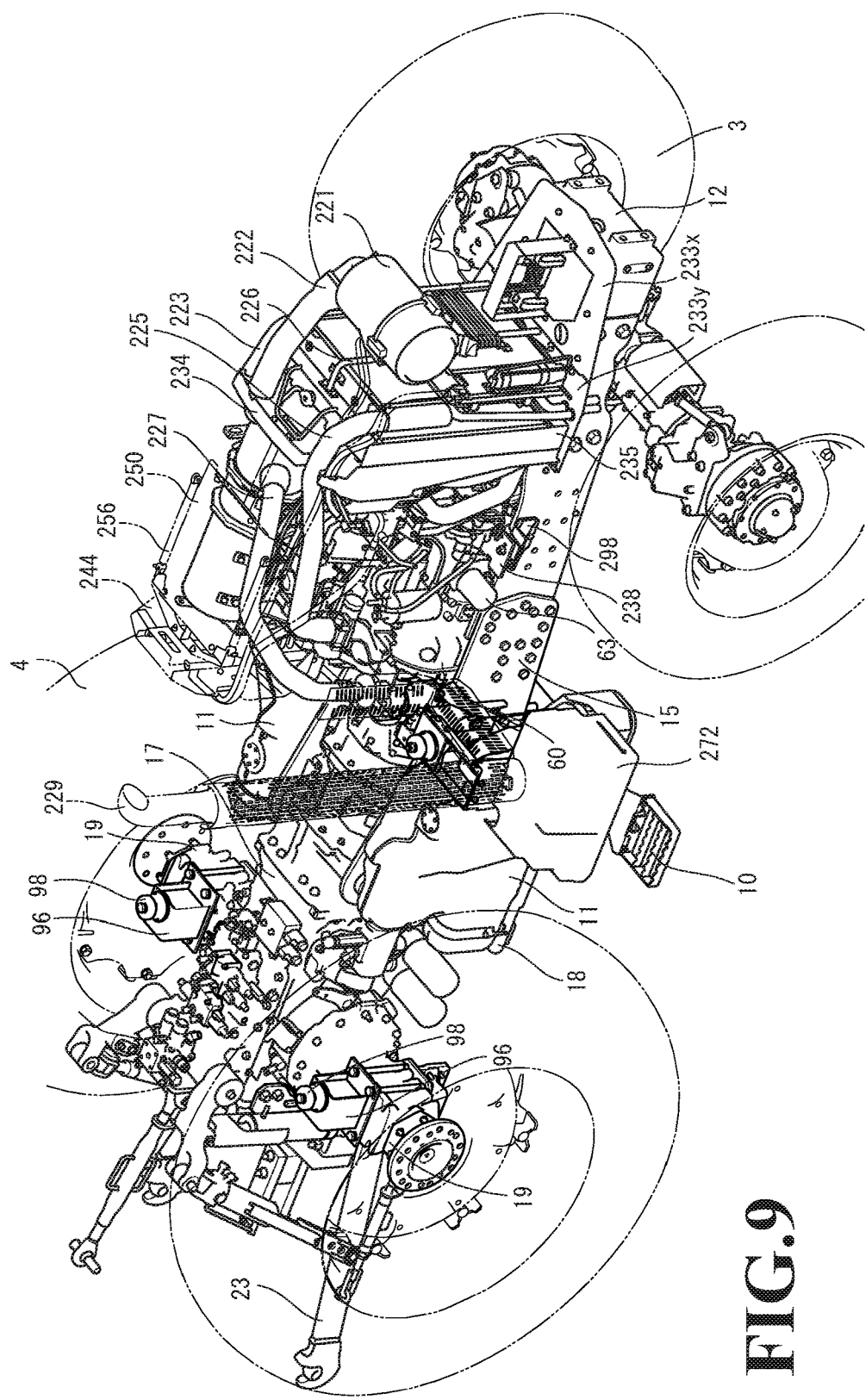
FIG. 9 is a front perspective view of the travelling machine body as viewed from the right side.

The intake-air introduction side of the compressor case 83 is coupled to the intake-air discharge side of the air cleaner 221 (see FIGS. 4 and 13) via the supply pipe 222 (see FIGS. 4 and 13). The intake-air discharge side of the compressor case 83 is coupled to the intake-air introduction side of the intercooler 224 (see FIGS. 4 and 13) via the upstream relay pipe 223 (see FIGS. 4 and 13). The intake-air discharge side of the intercooler 224 (see FIGS. 4 and 15) is coupled to the intake throttle member 77 via the downstream relay pipe 225 (see FIGS. 4 and 15). That is, the fresh air (external air) from which dust has been removed by the air cleaner 221 is sent from the compressor case 83 to the EGR device 75 via the intercooler 224 and then supplied to the cylinders of the diesel engine 5.

The exhaust-gas purification device 52 is located on the top side of the diesel engine 5 above the exhaust manifold 57 and the turbocharger 81, that is, leftward of the cylinder head 55 and above the exhaust manifold 57 and the turbocharger 81. In this case, the position of the exhaust-gas purification device 52 is set such that the longitudinal direction of the exhaust-gas purification device 52 extends parallel to the output shaft 53 of the diesel engine 5.

Next, a configuration of the exhaust-gas purification device (diesel particulate filter (DPF)) 52 will be described with reference to the previous drawings and FIGS. 30 to 37. The DPF 52 is for collecting, for example, particulate matter (PM) in exhaust gas. The DPF 52 is configured to be approximately cylindrical and to extend parallel to the output shaft (crankshaft) 53 of the diesel engine 5 in the fore-and-aft direction. The DPF 52 is located above the cylinder head 55 of the diesel engine 5. The exhaust gas inlet pipe 161 (exhaust gas introduction side) and the exhaust gas outlet pipe 162 (exhaust gas discharge side) are distributed to the front and the rear of the diesel engine 5 on both ends (one end in the exhaust gas moving direction and the other end in the exhaust gas moving direction) of the DPF 52.

The DPF 52 is configured to accommodate, for example, a diesel oxidation catalyst 163 and the soot filter 164 arranged in series. The diesel oxidation catalyst 163 is made of, for example, platinum. The soot filter 164 has a honeycomb structure. In the above-described configuration, nitrogen dioxide (NO2) generated by oxidation behavior in the diesel oxidation catalyst 163 is taken into the soot filter 164. The particulate matter contained in the exhaust gas of the diesel engine 5 is collected by the soot filter 164 and continuously oxidized and removed by the nitrogen dioxide (NO2). Thus, in addition to the removal of the particulate matter (PM) in the exhaust gas of the diesel engine 5, the content of carbon monoxide (CO) and hydrocarbon (HC) in the exhaust gas of the engine 1 is reduced. The diesel oxidation catalyst 163 and the soot filter 164 correspond to a gas purification filter accommodated in a purification housing 38.

The DPF 52 includes an upstream case (first case) 165, an intermediate case (second case) 166, and a downstream case (third case) 167. The exhaust gas inlet pipe 161 is provided on the outer circumferential surface of the upstream case 165. The intermediate case 166 is coupled to the upstream case 165. The exhaust outlet pipe 162 is inserted in the downstream case 167 from the outer circumferential surface. The upstream case 165 and the intermediate case 166 are arranged in series and coupled to each other to form the gas purification housing 168. The gas purification housing 168 is made of heat-resistant metal material. The gas purification housing 168 accommodates the diesel oxidation catalyst 163 and the soot filter 164 via a cylindrical inner case (not shown). The downstream case 167 includes an inner case (not shown) having multiple silencing holes. The space between the downstream case 168 and the inner case is filled with a silencing material made of ceramic fiber to form a silencer.

One end of the upstream case 165 that is an upstream end in the exhaust gas moving direction is covered with an upstream lid 169. The other end of the upstream case 165 that is a downstream end in the exhaust gas moving direction is open. The upstream case 165 has a cylindrical shape with the downstream end in the exhaust gas moving direction open. The intermediate case 166 has a cylindrical shape with both ends open. One end of the downstream case 167 that is an upstream end in the exhaust gas moving direction is open. The other end of the downstream case 167 that is a downstream end in the exhaust gas moving direction is covered with a downstream lid 174. The downstream case 167 has a cylindrical shape with the upstream end in the exhaust gas moving direction open. The tailpipe 229 (see FIGS. 4 and 21) is coupled to the exhaust gas outlet pipe 162, which is located on the outer circumferential surface of the downstream case 167, via the exhaust pipe 227 (see FIGS. 4 and 21). Exhaust gas is discharged to the outside from the exhaust gas outlet pipe 162 via the exhaust pipe 227 and the tailpipe 229.

Coupling portions of the upstream case 165 and the intermediate case 166 are coupled by sandwiching the coupling portions from both sides in the exhaust gas moving direction with a pair of thick plate-like sandwich flanges 170, 171. That is, a joining flange located at a downstream open edge of the upstream case 165 and a joining flange located at an upstream open edge of the intermediate case 166 are sandwiched by the sandwich flanges 170, 171 to couple the downstream end of the upstream case 165 to the upstream end of the intermediate case 166. This configures the gas purification housing 168. At this time, tightening the central sandwich flanges 170, 171 with bolts detachably couples the upstream case 165 to the intermediate case 166.

Coupling portions of the intermediate case 166 and the downstream case 167 are coupled by sandwiching the coupling portions from both sides in the exhaust gas moving direction with a pair of thick plate-like sandwich flanges 172, 173. That is, a joining flange located at a downstream open edge of the intermediate case 166 and a joining flange located at an upstream open edge of the downstream case 167 are sandwiched by the sandwich flanges 172, 173 to couple the downstream end of the intermediate case 166 to the upstream end of the downstream case 167. This configures the gas purification housing 168. At this time, tightening the outlet side sandwich flanges 172, 173 with bolts detachably couples the intermediate case 166 to the downstream case 167.

The exhaust gas inlet pipe 161 is provided on the outer circumferential portion at the exhaust introduction side (exhaust inlet side) of the upstream case 165. The exhaust introduction side of the exhaust gas inlet pipe 161 communicates with the exhaust discharge side of the turbine case 82 via an exhaust relay passage, which is the exhaust connecting pipe 84 in this embodiment. The exhaust connecting pipe 84 is approximately L-shaped as viewed from the side. The exhaust connecting pipe 84 includes an exhaust introduction side at the front and is coupled to the exhaust discharge side of the turbine case 82. The exhaust connecting pipe 84 also includes the exhaust discharge side at the upper section and is coupled to the exhaust gas inlet pipe 161 of the DPF 52. The exhaust connecting pipe 84 includes the coupling support portion 84a, which extends downward from the outer circumferential surface. The lower end of the coupling support portion 84a is coupled to the left side surface of the exhaust manifold 57. That is, the exhaust connecting pipe 84 is secured to the diesel engine 5 by fastening the exhaust connecting pipe 84 to the exhaust manifold 57 and the turbocharger 81 with bolts.

The sensor bosses 175 are located on the outer circumferential surface of the gas purification housing 168. The sensor bosses 175 are coupled to the temperature sensors 186, 187 (see FIGS. 21 and 22) and the sensor pipes 188, 189 (see FIG. 15). In this embodiment, the upstream case 165 accommodates the oxidation catalyst 163 and the upstream section of the soot filter 164. The intermediate case 165 accommodates the downstream section of the soot filter 164. The sensor boss 175 that is coupled to an upstream temperature sensor 186 is provided on the outer circumferential surface of the upstream case 165 at a position upstream of the oxidation catalyst 163 in the exhaust gas moving direction. The sensor boss 175 that is coupled to a downstream temperature sensor 187 and an upstream sensor pipe 188 is provided at a position between the oxidation catalyst 163 and the soot filter 164. The sensor boss 175 that is coupled to a downstream sensor pipe 189 is provided on the outer circumferential surface of the intermediate case 166 at a position downstream of the soot filter 164 in the exhaust gas moving direction.

Next, a configuration for mounting the exhaust-gas purification device 52 to the diesel engine 5 will be described with reference to FIGS. 30 to 37. The diesel engine 5 includes a housing support that supports and secures the exhaust-gas purification device 52 (gas purification housing 168). The housing support includes an inlet side bracket 176 and an outlet side bracket 177. The inlet side bracket 176 and the outlet side bracket 177 have a great width in a direction that intersects the output shaft 53 of the diesel engine 5. The inlet side bracket 176 and the outlet side bracket 177 are detachably coupled to the cylinder head 55 of the diesel engine 5 directly or via the intake manifold 56 or the exhaust manifold 57. The inlet side bracket 176 and the outlet side bracket 177 are distributed and stand upright on the front and the rear of the cylinder head 55 and on both sides of the output shaft 53. The inlet side bracket 176 is located at the rear of the cylinder head 55 and supports the exhaust introduction side of the gas purification housing 168. The outlet side bracket 177 is located at the front of the cylinder head 55 and supports the exhaust discharge side of the gas purification housing 168.

The inlet side bracket 176 is located at the rear of the cylinder head 55 (above the flywheel housing 60). The inlet side bracket 176 includes the securing bracket (first bracket) 178. The lower edge of the securing bracket 178 is bolted to the rear surface of the cylinder head 5. A relay bracket 179 is bolted to the upper end of the securing bracket 178. The proximal end of an extended bracket (third bracket) 180 is bolted to the middle of the relay bracket (second bracket) 179. The distal end of the extended bracket 180 is fastened to the inlet side lid (upstream lid) 169 of the gas purification housing 168 with bolts and nuts.

The outlet side bracket 177 is located at the front of the cylinder head 55 (close to the cooling fan 59). The outlet side bracket 177 of this embodiment is separated into the outlet side first bracket (fourth bracket) 181 and the outlet side second bracket (fifth bracket) 182. The outlet side first bracket 181 is an approximately L-shaped member that extends upward from the right side of the cylinder head 55 and bends to the left side above the cylinder head 55. The outlet side second bracket 182 is an approximately L-shaped member that extends upward from the left side of the cylinder head 55 and bends to the right side above the cylinder head 55. Thus, the outlet side bracket 177 has an approximately inverted U shape in front of the cylinder head 55 and is secured to extend over the cylinder head 55 at a position rearward of the thermostat case 70.

The lower end surface (proximal end) of the outlet side first bracket 181 is bolted to the upper surface of the intake manifold 56. The upper left end (distal end) of the outlet side first bracket 181 is bolted to the upper right end (distal end) of the outlet side second bracket 182. The lower right end (proximal end) of the outlet side second bracket 182 is bolted to the left side front portion of the cylinder head 55. The outlet side second bracket 182 includes an upper end curved surface (U-shaped pressure-receiving surface) 182a at the upper end (distal end) of the outlet side second bracket 182. The upper end curved surface 182a receives the outer circumferential surface of the gas purification housing 168 and is bolted to a bracket fastening portion 172a. The bracket fastening portion 172a is formed at the lower section of the sandwich flange (outlet sandwich flange) 172 of the gas purification housing 168.

As is clear from the above description, the exhaust-gas purification device 52 of this embodiment is detachably coupled to the cylinder head 55, the intake manifold 56, and the exhaust manifold 57 of the engine 5 via the housing support above the diesel engine 5. The housing support includes the exhaust connecting pipe 84, the inlet side bracket 176, and the outlet side bracket 177. The inlet side bracket 176 and the exhaust connecting pipe 84, which are located upstream in the exhaust gas moving direction (exhaust introduction side), are distributed to the cylinder head 55 and the exhaust manifold 57. The outlet side bracket 177 (the outlet side first bracket 181 and the outlet side second bracket 182), which is located downstream in the exhaust gas moving direction (exhaust discharge side), is distributed to the cylinder head 55 and the intake manifold 56. Thus, the exhaust-gas purification device 52 is supported at four points.

This configuration supports the exhaust-gas purification device 52, which is one of the components of the engine 5, with high rigidity and prevents damage on the exhaust-gas purification device 52 that is caused by, for example, vibration. In particular, in this embodiment, since the lower ends of the inlet side bracket 176 and the outlet side second bracket 182 are fastened to the cylinder head 55, a securing reference position of the exhaust-gas purification device 52 with respect to the engine 5 is set with high accuracy. Thus, even the exhaust-gas purification device 52, which is heavier than a post-processing device such as a muffler, is appropriately mounted on a predetermined position.

Figure 32:
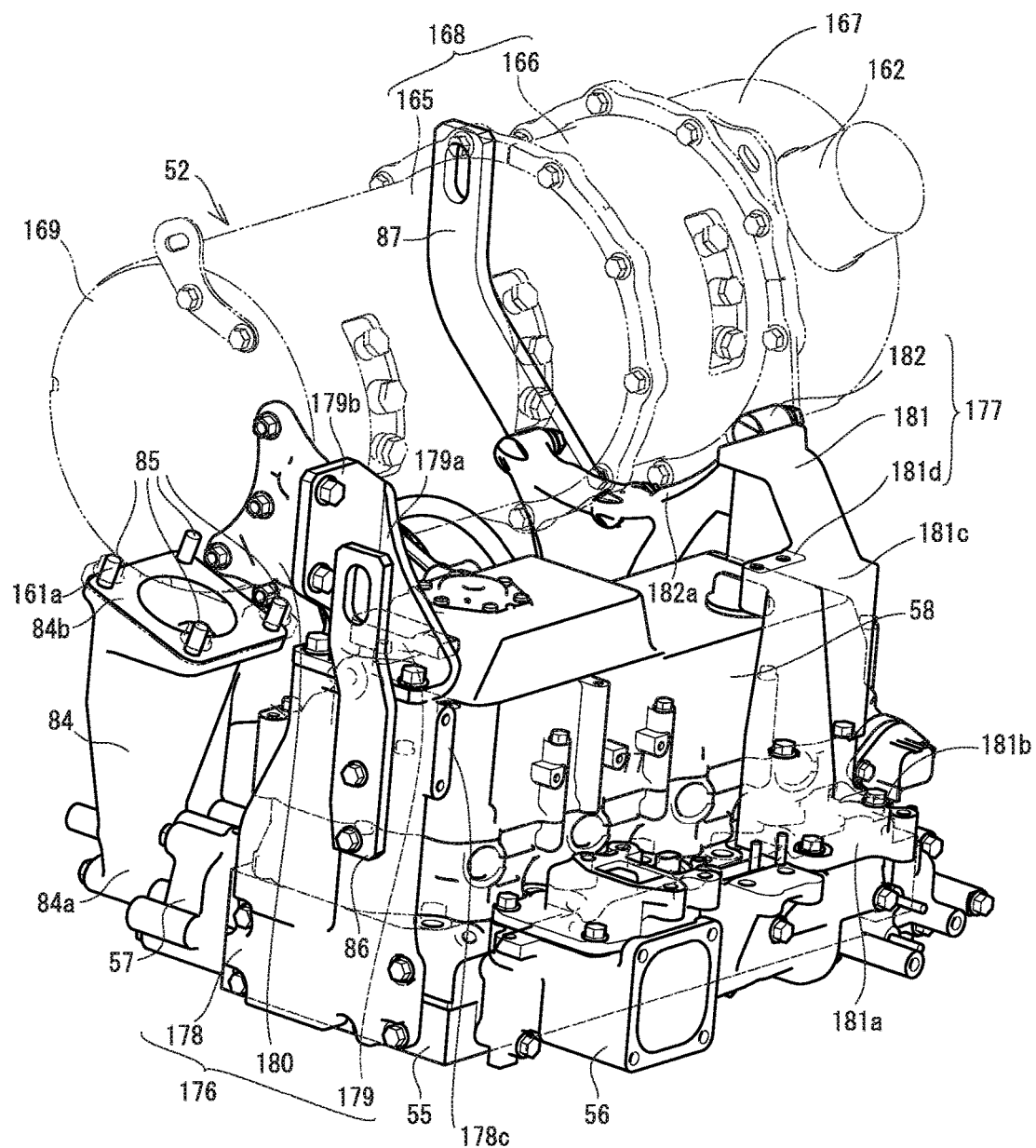
FIG. 32 illustrates a support structure of the DPF.
Figure 34:
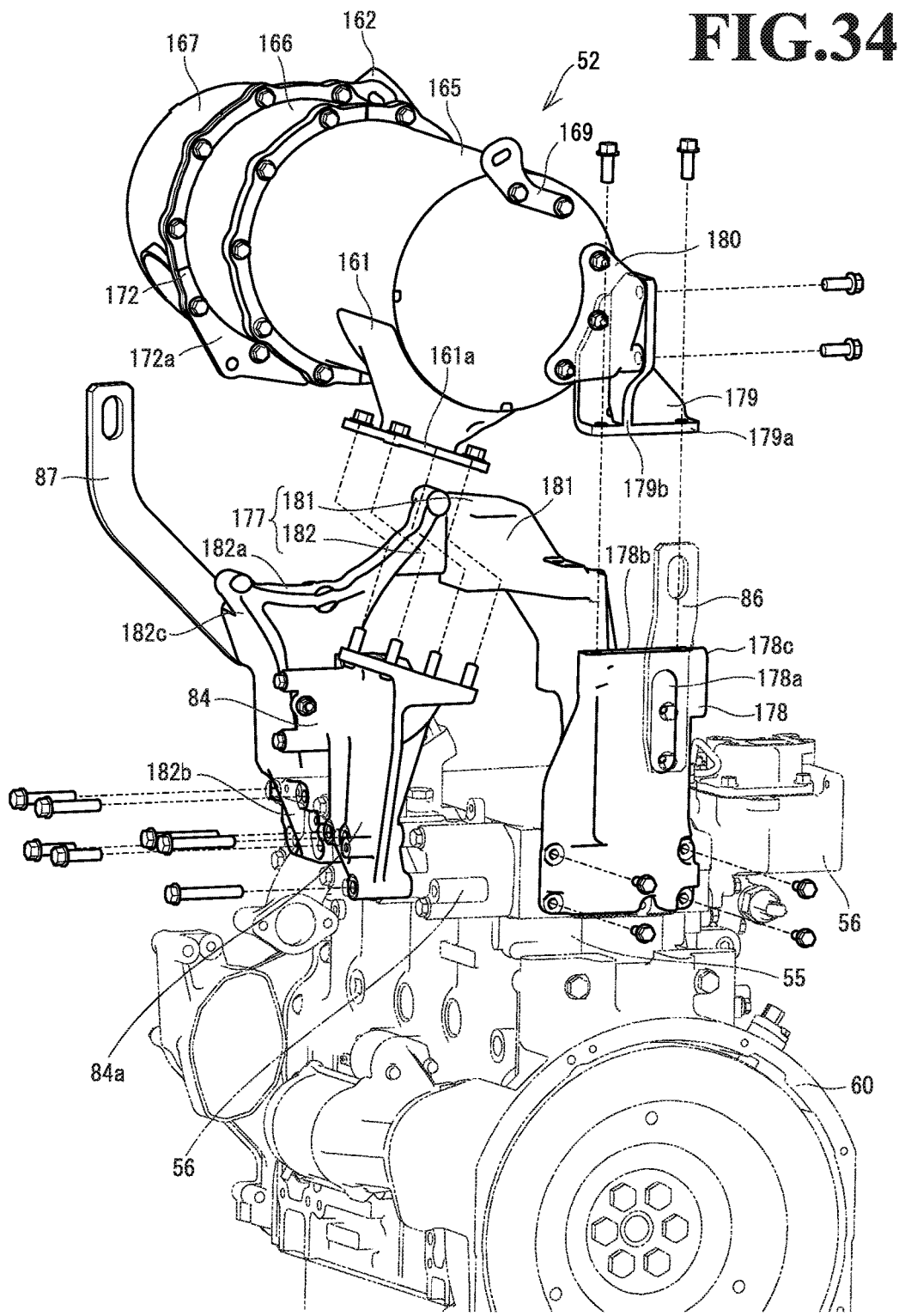
FIG. 34 is an exploded perspective view of the support bracket as viewed from the exhaust inlet side of the DPF.
Figure 36:
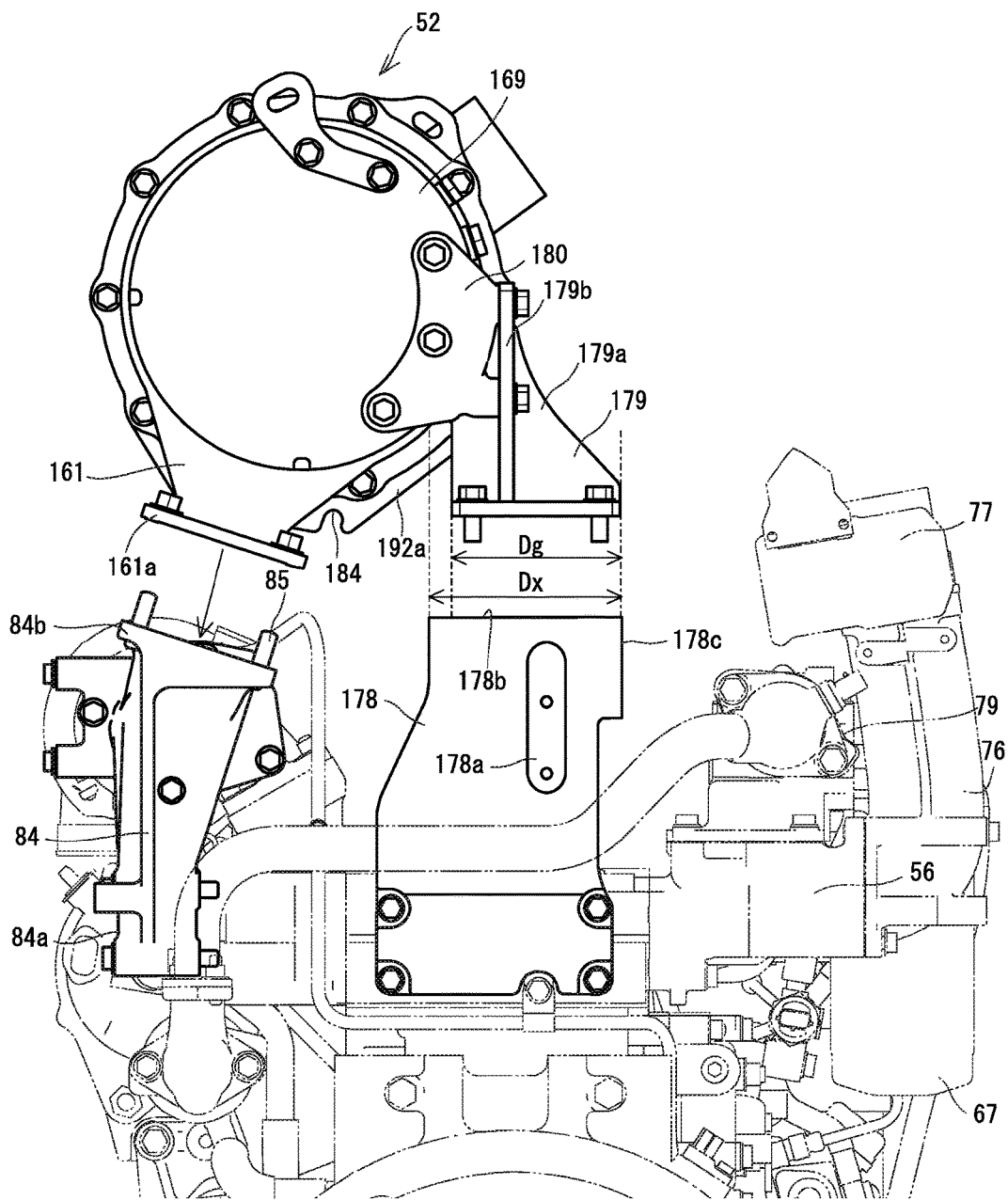
FIG. 36 is a front view of the DPF and one of the support brackets illustrating the relationship between the DPF and the support bracket.

As illustrated in FIGS. 32, 34, and 36, the securing bracket 178 is a plate-like member that has a great width in a direction intersecting the exhaust gas moving direction of the DPF 1 (the output shaft 53 of the diesel engine 5). The section of the securing bracket 178 lower than the recirculation exhaust gas tube 78 is bolted to the cylinder head 55. That is, the recirculation exhaust gas tube 78, which is coupled to the EGR cooler 80, detours behind the securing bracket 178 and is coupled to the intake throttle member 77. The securing bracket 178 includes a front component coupling portion (first component coupling portion) 178a. The front component coupling portion 178a includes bolt holes at a section above the recirculation exhaust gas tube 78. A hanging fixture 86 is detachably bolted to the hanging fixture coupling portion 178a.

The securing bracket 178 further includes the bracket coupling portion 178b. The bracket coupling portion 178b is located on the upper surface of the upper end portion and includes bolt holes. The relay bracket 179 is detachably bolted to the bracket coupling portion 178b. The securing bracket 178 also includes a side component coupling portion (second component coupling portion) 178c. The side component coupling portion 178c is located on the right side of the upper end portion and includes bolt holes. The component securing bracket (exhaust pipe securing bracket) 210 (see FIGS. 20 and 21) for securing an external component such as the exhaust pipe 227 (see FIGS. 20 and 21) is bolted to the side component coupling portion 178c.

As illustrated in FIGS. 32, 34, and 36, the bottom surface at the lower end portion of the relay bracket 179 is abut against the bracket coupling portion 178b on the upper surface at the upper end portion of the securing bracket 178. In this state, the relay bracket 179 is bolted to the securing bracket 178. The relay bracket 179 includes a base plate 179a and a coupling plate 179b. The base plate 179a extends upward from the lower end portion secured to the bracket coupling portion 178b of the securing bracket 178. The coupling plate 179b stands upright at the rear of the plate 179a. The coupling plate 179b is welded to the base plate 179a. The coupling plate 179b of the relay bracket 179 includes fore-and-aft position adjusting bolt holes elongated in the fore-and-aft direction. Mounting bolts that are loosely inserted through the position adjusting bolt holes from the right are screwed to the right side surface of the extended bracket 180 so that the relay bracket 179 is securely coupled to the extended bracket 180. The extended bracket 180 is configured such that the coupling portion that is coupled to the relay bracket 179 stands upright at the rear of the fixed portion that is fixed to the upstream lid 169 of the gas purification housing 168.

The securing position of the extended bracket 180, which is secured to the gas purification housing 168, in the fore-and-aft direction is adjustable with respect to the relay bracket 179, which is secured to the securing bracket 178, in a range corresponding to the dimension in which the mounting bolts move forward and rearward in the fore-and-aft position adjusting bolt holes of the relay bracket 179. Thus, the securing position of the DPF 52 in the fore-and-aft direction (exhaust gas moving direction) is adjustable with respect to the securing bracket 178, which is secured to the cylinder head 55, by adjusting the position of the mounting bolts in the fore-and-aft position adjusting bolt holes of the relay bracket 179.

At the inlet side of the gas purification housing 168, as described above, the lower end of the coupling support portion 84a of the exhaust connecting pipe 84, which communicates with the exhaust gas inlet pipe 161, is bolted to the exhaust manifold 57. That is, the exhaust connecting pipe 84 is configured to be the housing support that supports the inlet side of the gas purification housing 168 together with the inlet side bracket 176. Thus, the exhaust gas inlet side of the DPF 52 is supported with a high rigidity by the inlet side bracket 176, which is coupled to each of the rear surface of the cylinder head 55 and the inlet side lid 169, and the exhaust connecting pipe 84, which is coupled to each of the left side of the exhaust manifold 57 and the exhaust gas inlet pipe 161.

Furthermore, as illustrated in FIGS. 30, 32, 34, and 36, studs 85 are provided on an upward-facing mounting surface 84b of the exhaust connecting pipe 84. Fore-and-aft position adjusting bolt holes that are elongated in the fore-and-aft direction are formed in the inlet flange 161a of the exhaust gas inlet pipe 161. The studs 85 are loosely inserted through the inlet flange 161a of the exhaust gas inlet pipe 161 from below, and nuts 85a are screwed to the upper ends of the studs 85 so that the exhaust gas inlet pipe 161 is detachably fastened to the housing support 85. The securing position of the DPF 52 with respect to the exhaust connecting pipe 84 in the fore-and-aft direction is adjustable in a range corresponding to the dimension in which the studs 85 move forward and rearward in the bolt holes elongated in the fore-and-aft direction in the inlet flange 161a.

That is, the securing position of the rear section of the gas purification housing 168 in the fore-and-aft direction is adjustable with respect to the exhaust connecting pipe 84 and the inlet side bracket 176 by moving the studs 85 and the mounting bolts forward and rearward with respect to the fore-and-aft position adjusting bolt holes of each of the relay bracket 179 and the inlet flange 161a. Thus, the mounting position of the DPF 52 with respect to the diesel engine 5 is easily determined, and the mounting accuracy of the DPF 52, which is secured to the diesel engine 5, is improved. Also, deformation force is prevented from being applied to the gas purification housing 168 due to, for example, an error in the coupling position of the exhaust connecting pipe 84, the inlet side bracket 176, and the outlet side bracket 177. That is, even with the configuration in which the DPF 52 is located at a position above the diesel engine 5 where the DPF 52 is likely to be shaken, for example, the machine vibration of the DPF 52 is easily reduced.

The exhaust gas discharge side (exhaust outlet side) of the exhaust connecting pipe 84 that extends upward from the coupling support portion 84a, which is fastened to the exhaust manifold 57, is tilted rightward (toward the cylinder head 55) with respect to the vertical direction (up and down direction). That is, when the exhaust connecting pipe 84 is viewed from the rear, the upward-facing mounting surface 84b of the exhaust connecting pipe 84 is located to the right of a position directly above the coupling portion between the coupling support portion 84a and the exhaust manifold 57. The upward-facing mounting surface 84b of the exhaust connecting pipe 84 is tilted with respect to a horizontal surface such that the right edge is lowered. The exhaust connecting pipe 84 is located such that the upper ends of the studs 85 are tilted to the right side. Thus, when the inlet flange 161a of the exhaust gas inlet pipe 161 is secured to the upward-facing mounting surface 84b of the exhaust connecting pipe 84, the DPF 52 is lowered from above right to below left with respect to the exhaust connecting pipe 84.

At this time, since the mounting bolts that are screwed to the securing bracket 178 are loosely fitted in the relay bracket 179, the bolt holes of the inlet flange of the exhaust gas inlet pipe 161 are fitted to the studs 85 of the tilted exhaust connecting pipe 84. As illustrated in FIG. 36, the width Dx of the bracket coupling portion 178b on the upper surface of the securing bracket 178 is greater than the width Dy of the lower end of the relay bracket 179. That is, when the DPF 52 is lowered diagonally downward to couple the exhaust gas inlet pipe 161 to the exhaust connecting pipe 84 so that the DPF 52 is mounted onto the diesel engine 5, the entire surface of the lower end of the relay bracket 179 is reliably received by the bracket coupling portion 178b on the upper surface of the securing bracket 178.

Figure 33:
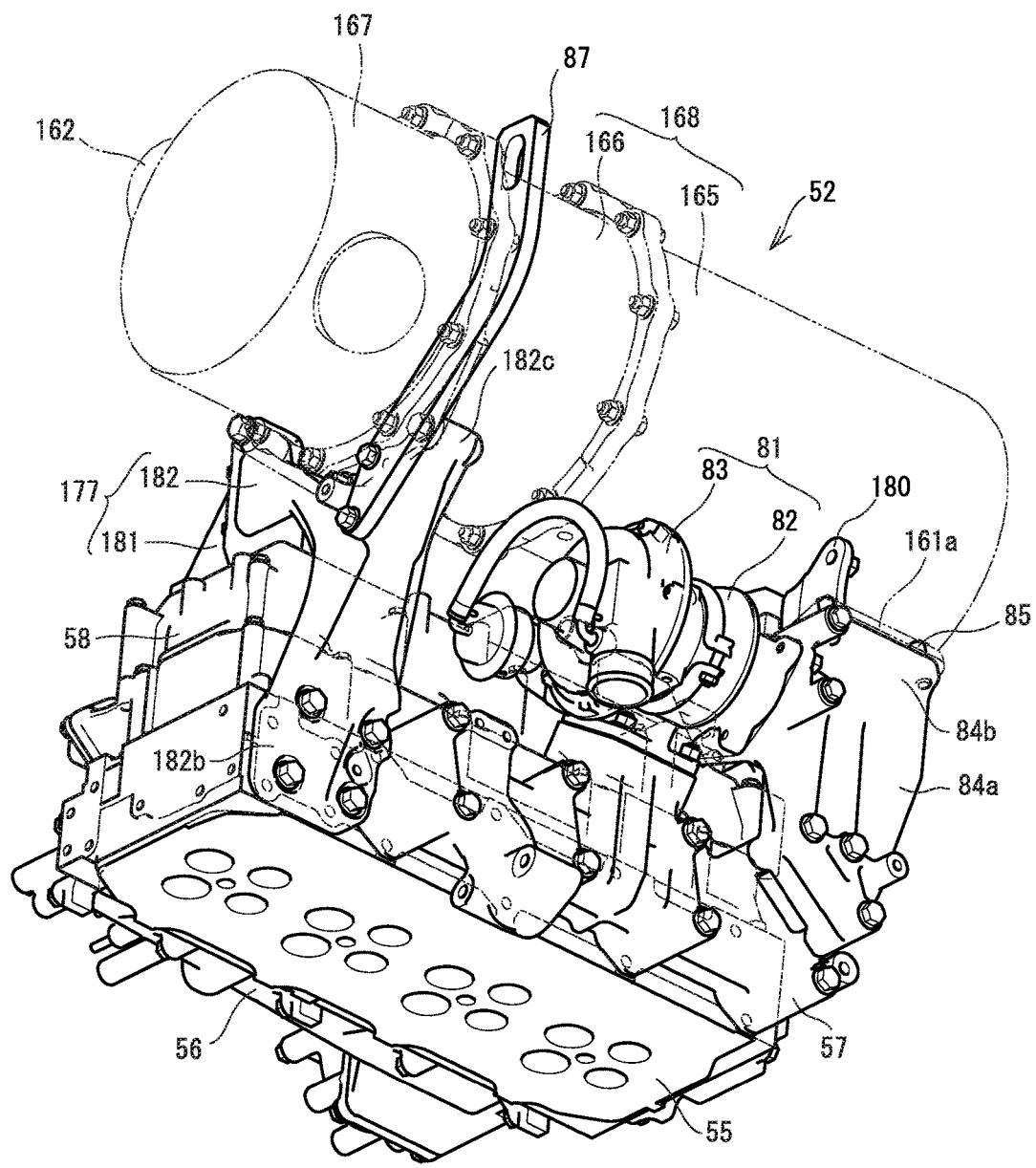
FIG. 33 illustrates the support structure of the DPF.
Figure 35:
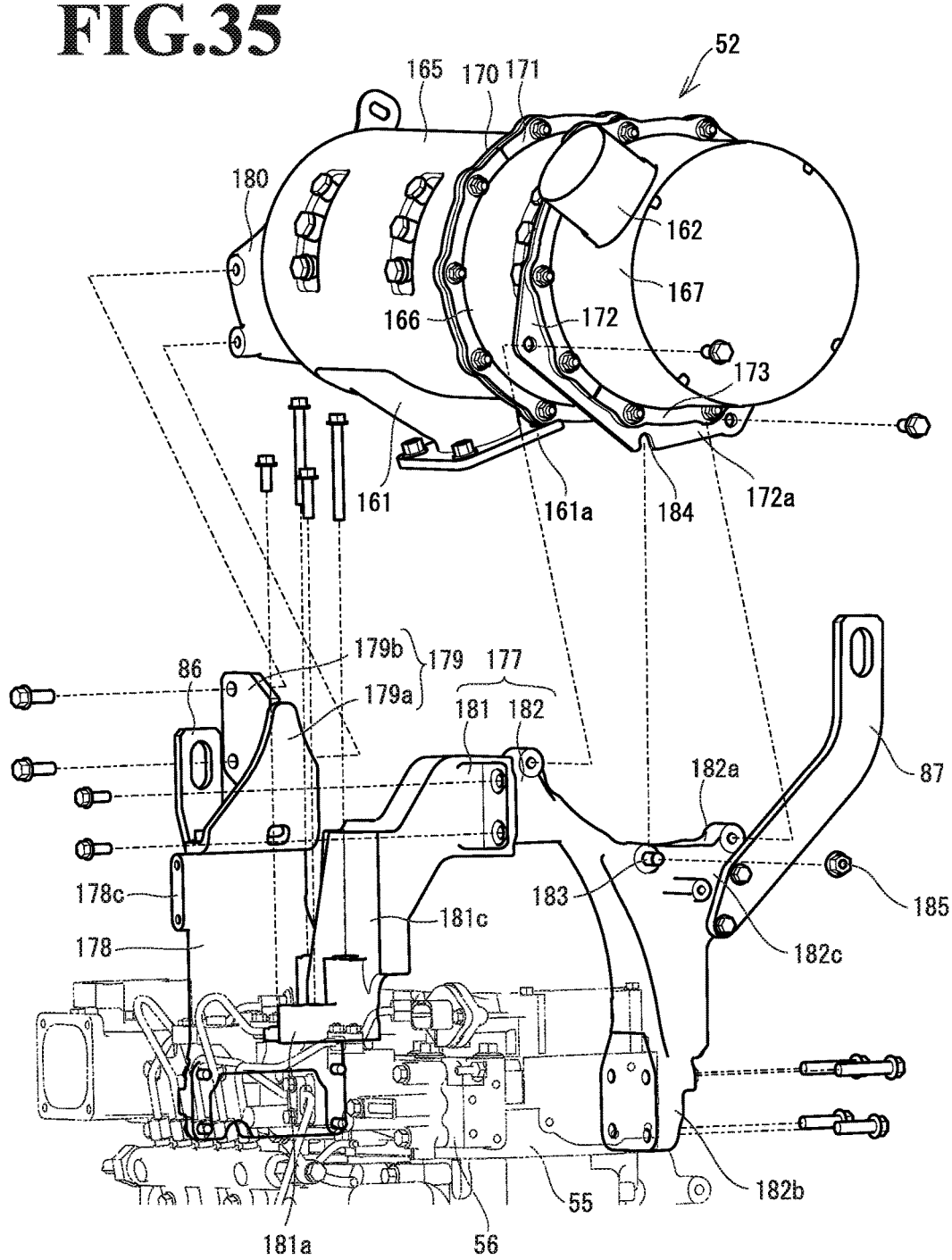
FIG. 35 is an exploded perspective view of the support brackets as viewed from the exhaust outlet side of the DPF.
Figure 37:
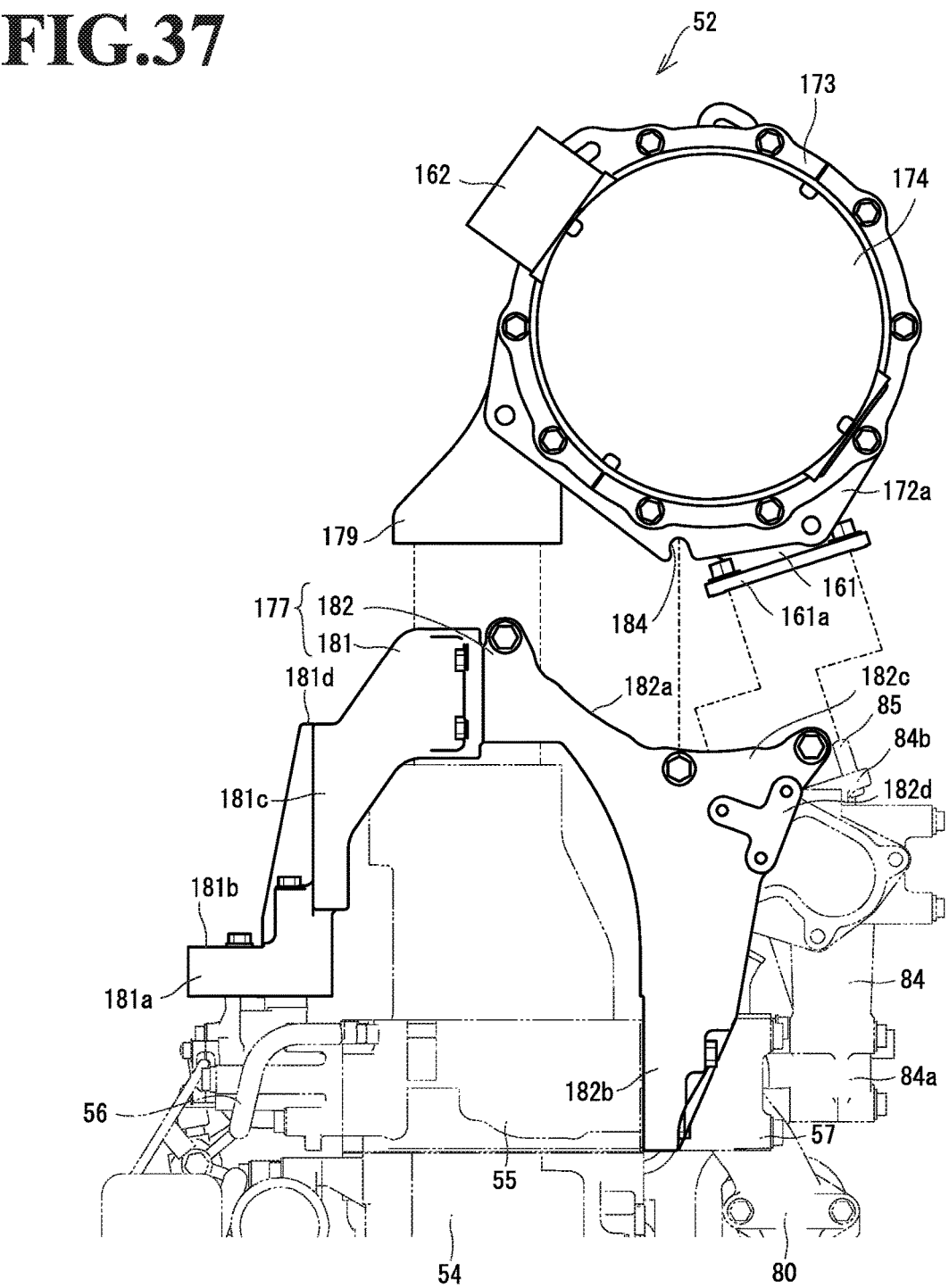
FIG. 37 is a rear view of the DPF and one of the support brackets illustrating the relationship between the DPF and the support bracket.

As illustrated in FIGS. 33, 35, and 37, the proximal end 181a of the outlet side first bracket 181 includes a plurality of vertical through holes. The mounting bolts that are to be screwed to bolt holes provided in the upper surface of the intake manifold 56 are inserted in the through holes. The proximal end 181a of the outlet side first bracket 181 includes, for example, the proximal end component coupling portion (third component coupling portion) 181b. The proximal end component coupling portion 181b secures the component securing bracket (compressor securing bracket) 212 (see FIGS. 16 and 22) for securing an external component such as the air conditioner compressor 211 (see FIGS. 16 and 22). The proximal end component coupling portion 181b includes some of the through holes for receiving the mounting bolts and bolt holes for threadedly receiving mounting bolts to fasten the component securing bracket 212. That is, the component securing bracket 212 is fastened to the outlet side first bracket 181 with the mounting bolts and simultaneously fastened to the intake manifold 56 together with the outlet side first bracket 181 by the mounting bolts screwed to the through holes of the proximal end component coupling portion 181b.

The upper surface of the bent portion (middle portion) 181c of the outlet side first bracket 181 includes, for example, the middle component coupling portion (fourth component coupling portion) 181d. The middle component coupling portion 181d secures the component securing bracket (warm water pipe securing bracket) 208 (see FIGS. 18, 21, and 22) for securing external components such the air conditioner warm water pipes 203, 204 (see FIGS. 18, 21, and 22). In this embodiment, the bent portion 181c of the outlet side first bracket 181 includes a flat step. The middle component coupling portion 181d is provided on the upper surface of the step. The middle component coupling portion 181d includes bolt holes for threadedly receiving mounting bolts for fastening the component securing bracket 208.

As illustrated in FIGS. 33, 35, and 37, the outlet side second bracket 182 includes a proximal end 182b. The proximal end 182b includes a plurality of through holes extending in the left and right direction for receiving mounting bolts that are to be screwed to the bolt holes provided on the left side of the intake manifold 56. The outlet side second bracket 182 includes a bent portion (middle portion) 182c. The bent portion 182c includes the rear component coupling portion (fifth component coupling portion) 182d. The rear component coupling portion 182d includes bolt holes on the rear surface. A hanging fixture 87 is detachably bolted to the rear component coupling portion 182*d*. After the diesel engine 5 is mounted on the work vehicle, the hanging fixture 87 is removed. In this case, for example, a component fixture (shield securing bracket) 207 (see FIGS. 13 and 22) for supporting the upstream relay pipe 223 and the shield 205 (see FIGS. 6 and 13), which will be described later, is bolted to the rear component coupling portion 182*d*. The outlet side second bracket 182 includes the upper end curved surface 182*a* at the upper end portion extending from the bent portion 182*c* toward the right side distal end. The upper end curved surface 182*a* corresponds to the outline of the gas purification housing 168.

As illustrated in FIG. 37, an engagement shaft (projection), which is a stud 183 in this embodiment, is provided at the upper end central portion of the outlet side second bracket 182. The stud 183 projects forward from the front surface of the upper end central portion of the outlet side second bracket 182. The bracket fastening portion 172*a* of the outlet sandwich flange 172 of the gas purification housing 168 includes an engagement shaft (recess), which is a downward-opening bolt insertion notch 184 in this embodiment. That is, a bolt hole for receiving the stud 183 is notched in the bracket fastening portion 172*a* of the outlet sandwich flange 172 in such a manner as to open upward. This forms the bolt insertion notch 228.

The stud 183 of the outlet side second bracket 182 is configured to be engageable with the bolt insertion notch 184 in the bracket fastening portion 172*a* of the outlet sandwich flange 172. The downstream side of the gas purification housing 168 in the exhaust gas moving direction (exhaust discharge side) is placed on the upper end of the outlet side second bracket 182, and the bolt insertion notch 184 is engaged with the stud 183 so that the downstream side of the gas purification housing 168 in the exhaust gas moving direction (exhaust discharge side) is supported by the outlet side second bracket 182.

The engagement of the stud 183 with the bolt insertion notch 184 holds the exhaust discharge side of the gas purification housing 168 at a predetermined position. That is, in addition to placing the relay bracket 179, which is secured to the gas purification housing 168 via the extended bracket 180, on the upper end of the securing bracket 178 and placing the exhaust introduction side of the exhaust gas inlet pipe 161 on the upper end (exhaust discharge side) of the exhaust connecting pipe 84, the bolt insertion notch 184 of the gas purification housing 168 is engaged with the stud 183 of the outlet side second bracket 182 so that the gas purification housing 168 is temporarily fixed on the inlet side bracket 176 and the outlet side bracket 177.

Thus, the mounting position of the exhaust-gas purification device 52 with respect to the diesel engine 5 is easily determined, and an operator who performs a mounting operation can take hands off the exhaust-gas purification device 52 in the temporarily fixed state. It is therefore unnecessary to perform the mounting operation such as fastening bolts and a removing operation while supporting the entire weight of the exhaust gas treatment apparatus 52. This significantly reduces trouble in mounting and removing the exhaust-gas purification device 52 and in assembly and disassembly of the exhaust-gas purification device 52.

Subsequently, with the bolt insertion notch 184 engaged with the stud 183, an engagement nut 185 is screwed to the stud 183 (perform additional tightening) so that the bracket fastening portion 172*a* of the outlet sandwich flange 172 of the gas purification housing 168 is coupled to the upper end central portion of the outlet side second bracket 182. Unlike this embodiment, the stud 183 may be provided on the gas purification housing 168, and the bolt insertion notch 184 may be provided on the outlet side second bracket 182.

Since one of the outlet side bracket 177 and the gas purification housing 168 includes a projection (stud 183) or a recess (bolt insertion notch 184), and the other one of the outlet side bracket 177 and the gas purification housing 168 includes the recess (bolt insertion notch 184) or the projection (stud 183), the mounting position of the gas purification housing 168 is easily determined by the engagement of the stud 183 (projection) and the bolt insertion notch 184 (recess). The projection and the recess are engagement bodies. It is therefore unnecessary to perform the mounting operation such as fastening bolts while supporting the entire weight of the DPF 52, and the operator can take hands off the DPF 52 while performing the mounting operation. This improves workability in assembly and disassembly of the DPF 52.

Furthermore, the opening direction of the bolt insertion notch 184 matches with a direction in which the inlet flange 161*a* of the exhaust gas inlet pipe 161 of the DPF 52 is mounted onto the upward-facing mounting surface 84*b* of the exhaust connecting pipe 84. That is, the bolt insertion notch 184 is open in a direction parallel to the inclination direction of the studs 85, which are provided on the upward-facing mounting surface 84*b* of the exhaust connecting pipe 84. Thus, when the DPF 52 is secured to the exhaust connecting pipe 84, the inlet side bracket 176, and the outlet side bracket 177 to be supported by the exhaust connecting pipe 84, the inlet side bracket 176, and the outlet side bracket 177, the bolt insertion notch 184 is easily engaged with the stud 183 while fitting the position adjusting bolt holes of the inlet flange 161*a* of the exhaust gas inlet pipe 161 to the studs 85. This further improves workability in assembly and disassembly of the DPF 52.

When the DPF 52 is temporarily supported with the bolt insertion notch 184 being engaged with the stud 183, the upward-facing mounting surface 84*b* of the exhaust connecting pipe 84 receives the exhaust gas inlet pipe 61, the bracket coupling portion 178*b* of the securing bracket 178 receives the relay bracket 179, and the upper end curved surface 182*a* of the outlet side second bracket 182 receives the outer circumferential surface of the gas purification housing 168. Since the temporarily fixed DPF 52 is temporarily supported by the exhaust connecting pipe 84, the securing bracket 178, and the outlet side second bracket 182 in a stable manner, the operator can take hands off the DPF 52 in this state.

On the exhaust gas inlet side of the DPF 52, the upward-facing mounting surface 84*b* of the exhaust connecting pipe 84 and the coupling plate 179*b* of the relay bracket 179 further form a V-shaped pressure-receiving surface. The exhaust gas outlet side of the DPF 52 is placed on the upper end curved surface 182*a* of the outlet side second bracket 182. Thus, when the DPF 52 is temporarily supported on the exhaust connecting pipe 84, the inlet side bracket 176, and the outlet side bracket 177, the exhaust gas inlet side and the exhaust gas outlet side of the DPF 52 are restricted from moving in a direction intersecting the output shaft 53 of the engine 5 by the V-shaped pressure-receiving surface and the U-shaped pressure surface. This configuration prevents the DPF 52 from falling off.

As illustrated in FIGS. 28 to 32, the hanging fixtures 86 and 87 are coupled to the inlet side bracket 176 and the outlet side bracket 177. The hanging fixtures 86, 87 are used for attaching, for example, hanging wires. Thus, when the diesel engine 5 is unloaded to the work vehicle, hanging wires respectively inserted in hanging through holes of the hanging fixtures 86, 87 are engaged with, for example, a hook of a chain block to lift the diesel engine 5 so that mounting and removing operation of the diesel engine 5 can be performed.

The hanging fixture 86 is coupled to the securing bracket 178 of the inlet side bracket 176, which is located on the rear right of the diesel engine 5, and the hanging fixture 87 is coupled to the outlet side second bracket 182 of the outlet side bracket 177, which is located on the front left of the diesel engine 5. That is, since the hanging fixtures 86, 87 are arranged diagonally opposite to each other with respect to the diesel engine 5, the diesel engine 5 is hung by, for example, the chain block in a stable position. Furthermore, since the hanging fixtures 86, 87 are attachable and detachable, the hanging fixtures 86, 87 can be removed when the diesel engine 5 is mounted on the work vehicle. This configuration reduces the space occupied by the diesel engine 5 in the engine compartment of the work vehicle.

Next, an example of a configuration of the shield 205 will be described with reference to FIGS. 11, 13, 14, and 38. As illustrated in FIGS. 11 and 13, the shield 205 is located on the left side surface of the engine 5 to cover the section above the EGR cooler 80 to the lower section of the DPF 52. The shield 205 covers part of the DPF 52, the exhaust manifold 57, the turbocharger 81, and the exhaust connecting pipe 84. This configuration allows cooling air that is guided by the cooling fan 59, which is located at the front of the engine 5, to be heated by the high-heat sources covered by the shield 205. The heated air moves upward to be guided to the DPF 52. That is, the cooling air that is heated by exhaust heat of the engine 5 is guided to the DPF 52 by the shield 205 so that the DPF 52 is located in a high-temperature environment. Thus, the regeneration ability of the DPF 52 is prevented from being decreased.

Figure 38:
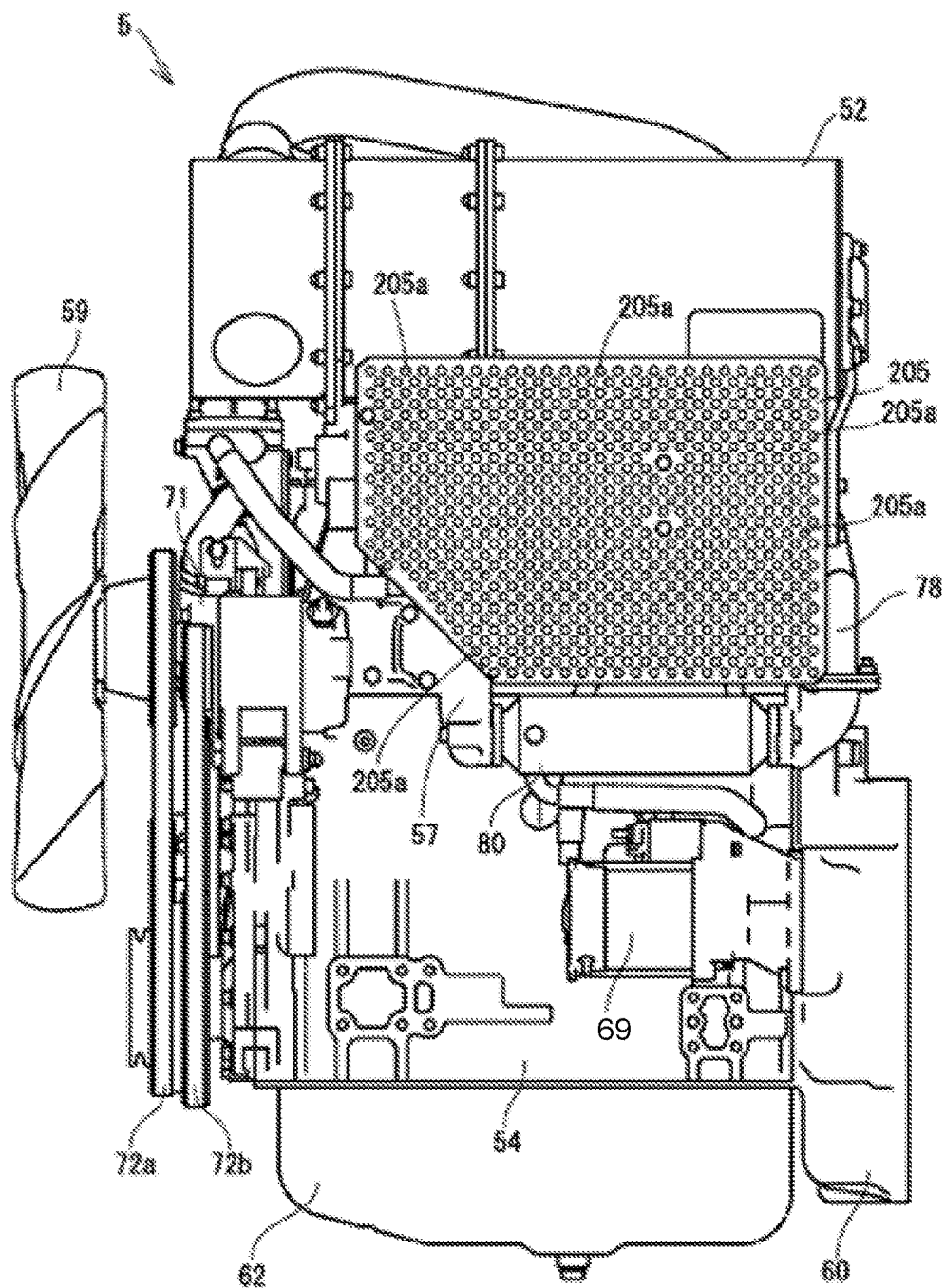
FIG. 38 is a left side view of the diesel engine illustrating the structure of the shield.

As illustrated in FIG. 38, the shield 205 is configured by a perforated plate in which a plurality of punched holes 205a are arranged in a matrix. The punched holes 205a are arranged in equal intervals in the up and down direction and the left and right direction. Some of the cooling air heated by the engine 5 is exhausted to the outside through the punched holes 205a of the shield 205 and the associated engine cover 232. This structure reduces the flow resistance in the space between the side surface of the engine 5 and the shield 205 and inhibits generation of turbulence in the space. Thus, the existence of the perforated plate-like shield 205 allows some of the heated cooling air to be discharged to the outside of the engine compartment so that the cooling air heated by the exhaust heat of the engine 5 is guided by an amount suitable for the regeneration process of the DPF 52 and simultaneously prevents abnormal heating of the side section of the engine 5.

Figure 39A:
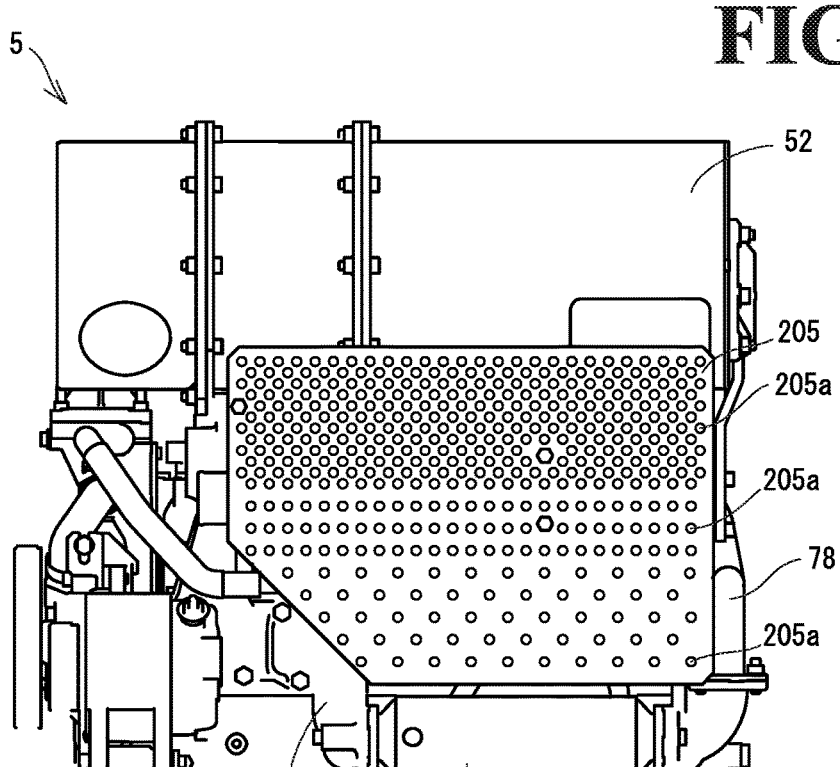
FIGS. 39A and 39B are left side views of part of the diesel engine illustrating different structures of the shield.

A different example configuration of the shield 205 will be described below with reference to FIG. 39. In the example configuration in FIG. 39A, the arrangement density of the punched holes 205a provided in the upper section of the shield 205 differs from the arrangement density of the punched holes 205a provided in the lower section of the shield 205. As illustrated in FIG. 39A, the punched holes 205a are provided such that the opening rate at the section of the shield 205 close to the DPF 52 is greater than the opening rate at the section of the shield 205 close to the lower section of the exhaust manifold 57. That is, the pitch (intervals) of the adjacent punched holes 205a of the shield 205 is reduced at the section close to the DPF 52, and the pitch (intervals) of the adjacent punched holes 205a of the shield 205 is increased at the section close to the lower section of the exhaust manifold 57.

Since the perforated shield 205 is configured by the punched holes 205a like the example configuration in FIG. 39A, the open area of the shield 205 is easily adjusted, and the open region can be designed with flexibility. The open area of the section of the shield 205 close to the DPF 52 is greater than the open area of the section of the shield 205 close to the lower section of the exhaust manifold 57. Thus, the exhaust heat that has moved upward is more efficiently guided to the DPF 52, and simultaneously, some of the cooling air of the engine 5 is easily exhausted at the open region close to the DPF 52. This inhibits heat retention between the shield 205 and the engine 5.

Figure 39B:
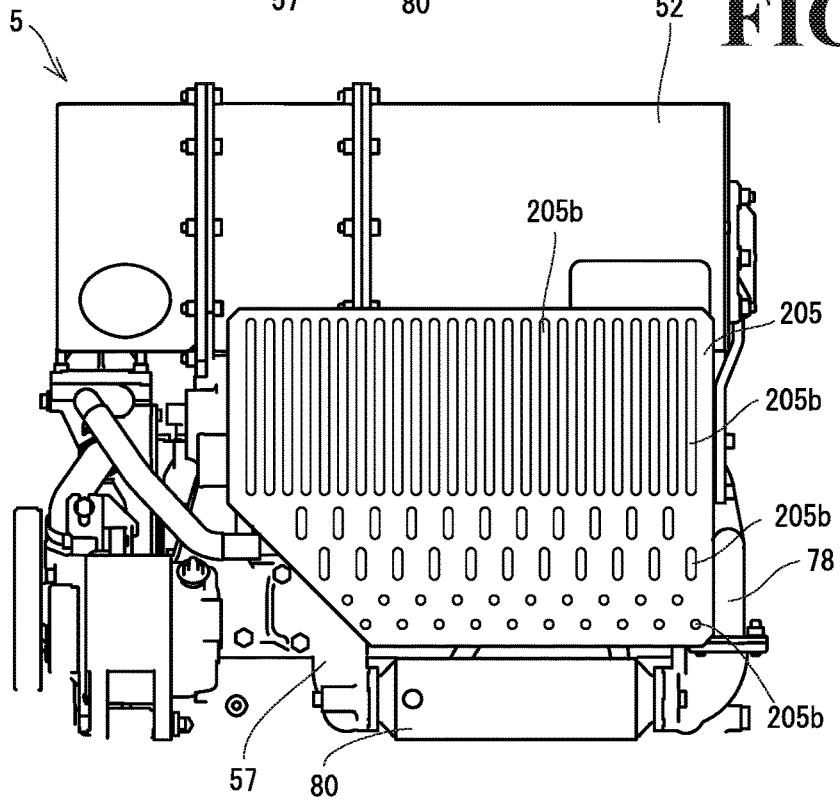

In an example configuration of FIG. 39B, the shield 205 is configured by a perforated plate in which elongated holes 205b are arranged side by side. As illustrated in FIG. 39B, the elongated holes 205b of the shield 205 are open in the vertical direction and are arranged at equal intervals in the fore-and-aft direction. Since the shield 205 is configured by a perforated plate with the elongated holes 205b, the flow resistance at the open portions formed by the elongated holes 205b is easily made uniform, and turbulence inside the shield 205 is inhibited. This reduces retention of the exhaust heat from, for example, the engine 5.

In the shield 205 of the example configuration in FIG. 39B, the elongated holes 205b are provided such that the open rate of the section of the shield 205 close to the DPF 52 is greater than the open rate of the section of the shield 205 close to the lower section of the exhaust manifold 57. That is, the pitch (intervals) of the adjacent elongated holes 205b is reduced in the section of the shield 205 close to the DPF 52, and the pitch (intervals) of the adjacent elongated holes 205b is increased in the section of the shield 205 close to the lower section of the exhaust manifold 57. Furthermore, the open area of each elongated hole 205b is increased in the section of the shield 205 close to the DPF 52, and the open area of each elongated hole 205b is reduced in the section of the shield 205 close to the lower section of the exhaust manifold 57.

Figure 40:
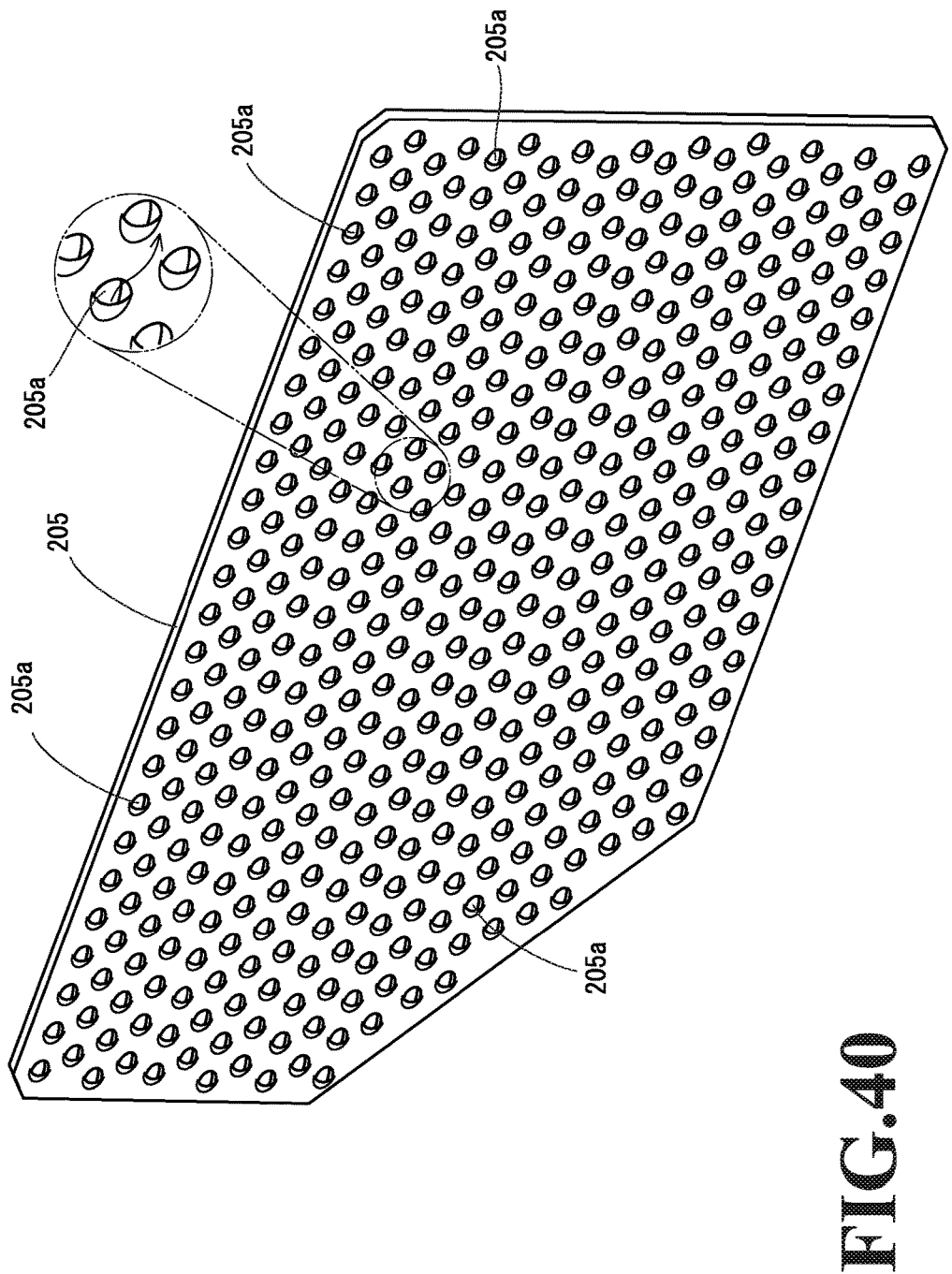
FIG. 40 is an external perspective view of the shield having another structure.

The configuration of the shield 205 is not limited to the configuration illustrated in FIGS. 38 and 39. The shield 205 may be formed by, for example, a perforated plate including a plurality of elongated holes that are open in the left and right direction. With regard to the punched holes 205a in FIGS. 38 and 39A and the elongated holes 205b in FIG. 39B, for example, parts of the plate portion may project to cover the front portions of the holes 205a, 205b as illustrated in FIG. 40 so that the rear left side of the holes 205a, 205b are open, and the cooling air heated on the side of the engine 5 is exhausted to the rear left side of the holes 205a, 205b.

Figure 41:
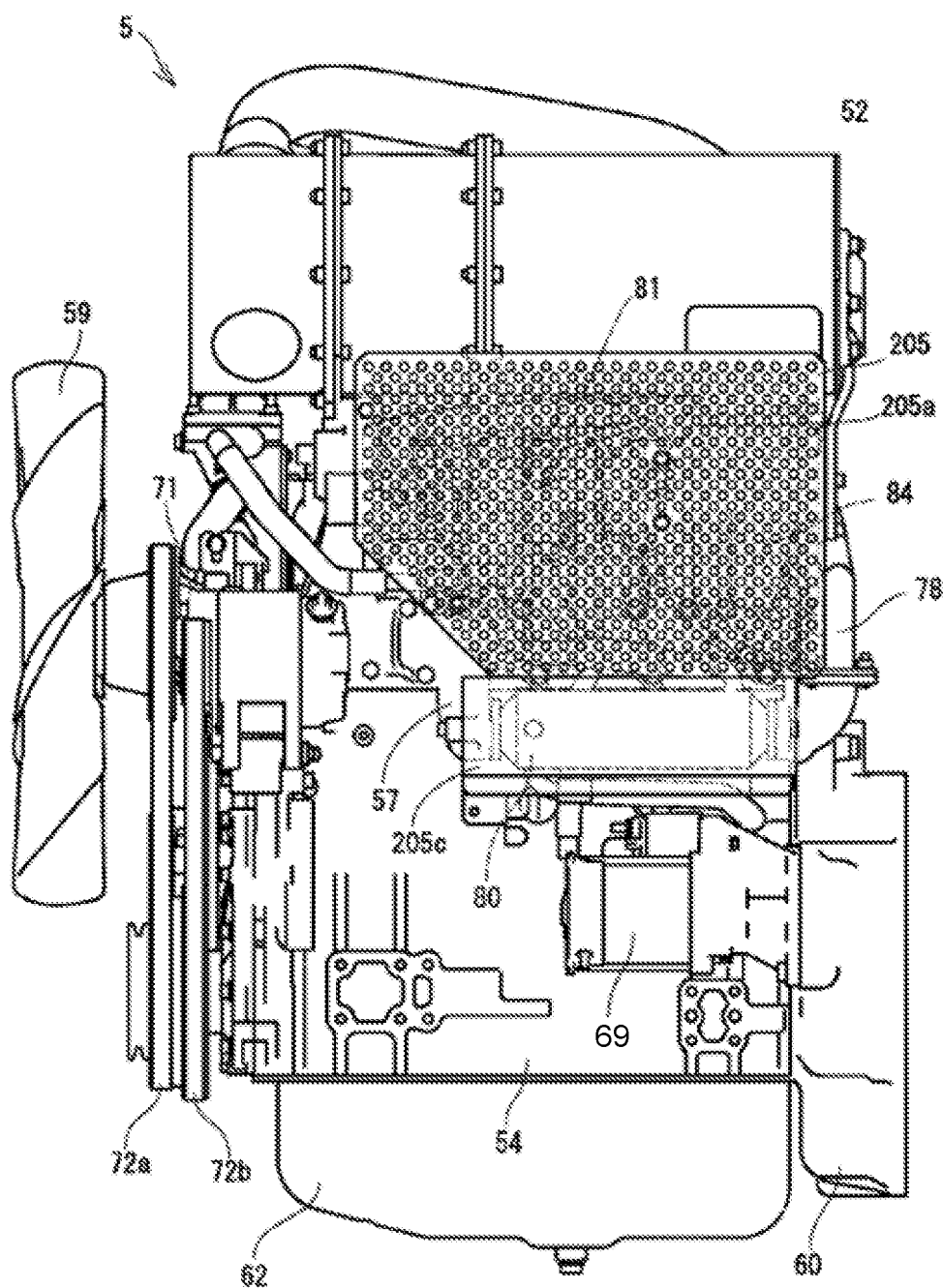
FIG. 41 is a left side view of the diesel engine illustrating another structure of the shield.

In the example configuration illustrated in FIG. 41, the EGR cooler 80, which cools some of the exhaust gas from the exhaust manifold 57, is located below the exhaust manifold 57. The outer side of the EGR cooler 80 may be covered with a heat insulator 205c located below the shield 205. The heat insulator 205c is made of a metal plate. Since the outer side (left side) of the EGR cooler 80 is covered with the heat insulator 205c, which is secured below the shield 205, while the cooling air from the front of the engine 5 is guided to the EGR cooler 80, the cooling air heated on the side of the EGR cooler 80 moves upward toward the DPF 52, which is located above the EGR cooler 80. Thus, while the heat balance in the engine compartment is optimized and the exhaust heat of the engine 5 is efficiently used by the DPF 52, the heat retention around the engine 5 is inhibited.

The configurations of the components according to the invention of the present application are not limited to the illustrated embodiment, but may be modified in various forms without departing from the object of this invention.

The embodiment of the invention of the present application relates to work vehicles such as agricultural tractors or wheel loaders for civil engineering work.

What is claimed is:

1. A work vehicle comprising:
an engine mounted on a front portion of a travelling machine body;
a post-processing device mounted above the engine via a support bracket and configured to purify exhaust gas of the engine;
a cooling fan in front of the engine and configured to cool the engine;
a hood configured to cover the cooling fan, the engine, and the post-processing device;
a shield covering a lower section of the post-processing device and one side of the engine, wherein an entirety of the shield is interposed between a first side of the hood and each of:
the engine,
the post-processing device, and
a space between the engine and the post-processing device; and
the post-processing device coupled to an exhaust manifold on one side of the engine, the exhaust manifold being covered with the shield, the work vehicle further comprising:
a heat insulator below the exhaust manifold and coupled to one side of the engine; and
a starter below the heat insulator.

2. The work vehicle according to claim 1, wherein the shield comprises a perforated plate comprising a plurality of holes.

3. The work vehicle according to claim 1, wherein the shield comprises a perforated plate comprising a plurality of holes arranged in a matrix.

4. The work vehicle according to claim 1, wherein the shield comprises a perforated plate comprising elongated holes arranged side by side.

5. The work vehicle according to claim 3, further comprising:
an EGR cooler below the exhaust manifold and configured to cool some of the exhaust gas from the exhaust manifold; and
a metal plate below the shield and covering an outer side of the EGR cooler.

6. The work vehicle according to claim 3, wherein the shield comprises a perforated plate in which an open area of a section close to the post-processing device is greater than an open area of a section close to a lower section of the exhaust manifold.

7. The work vehicle according to claim 1, further comprising:
a plurality of heat exchangers configured to allow cooling air guided by the cooling fan to pass through the heat exchangers to exchange heat with a cooling medium; and
a bottom plate over an upper surface of a front section of the travelling machine body, the hood and the bottom plate comprising opening portions at positions forward of the cooling fan, the hood and the bottom plate being configured to introduce cooling air into the hood through the opening portions when the cooling fan is driven.

8. The work vehicle according to claim 1, further comprising:
a radiator configured to water-cool the engine;
a fan shroud surrounding the cooling fan; and
a sensor secured to an upper section of the fan shroud and configured to measure an internal environment of the post-processing device, which is mounted above the engine.

9. The work vehicle according to claim 1, wherein the post-processing device is mounted above the engine via the support bracket, the work vehicle further comprising:
a pipe securing bracket standing upright above the engine to cover an outer surface of the post-processing device and configured to secure, to the engine, an external supply pipe that supplies coolant that circulates in the engine and to a device outside the engine.

10. The work vehicle according to claim 9, further comprising a sensor configured to measure an internal environment of the post-processing device, the sensor being configured to be secured to the pipe securing bracket, while the external supply pipe is disposed between the pipe securing bracket and the post-processing device, wherein the pipe securing bracket is disposed between the sensor and the post-processing device.

11. The work vehicle according to claim 1, further comprising:
an operator's seat above the travelling machine body and at a rear of the engine; and
a U-shaped exhaust pipe secured in front of the operator's seat and configured to discharge exhaust gas from the post-processing device to the outside, the U-shaped exhaust pipe comprising a drain hole configured to drain water at a section of the U-shaped exhaust pipe, the work vehicle further comprising a wind direction plate coupled to the U-shaped exhaust pipe to cover the drain hole from below on one side of the drain hole.

12. The work vehicle according to claim 1, wherein:
the lower section of the post-processing device comprising a bottom portion and one or more side portions including the side portion; and
the post-processing device comprises a front side, a rear side opposite the front side, a top side, a bottom side opposite the top side, a first side, and a second side opposite the first side.

13. The work vehicle according to claim 1, wherein the shield includes a planar surface having a first portion interposed between the post-processing device and the first side of the hood, and a second portion interposed between the post-processing device and the first side of the hood.

14. The work vehicle according to claim 1, further comprising a hood shield covering at least a rear of the post-processing device, wherein:
a longitudinal direction of the post-processing device defines a line which intersects the post-processing device and the hood shield; and
the shield configured to enable air heated by the engine to pass through the shield.

15. A work vehicle comprising:
an engine mounted on a front portion of a travelling machine body;
a cooling fan in front of the engine and configured to cool the engine;
a post-processing device above the engine and configured to purify exhaust gas of the engine;
an exhaust manifold coupled to the post-processing device on one side of the engine;
a heat insulating member positioned below the exhaust manifold and coupled to the one side of the engine;

a shield covering the one side of the engine, a side portion of a lower section of the post-processing device, and the exhaust manifold, the shield comprises a planar surface having a first portion interposed between the post-processing device and a first side of a hood, and a second portion interposed between the engine and the first side of the hood; and the hood configured to cover the engine, the cooling fan, the post-processing device, and the shield.

16. The work vehicle according to claim 15, further comprising:

a pipe securing bracket above the engine to cover an outer surface of the post-processing device and configured to secure an external supply pipe to the engine; and a sensor configured to measure an internal environment of the post-processing device, the sensor configured to be secured to the pipe securing bracket such that the pipe securing bracket is disposed between the sensor and the post-processing device and such that the external supply pipe is disposed between the pipe securing bracket and the post-processing device; and wherein the shield is configured to enable air heated by the engine to pass from a first side of the shield that faces the engine, through the shield, to a second side of the shield that faces away from the engine and is opposite the first side of the shield.

17. The work vehicle according to claim 16, further comprising:

a pipe securing bracket above the engine to cover an outer surface of the post-processing device and configured to secure an external supply pipe to the engine; and a sensor configured to measure an internal environment of the post-processing device, the sensor configured to be secured to the pipe securing bracket such that the pipe securing bracket is disposed between the sensor and the post-processing device and such that the external supply pipe is disposed between the pipe securing bracket and the post-processing device.

18. The work vehicle according to claim 16, further comprising a starter positioned below the heat insulating member on the one side of the engine, wherein:

a longitudinal direction of the post-processing device defines a line which intersects a front end of the post-processing device and a rear end of the post-processing device; and the front end of the post-processing device is positioned between a front of the traveling machine body and the rear end of the post-processing device.

19. A work vehicle comprising:

an engine mounted on a front portion of a travelling machine body;

a post-processing device above the engine and configured to purify exhaust gas of the engine;

a cooling fan in front of the engine and configured to cool the engine;

a shield covering a lower section of the post-processing device and one side of the engine;

a hood configured to cover the cooling fan, the engine, the post-processing device, and the shield;

a pipe securing bracket above the engine to cover an outer surface of the post-processing device and configured to secure an external supply pipe to the engine; and a sensor configured to measure an internal environment of the post-processing device, the sensor configured to be secured to the pipe securing bracket such that the pipe securing bracket is disposed between the sensor and the post-processing device and such that the external supply pipe is disposed between the pipe securing bracket and the post-processing device.

20. The work vehicle according to claim 19, further comprising:

a hood shield covering at least a rear of the post-processing device;

wherein the shield comprising a planar surface having a first portion interposed between the post-processing device and a first side of the hood, and a second portion interposed between the post-processing device and the first side of the hood; and wherein a longitudinal direction of the post-processing device defines a line which intersects the post-processing device and the hood shield.

* * * * *